(12) United States Patent
Yamada et al.

(10) Patent No.: US 9,673,669 B2
(45) Date of Patent: Jun. 6, 2017

(54) BRUSHLESS MOTOR AND ROTOR

(71) Applicant: ASMO CO., LTD., Shizuoka-ken (JP)

(72) Inventors: Yoji Yamada, Hamamatsu (JP); Koji Mikami, Kosai (JP); Chie Morita, Kosai (JP); Takahiro Tsuchiya, Toyohashi (JP); Seiya Yokoyama, Toyohashi (JP); Takayoshi Suzuki, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 488 days.

(21) Appl. No.: 14/075,958

(22) Filed: Nov. 8, 2013

(65) Prior Publication Data

US 2014/0139065 A1 May 22, 2014

(30) Foreign Application Priority Data

Nov. 13, 2012 (JP) ................................. 2012-249191
Nov. 13, 2012 (JP) ................................. 2012-249192
(Continued)

(51) Int. Cl.
*H02K 1/22* (2006.01)
*H02K 1/27* (2006.01)
(Continued)

(52) U.S. Cl.
CPC ............. *H02K 1/226* (2013.01); *H02K 1/243* (2013.01); *H02K 1/27* (2013.01); *H02K 1/2713* (2013.01);
(Continued)

(58) Field of Classification Search
CPC ........ H02K 1/27; H02K 1/2713; H02K 1/226; H02K 1/243; H02K 21/12; H02K 21/044;
(Continued)

(56) References Cited

U.S. PATENT DOCUMENTS 2,651,733 A 9/1953 Stark
3,553,510 A 1/1971 Howey
(Continued)

FOREIGN PATENT DOCUMENTS

CN 2354289 Y 12/1999
CN 2372831 Y 4/2000
(Continued)

OTHER PUBLICATIONS

Yamada Yoji; Morita Chie; Fuji Yuuki; Kato Shigemasa, Rotor and Motor, 2012-05-24, ASMO Co Ltd, WO 2012067223.*
(Continued)

*Primary Examiner* — Burton Mullins
*Assistant Examiner* — Alexander Singh
(74) *Attorney, Agent, or Firm* — Christensen, Fonder, Dardi & Herbert PLLC

(57) ABSTRACT

A brushless motor includes a rotor. The rotor includes a first rotor core, a second rotor core and a field magnet. The first rotor core includes a plurality of first magnetic pole portions arranged in a circumferential direction. The second rotor core includes a plurality of second magnetic pole portions arranged in the circumferential direction. The field magnet is arranged between the first rotor core and the second rotor core in an axial direction. When the field magnet is magnetized in the axial direction, the first magnetic pole portions function as first magnetic poles and the second magnetic pole portions function as second magnetic poles.

26 Claims, 47 Drawing Sheets

(30) Foreign Application Priority Data

| | | | |
|---|---|---|---|
| Jan. 23, 2013 | (JP) | | 2013-010104 |
| Jan. 24, 2013 | (JP) | | 2013-011217 |
| Feb. 12, 2013 | (JP) | | 2013-024711 |
| Mar. 4, 2013 | (JP) | | 2013-041916 |
| Mar. 26, 2013 | (JP) | | 2013-064339 |
| Jul. 30, 2013 | (JP) | | 2013-157994 |

(51) Int. Cl.
*H02K 15/03* (2006.01)
*H02K 21/16* (2006.01)
*H02K 1/28* (2006.01)
*H02K 1/24* (2006.01)
*H02K 15/02* (2006.01)

(52) U.S. Cl.
CPC .......... *H02K 1/28* (2013.01); *H02K 15/022* (2013.01); *H02K 15/03* (2013.01); *H02K 21/16* (2013.01); *H02K 2213/03* (2013.01)

(58) Field of Classification Search
CPC .... H02K 21/048; H02K 15/022; H02K 1/145; H02K 3/325; H02K 3/525; H02K 3/528; H02K 21/16; H02K 15/03; H02K 1/28; H02K 2213/03
USPC ............ 310/156.66, 156.68, 156.69, 156.73, 310/156.77, 49.15, 156.71, 257, 263, 310/68 B
See application file for complete search history.

(56) References Cited

U.S. PATENT DOCUMENTS

| | | | |
|---|---|---|---|
| 4,388,545 A | 6/1983 | Honsinger et al. | |
| 4,882,515 A | 11/1989 | Radomski | |
| 5,148,070 A * | 9/1992 | Frye | H02K 29/08 310/168 |
| 5,955,807 A | 9/1999 | Kajiura et al. | |
| 6,013,967 A | 1/2000 | Ragaly et al. | |
| 6,157,111 A | 12/2000 | Asao | |
| 6,337,529 B1 | 1/2002 | Higashino et al. | |
| 6,396,177 B1 | 5/2002 | Shin et al. | |
| 2001/0002095 A1 | 5/2001 | Sakamoto | |
| 2005/0206254 A1 | 9/2005 | Tsuge et al. | |
| 2006/0055270 A1 | 3/2006 | Peterson | |
| 2007/0170809 A1* | 7/2007 | Itoh | H02K 1/243 310/263 |
| 2008/0053407 A1 | 3/2008 | Maier et al. | |
| 2009/0184599 A1* | 7/2009 | Kanazawa | H02K 1/148 310/195 |
| 2009/0230803 A1 | 9/2009 | Nakayama et al. | |
| 2010/0084215 A1 | 4/2010 | Sakatani et al. | |
| 2011/0001383 A1 | 1/2011 | Shimomura et al. | |
| 2012/0112585 A1* | 5/2012 | Kajiura | F01L 1/10 310/83 |
| 2012/0187794 A1 | 7/2012 | Inoue et al. | |
| 2013/0057102 A1 | 3/2013 | Yamada et al. | |
| 2013/0106208 A1 | 5/2013 | Yamada et al. | |

FOREIGN PATENT DOCUMENTS

| | | | |
|---|---|---|---|
| CN | 101946390 A | 1/2011 | |
| GB | 2006059 A | 5/1979 | |
| JP | S40-2927 U | 1/1965 | |
| JP | S54-26615 U | 7/1977 | |
| JP | S53-135512 U | 10/1978 | |
| JP | S59-34482 U | 3/1984 | |
| JP | H 1-101166 U | 7/1989 | |
| JP | H03-117357 U | 12/1991 | |
| JP | H04-325863 A | 11/1992 | |
| JP | H3-39355 U | 4/1993 | |
| JP | 5-43749 U | 6/1993 | |
| JP | H05-168278 A | 7/1993 | |
| JP | H06-022481 A | 1/1994 | |
| JP | H06-070526 A | 3/1994 | |
| JP | H06-133478 A | 5/1994 | |
| JP | H06-245461 A | 9/1994 | |
| JP | H11-150902 A | 6/1999 | |
| JP | H11206052 A | 7/1999 | |
| JP | H11-275831 A | 10/1999 | |
| JP | 2000-209800 A | 7/2000 | |
| JP | 2001-218403 A | 8/2001 | |
| JP | 2001-314071 A | 11/2001 | |
| JP | 2002-051525 A | 2/2002 | |
| JP | 2002-136091 A | 5/2002 | |
| JP | 2002-209370 A | 7/2002 | |
| JP | 2002-247817 A | 8/2002 | |
| JP | 2003-204660 A | 7/2003 | |
| JP | 2008045556 A | 2/2008 | |
| JP | 2008-109773 A | 5/2008 | |
| JP | 2008-312402 A | 12/2008 | |
| JP | 2009-219309 A | 9/2009 | |
| JP | 2009-261056 A | 11/2009 | |
| JP | 2009-261154 A | 11/2009 | |
| JP | 4468033 B2 | 3/2010 | |
| JP | 2010-136588 A | 6/2010 | |
| JP | 2010-199622 A | 9/2010 | |
| JP | WO 2012067223 A1 * | 5/2012 | ........... H02K 21/044 |
| JP | 2012-115085 A | 6/2012 | |
| JP | 2013-005627 A | 1/2013 | |
| JP | 2013-064339 | 8/2016 | |
| WO | 2011/040247 A1 | 7/2011 | |

OTHER PUBLICATIONS

Japanese Office Action of JP 2012-249191 dated Mar. 7, 2016 with its English Translation.
Japanese Office Action of JP Application No. 2013-011217 dated May 24, 2016 along with its English Translation.
U.S. Office Action of U.S. Appl. No. 14/075,942 dated May 17, 2016.
Japanese Office Action of JP Application No. 2013-011388 dated May 10, 2016 along with its English Translation.
Japanese Office Action of JP Application No. 2013-024712 dated May 10, 2016 along with its English Translation.
Japanese Office Action of JP Application No. 2013-064340 dated Jun. 28, 2016 along with its English Translation.
Japanese Office Action of JP 2013-024711, dated Jul. 12, 2016.
Japanese Office Action of JP 2013-157994, dated Jul. 12, 2016 along with its English Translation.
Japanese Office Action of JP 2013-064339 dated Aug. 2, 2016 along with its English Translation.

* cited by examiner

BRUSHLESS MOTOR AND ROTOR

BACKGROUND OF THE INVENTION

The present disclosure relates to a brushless motor and a rotor.

Japanese Patent No. 4468033 discloses a brushless motor for a variable valve timing apparatus as one example of a conventional motor for a position control apparatus arranged in a vehicle engine room. The brushless motor is provided with a rotor including a rotor core, through which a bore extends in the axial direction, and a field magnet, which is inserted into and fixed to the bore.

In a brushless motor like the one described above, the field magnet is inserted into and fixed to the bore that extends through the rotor core in the axial direction. Thus, the field magnet is easily affected by the ambient environments. For example, when the temperature in the vehicle engine room becomes high, the field magnet is easily demagnetized (irreversible temperature change). When the temperature is high, the magnetic force of the field magnet becomes weak. To cope with this, the current flowing through the coils of a stator may be increased. However, if the current is increased, the field magnet is further easily demagnetized (irreversible temperature change).

SUMMARY OF THE INVENTION

It is an object of the present disclosure to provide a brushless motor and a rotor capable of resisting demagnetization (irreversible temperature change) of a field magnet even when, for example, the temperature in a vehicle engine room becomes high.

To achieve the above object, a first aspect of the present disclosure is a brushless motor for a position control apparatus arranged in a vehicle engine room and includes a rotor. The rotor includes a first rotor core, a second rotor core, and a field magnet. The first rotor core includes a plurality of first magnetic pole portions arranged in a circumferential direction. The second rotor core includes a plurality of second magnetic pole portions arranged in a circumferential direction. The field magnet is arranged between the first rotor core and the second rotor core in an axial direction. The first magnetic pole portions function as first magnetic poles and the second magnetic pole portions function as second magnetic poles when the field magnet is magnetized in the axial direction.

A second aspect of the present disclosure is a brushless motor including a rotor and a stator. The rotor includes a rotation shaft, a first rotor core, a second rotor core, and a field magnet. The first rotor core includes a disk-shaped first core base that rotates integrally with the rotation shaft around the rotation shaft. A plurality of first claw-shaped magnetic poles are arranged at equal intervals on an outer circumferential surface of the first core base. Each of the first claw-shaped magnetic poles includes a first basal portion, which projects radially outward, and a first distal portion, which bends from the first basal portion and extends in an axial direction. The second rotor core includes a disk-shaped second core base that rotates integrally with the rotation shaft around the rotation shaft, and a plurality of second claw-shaped magnetic poles arranged at equal intervals on an outer circumferential surface of the second core base. Each of the second claw-shaped magnetic poles includes a second basal portion, which projects radially outward, and a second distal portion, which bends from the second basal portion and extends in an axial direction. The second claw-shaped magnetic poles are arranged between adjacent ones of the first claw-shaped magnetic poles in a circumferential direction. The field magnet rotates integrally with the rotation shaft around the rotation shaft. The field magnet is arranged between the first core base and the second core base. The field magnet is magnetized in the axial direction so that each of the first claw-shaped magnetic poles functions as a first magnetic pole and each of the second claw-shaped magnetic poles functions as a second magnetic pole. The stator includes a stator core and windings. The stator core is arranged at an outer side of the rotor and including a plurality of teeth located at equal intervals in the circumferential direction. Each of the teeth includes a radially inner circumferential surface opposed to radially outer circumferential surfaces of the first and second claw-shaped magnetic poles. The windings are wound as concentrated windings around each of the teeth. The windings generate a rotating field when voltage is applied to the windings. The first and second claw-shaped magnetic poles are formed in a range satisfying $\theta 1 \leq \theta\alpha < (360/n) - \theta L$, where the number of magnetic poles of the rotor is represented by n, an opening angle of the radially outer circumferential surfaces of the first and second claw-shaped magnetic poles is represented by $\theta\alpha$, an opening angle of the radially inner circumferential surface of each of the teeth is represented by $\theta 1$, and an opening angle between a circumferential end of the first distal portion and a circumferential end of the second distal portion in adjacent ones of the first and second claw-shaped magnetic poles is represented by $\theta L$ when a circumferential length between the circumferential end of the first distal portion and the circumferential end of the second distal portion is equal to a distance of an air gap between the stator and the rotor.

A third aspect of the present disclosure is a brushless motor including rotor and a stator. The rotor includes a rotation shaft, a first rotor core, a second rotor core, and a field magnet. The first rotor core includes a disk-shaped first core base that rotates integrally with the rotation shaft around the rotation shaft, and a plurality of first claw-shaped magnetic poles arranged at equal intervals on an outer circumferential surface of the first core base. Each of the first claw-shaped magnetic poles includes a first basal portion, which projects radially outward, and a first distal portion, which bends from the first basal portion and extends in an axial direction. The second rotor core includes a disk-shaped second core base that rotates integrally with the rotation shaft around the rotation shaft, and a plurality of second claw-shaped magnetic poles arranged at equal intervals on an outer circumferential surface of the second core base. Each of the second claw-shaped magnetic poles includes a second basal portion, which projects radially outward, and a second distal portion, which bends from the second basal portion and extends in an axial direction. The second claw-shaped magnetic poles are arranged between adjacent ones of the first claw-shaped magnetic poles in a circumferential direction. The field magnet rotates integrally with the rotation shaft around the rotation shaft. The field magnet is arranged between the first core base of the first rotor core and the second core base of the second rotor core. The field magnet is magnetized in the axial direction so that each of the first claw-shaped magnetic poles functions as a first magnetic pole and each of the second claw-shaped magnetic poles functions as a second magnetic pole. The stator includes a stator core and windings. The stator core is arranged at an outer side of the rotor and includes a plurality of teeth located at equal intervals in the circumferential direction. Each of the teeth includes a radially inner circumferential surface opposed to radially outer circumferential surfaces of the first and second claw-shaped magnetic poles. The windings are wound as concentrated windings around each of the teeth. The windings generate a rotating field when voltage is applied to the windings. The first and second claw-shaped magnetic poles are formed in a range satisfying $\theta L \leq \theta \beta < 360/n - \theta 1$, where the number of magnetic poles of the rotor is represented by n, an opening angle between a circumferential end of the first distal portion and a circumferential end of the second distal portion in adjacent ones of the first and second claw-shaped magnetic poles is represented by $\theta \beta$, an opening angle of a radially inner circumferential surface of the teeth is represented by $\theta 1$, and the opening angle $\theta \beta$ is represented by $\theta L$ when a circumferential length between the circumferential end of the first distal portion and the circumferential end of the second distal portion is equal to a distance of an air gap between the stator and the rotor.

A fourth aspect of the present disclosure is a rotor including a rotation shaft, a first rotor core, a second rotor core, a field magnet, and a reinforcement. The first rotor core includes a substantially disk-shaped first core base having a central portion fixed to the rotation shaft, and a plurality of first claw-shaped magnetic poles arranged at equal intervals on an outer circumferential surface of the first core base. Each of the first claw-shaped magnetic projects radially outward and extends in an axial direction. The second rotor core includes a substantially disk-shaped second core base having a central portion fixed to the rotation shaft, and a plurality of second claw-shaped magnetic poles arranged at equal intervals on an outer circumferential surface of the second core base. Each of the second claw-shaped magnetic poles projects radially outward and extends in an axial direction, the first and second core bases are opposed to each other. The first and second claw-shaped magnetic poles are alternately arranged in a circumferential direction. The field magnet is arranged between the first and second core bases in the axial direction. The field magnet is magnetized in the axial direction so that the first claw-shaped magnetic poles function as first magnetic poles and the second claw-shaped magnetic poles function as second magnetic poles. The reinforcement reinforces the first rotor core and the second rotor core. The reinforcement is formed integrally with or discretely from the first rotor core and the second rotor core.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of a brushless motor will now be described with reference to FIGS. 1 and 2.

Figure 1:
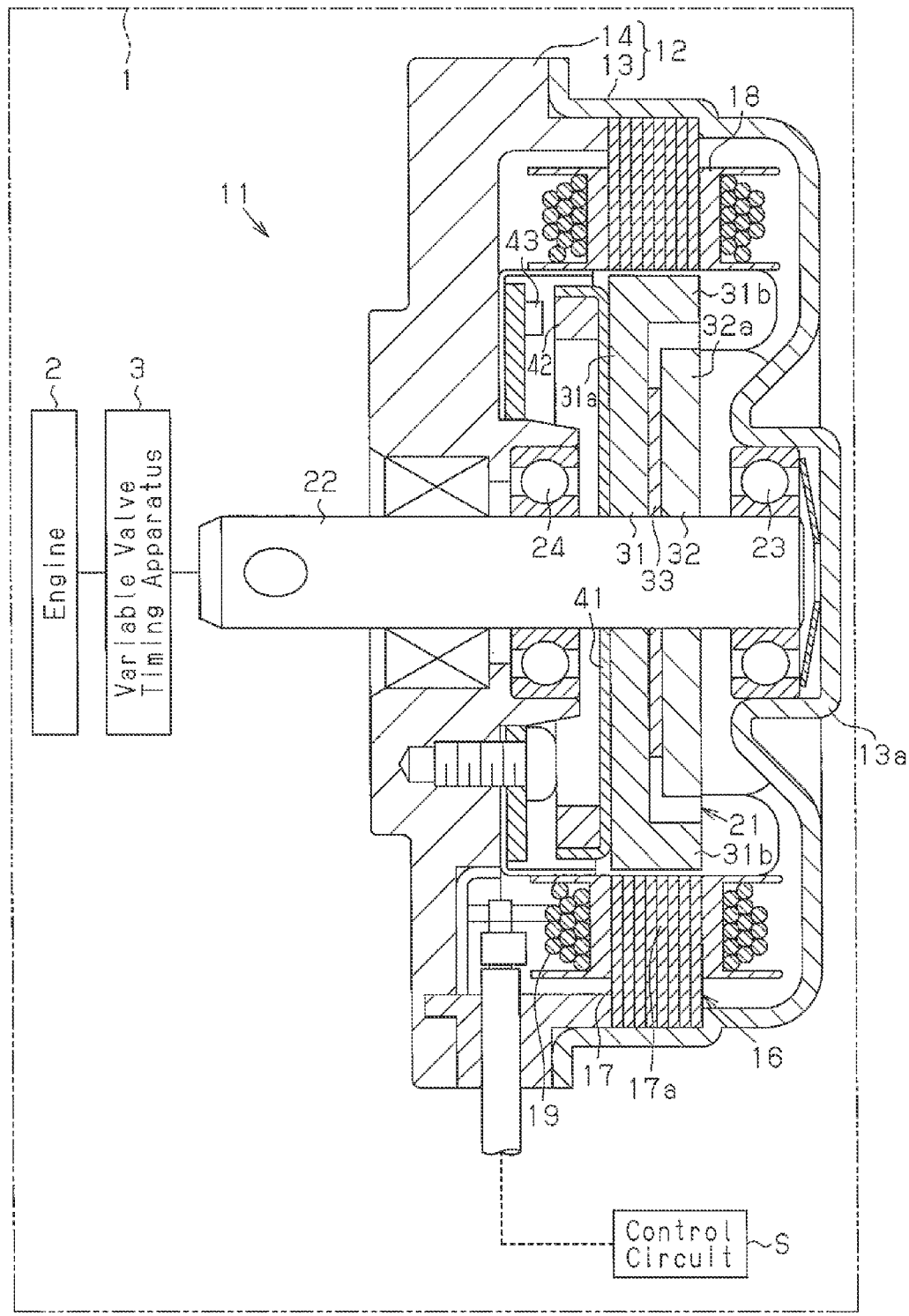
FIG. 1 is a cross-sectional view of a brushless motor according to a first embodiment of the present disclosure.

As shown in FIG. 1, a brushless motor 11 of this embodiment is for use with a position control apparatus arranged in a vehicle engine room 1, more specifically, for a variable valve timing apparatus 3 connected to an engine 2.

As shown in FIG. 1, a motor case 12 of the brushless motor 11 includes a cylindrical housing 13 which is cylindrical and has a closed end, and a front end plate 14 which closes a front opening (left side in FIG. 1) of the cylindrical housing 13.

As shown in FIG. 1, a stator 16 is fixed to an inner circumferential surface of the cylindrical housing 13. The stator 16 includes an armature core 17 having teeth 17a, extending radially inward and serving as a plurality of (twelve in this embodiment) concentrated winding teeth, and windings 19, which are wound around the teeth 17a of the armature core 17 through an insulator 18. If drive current is supplied from an external control circuit S to the windings 19, the stator 16 generates rotating field.

As shown in FIG. 1, a rotor 21 of the brushless motor 11 includes a rotation shaft 22, and the rotor 21 is arranged in the stator 16. The rotation shaft 22 is a metal shaft, more specifically, a non-magnetic metal shaft. The rotation shaft 22 is rotatably supported by bearings 23 and 24, which are supported by a bottom 13a of the cylindrical housing 13 and the front end plate 14. The variable valve timing apparatus 3 is connected to a distal end of the rotation shaft 22 which projects outward. If the rotation shaft 22 is rotated and driven, valve timing (relative rotation phase of a cam shaft with respect to crankshaft of the engine 2) is appropriately changed in accordance with an operation situation of the engine 2.

Figure 2:
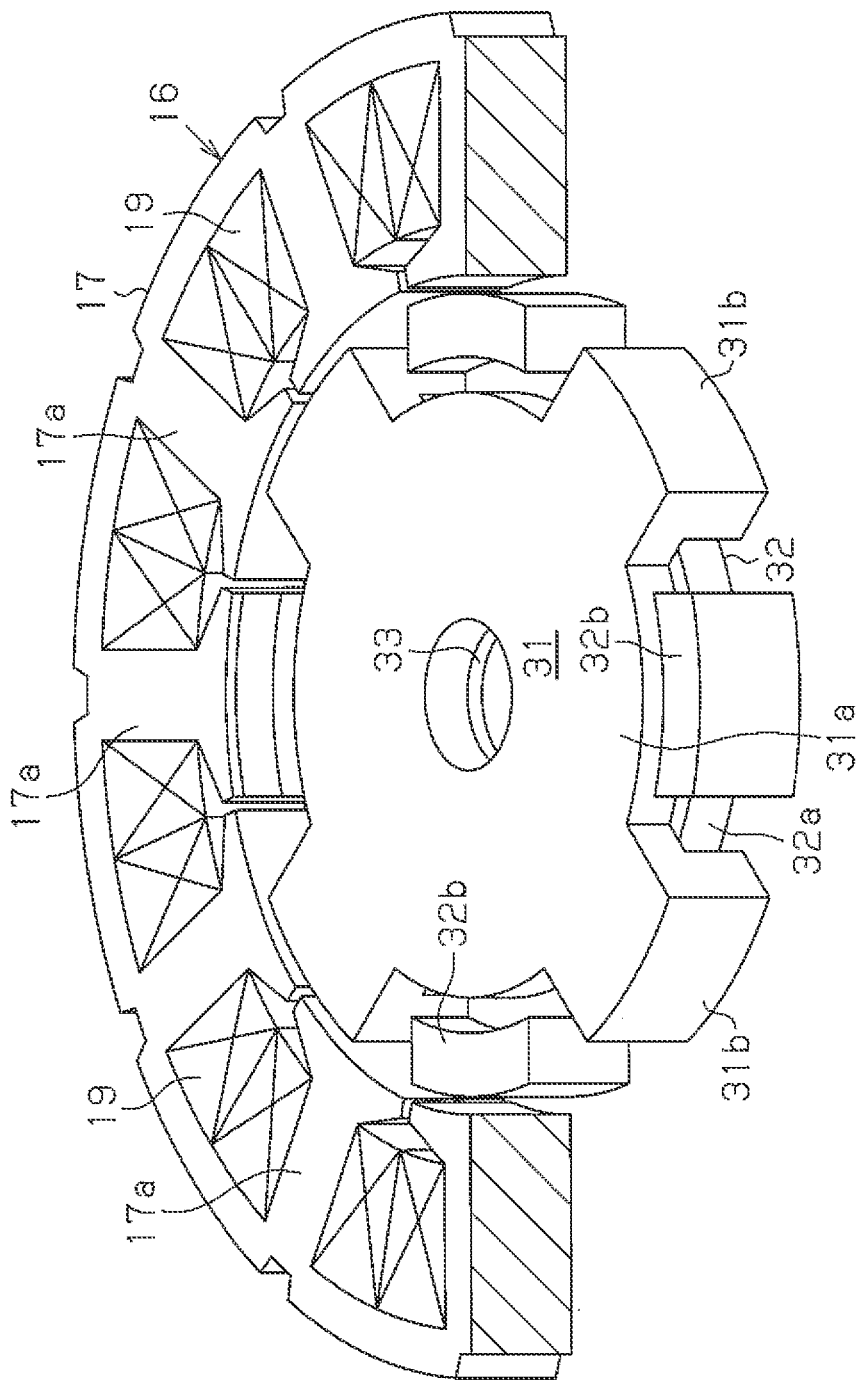
FIG. 2 is a partially cross-sectional perspective view of the brushless motor shown in FIG. 1.

As shown in FIGS. 1 and 2, the rotor 21 includes first and second rotor cores 31 and 32, which are fitted to the rotation shaft 22, and an annular magnet 33, which serves as a field magnet.

The first rotor core 31 includes a substantially disk-shaped first core base 31a and a plurality of (four in this embodiment) first claw-shaped magnetic poles 31b as first magnetic pole portions. The first claw-shaped magnetic poles 31b are provided on an outer portion of the first core base 31a and arranged in equal intervals. Each of the first claw-shaped magnetic poles 31b projects radially outward and extends in the axial direction.

The second rotor core 32 includes a substantially disk-shaped second core base 32a having the same shape as that of the first rotor core 31 and a plurality of second claw-shaped magnetic poles 32b serving as second magnetic pole portions. The second claw-shaped magnetic poles 32b are provided on an outer portion of the second core base 32a and arranged in equal intervals. Each of the second claw-shaped magnetic poles 32b projects radially outward and extends in its axial direction. The second rotor core 32 is coupled to the first rotor core 31 such that the second claw-shaped magnetic poles 32b are arranged between adjacent ones of the first claw-shaped magnetic poles 31b in a circumferential direction. The annular magnet 33 is arranged (sandwiched) between the first core base 31a and the second core base 32a in the axial direction. In this embodiment, the first and second core bases 31a and 32a are fixed to the annular magnet 33 using an adhesive.

As shown in FIG. 1, the annular magnet 33 is a neodymium magnet, and is arranged radially inward from outer portions of the first and second core bases 31a and 32a. More specifically, an outer diameter of the annular magnet 33 is set to be smaller than the first and second core bases 31a and 32a. The annular magnet 33 is magnetized in the axial direction such that each of the first claw-shaped magnetic poles 31b functions as a first magnetic pole (north pole in this embodiment) and each of the second claw-shaped magnetic poles 32b functions as a second magnetic pole (south pole in this embodiment). That is, the rotor 21 of this embodiment is a rotor of a so-called Lundell-type structure using the annular magnet 33 as a field magnet. In the rotor 21, the first claw-shaped magnetic poles 31b, which are north poles, and the second claw-shaped magnetic poles 32b, which are south poles, are alternately arranged in the circumferential direction, and the number of poles is eight (number of pairs of poles is four). That is, in this embodiment, the number of poles of the rotor 21 is set to be 2×n (here, n is a natural number), and the number of teeth 17a of the stator 16 is set to be 3×n. More specifically, the number of poles of the rotor 21 is set to "eight", and the number of the teeth 17a of the stator 16 is set to "twelve".

In this embodiment, the coupled first and second core bases 31a and 32a and annular magnet 33 are configured such that the diameter is four times or greater than the axial length. The diameter of the assembled object is set to be 100 mm or less.

As shown in FIG. 1, a magnet fixing member 41 is fitted to the rotation shaft 22 on a side of the first rotor core 31 opposite from the second rotor core 32. A sensor magnet 42, which serves as a detected member, is fixed to an outer portion of the magnet fixing member 41. The sensor magnet 42 is configured such that north poles and south poles are alternately present in the circumferential direction (rotation direction) at predetermined angular intervals. In the front end plate 14, a hall IC 43 is provided at a position opposed to the sensor magnet 42 in the axial direction. If the hall IC 43 detects the sensor magnet 42, a rotation position of the rotor 21 can be detected.

Next, the operation of the brushless motor 11 having the above-described configuration will be described.

For example, when control is performed to change the valve timing in accordance with the operation condition of the vehicle when the vehicle is being driven, a three-phase drive current is supplied from the control circuit S to the windings 19 thereby generating a rotating field. Then, the rotor 21 is rotated and driven, and the variable valve timing apparatus 3 changes the valve timing (rotation phase of cam shaft relative to crankshaft of the engine 2).

Next, advantages of the first embodiment will be described.

(1) The variable valve timing apparatus 3 arranged in the vehicle engine room 1 includes the brushless motor 11. The annular magnet 33 of the rotor 21 in the brushless motor 11 is arranged between the first rotor core 31 and the second rotor core 32 in the axial direction. Since the annular magnet 33 is less likely to be affected by the ambient environment, even if the temperature in the vehicle engine room 1 becomes high, the annular magnet 33 is less likely to be demagnetized (irreversible temperature change). This allows for the execution of stable position control, that is, valve timing varying.

(2) The first and second claw-shaped magnetic poles 31b and 32b, which serve as the first and second magnetic pole portions, project radially outward from the outer portions of the substantially disk-shaped first and second core bases 31a and 32a, and extend in the axial direction to cover a radially outer surface of the annular magnet 33. Hence, the annular magnet 33 is further less likely to be affected by the ambient environment. Therefore, even if the temperature in the vehicle engine room 1 becomes high, the annular magnet 33 is further less likely to be demagnetized (irreversible temperature change).

(3) The annular magnet 33 is arranged radially inward from the outer portions of the disk-shaped first and second core bases 31a and 32a of the first and second rotor cores 31 and 32. Hence, the annular magnet 33 is further less likely to be affected by the ambient environment. Therefore, even if the temperature in the vehicle engine room 1 becomes high, the annular magnet 33 is further less likely to be demagnetized (irreversible temperature change).

(4) The number of poles of the rotor 21 is set to 2×n (wherein, n is a natural number), and the number of teeth 17a of the stator 16 is set to 3×n. Hence, a lowest common multiple becomes small. This allows for many first and second claw-shaped magnetic poles 31b and 32b to be opposed to the teeth 17a and allows for the detent torque to be increased. Hence, when the motor is not driven, it is possible to reduce rotation of the rotor 21 caused by vibration in the vehicle engine room 1.

The first embodiment may be modified as follows.

In the first embodiment, the annular magnet 33 is arranged radially inward from the outer portions of the disk-shaped first and second core bases 31a and 32a of the first and second rotor cores 31 and 32. However, this may be changed.

Figure 3A:
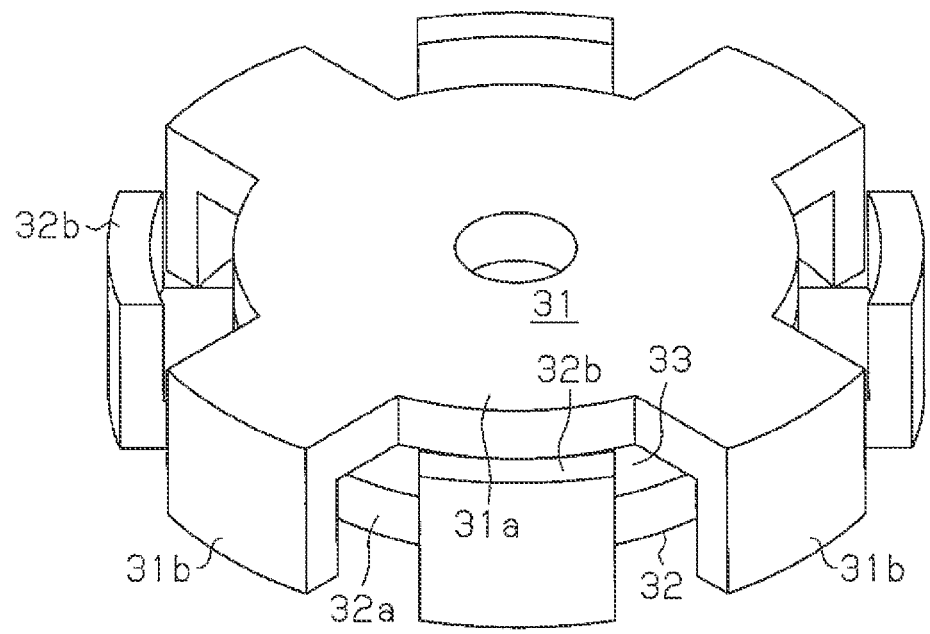
FIG. 3A is a perspective view of a rotor in another example of the first embodiment.
Figure 3B:
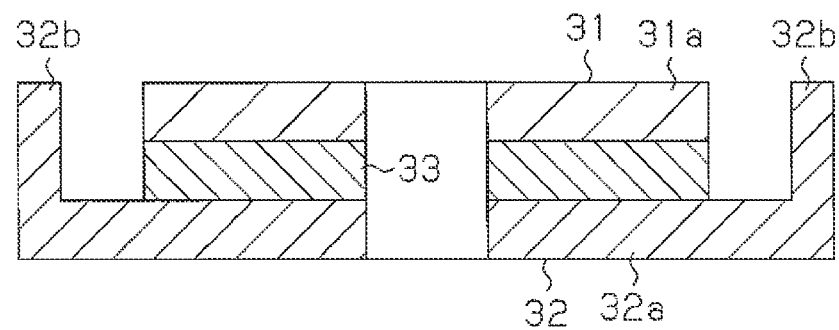
FIG. 3B is a cross-sectional view of the rotor shown in FIG. 3A.

For example, the outer diameter of the annular magnet 33 may be the same as the first and second core bases 31a and 32a as shown in FIGS. 3A and 3B. In this example (see FIGS. 3A and 3B), the thicknesses and the like of the members are also changed.

In the rotor 21 of the first embodiment, only the annular magnet 33 is a permanent magnet. Instead, the rotor may have other permanent magnets.

Figure 4A:
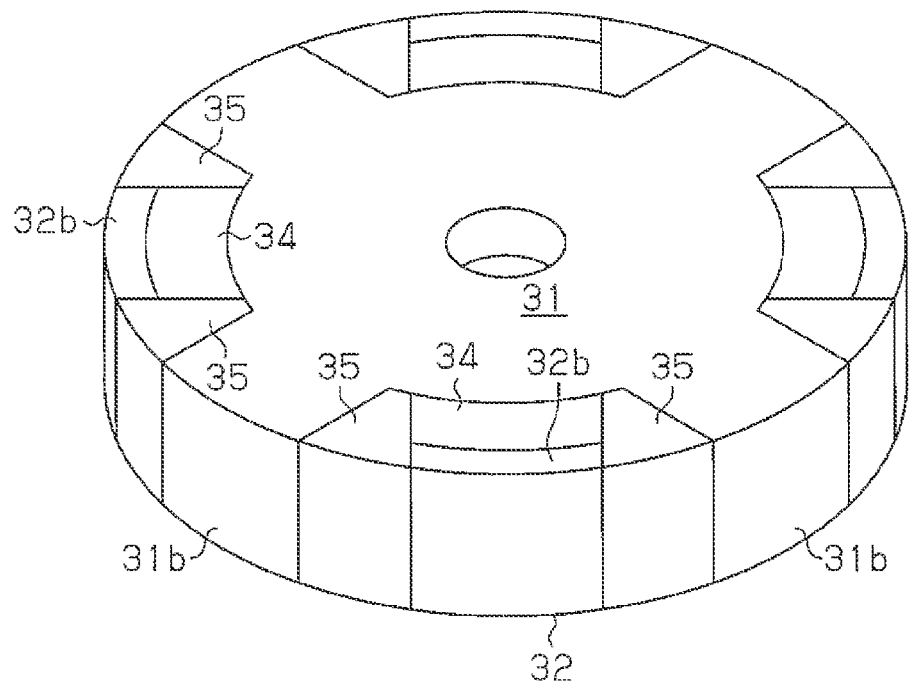
FIG. 4A is a perspective view of a rotor in another example of the first embodiment.
Figure 4B:
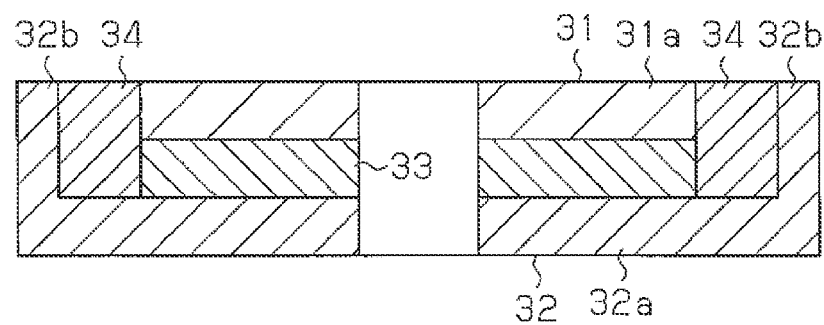
FIG. 4B is a cross-sectional view of the rotor shown in FIG. 4A.

For example, as shown in FIGS. 4A and 4B, back surface auxiliary magnets 34, which are magnetized in the radial direction, may be added to back surfaces (inner surfaces in the radial direction) of the first and second claw-shaped magnetic poles 31b and 32b in the above example (see FIGS. 3A and 3B), or interpolar magnets 35, which are magnetized in the circumferential direction, may be added between the first claw-shaped magnetic pole 31b and the second claw-shaped magnetic pole 32b in the circumferential direction.

In the first embodiment, the first magnetic pole portions and the second magnetic pole portions are the first and second claw-shaped magnetic poles 31b and 32b. Instead, the first magnetic pole portions and the second magnetic pole portions may be changed to magnetic pole portions having other shapes.

Figure 5A:
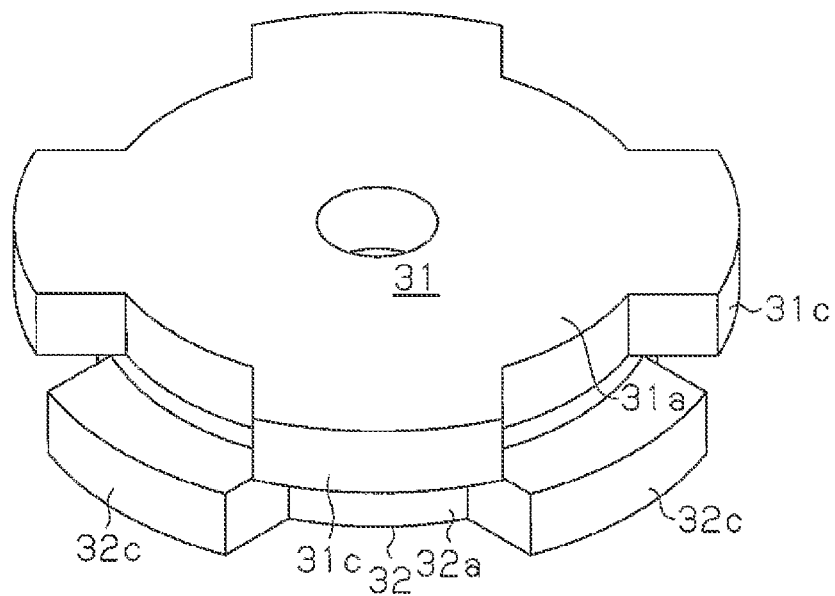
FIG. 5A is a perspective view of a rotor in another example of the first embodiment.
Figure 5B:
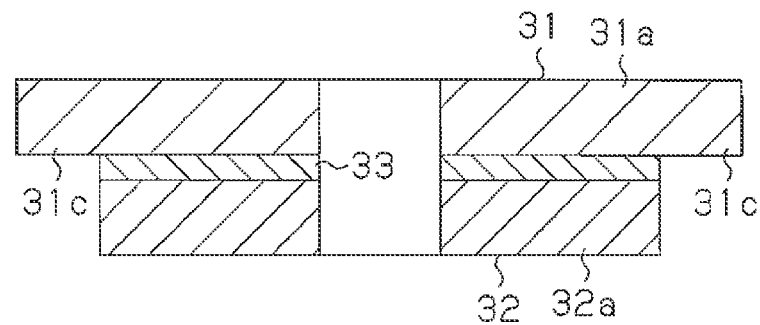
FIG. 5B is a cross-sectional view of the rotor shown in FIG. 5A.

For example, as shown in FIGS. 5A and 5B, the first magnetic pole portions and the second magnetic pole portions may be first and second projecting magnetic poles 31c and 32c, which project radially outward from the outer portions of the first and second core bases 31a and 32a (magnetic poles 31c and 32c do not extend in axial direction).

Cross-sectional shapes of the first and second claw-shaped magnetic poles 31b and 32b (first magnetic pole portions and second magnetic pole portions) in the first embodiment in a direction perpendicular to the radially outer surface do not have to be circles extending about the center axis of the rotation shaft 22 of the rotor 21.

Figure 6:
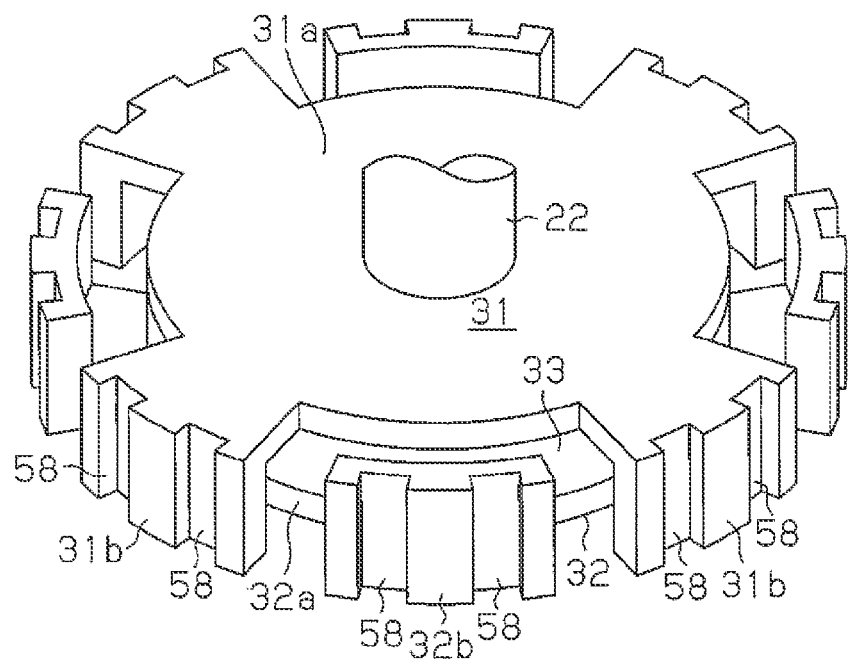
FIG. 6 is a perspective view of a rotor in another example of the first embodiment.

For example, the cross-sectional shapes may be changed as shown in FIG. 6. In this example, the radially outer surfaces of the first and second claw-shaped magnetic poles 31b and 32b have arcuate surfaces extending about the center axis of the rotation shaft 22, and the radially outer surfaces have two auxiliary grooves 58, which are recessed from the arcuate surfaces. In this example, the radially outer surfaces have the auxiliary grooves 58. Instead, the radially outer surfaces may be formed so as not to be entirely circular.

In this case, distances between the stator 16 (teeth 17a) and the surfaces of the first and second claw-shaped magnetic poles 31b and 32b that are rotated are varied.

Hence, as the distances are varied, a magnetic field is largely varied. This variation becomes a load during rotation and increases the detent torque. Hence, rotation of the rotor 21 by vibration in the vehicle engine room 1 when the motor is not driven is reduced.

Although the number of poles of the rotor 21 is set to "eight", and the number of the teeth 17a of the stator 16 is set to "twelve" in the first embodiment, the numbers may be changed. For example, the number of poles of the rotor 21 may be set to "four", and the number of the teeth 17a of the stator 16 may be set to "six". Alternatively, the number of poles of the rotor 21 may be set to "six", and the number of the teeth 17a of the stator 16 may be set to "nine". At least one of the following conditions does not have to be satisfied. That is, the condition that the number of poles of the rotor 21 is set to 2×n (wherein, n is a natural number), and the condition that the number of teeth 17a of the stator 16 is set to 3×n.

In the first embodiment, the present disclosure is applied to the brushless motor 11 for the variable valve timing apparatus 3, but the present disclosure may be applied to a brushless motor for other position control apparatus (e.g., throttle valve control apparatus) arranged in the vehicle engine room 1.

A second embodiment of the brushless motor will now be described with reference to FIGS. 7 to 13.

Figure 7:
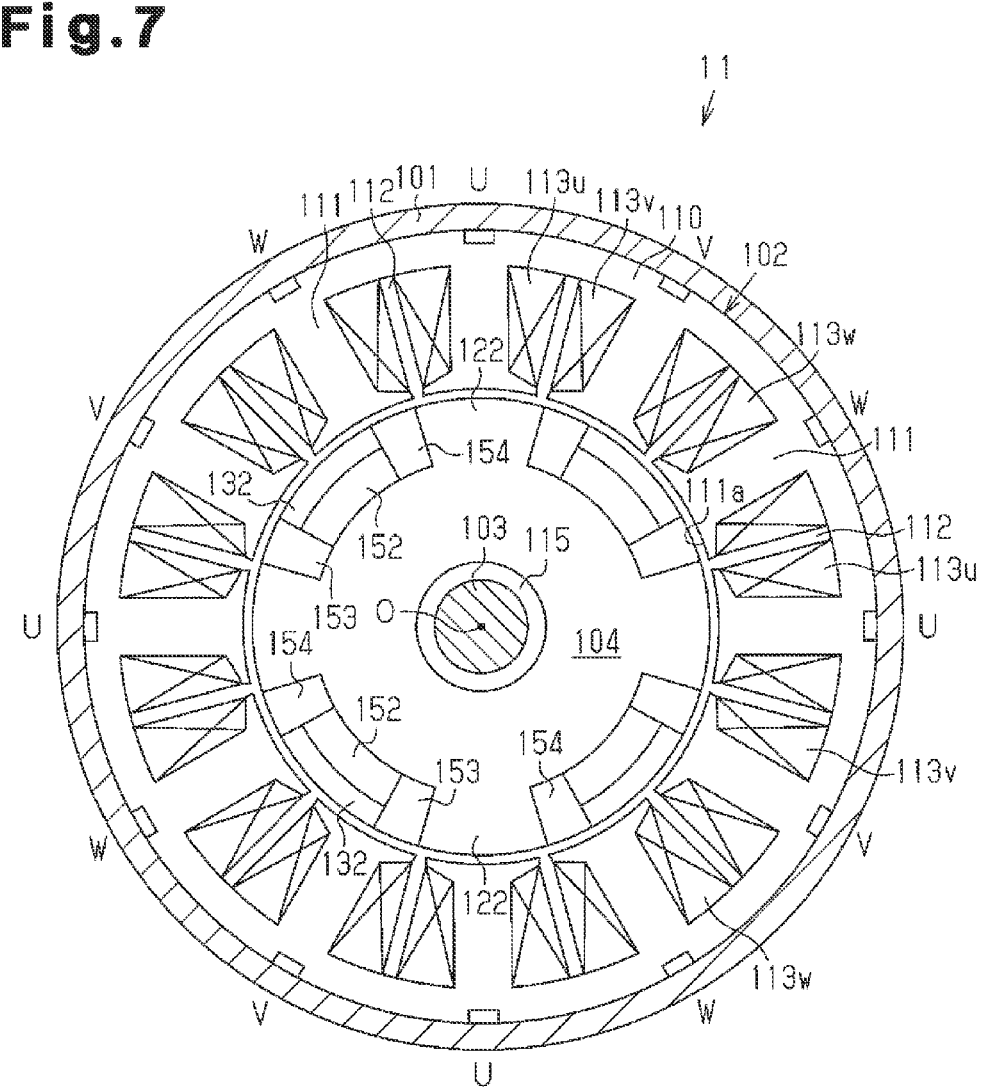
FIG. 7 is a cross-sectional view of a brushless motor according to a second embodiment of the present disclosure as viewed from its axial direction of the motor.
Figure 8A:
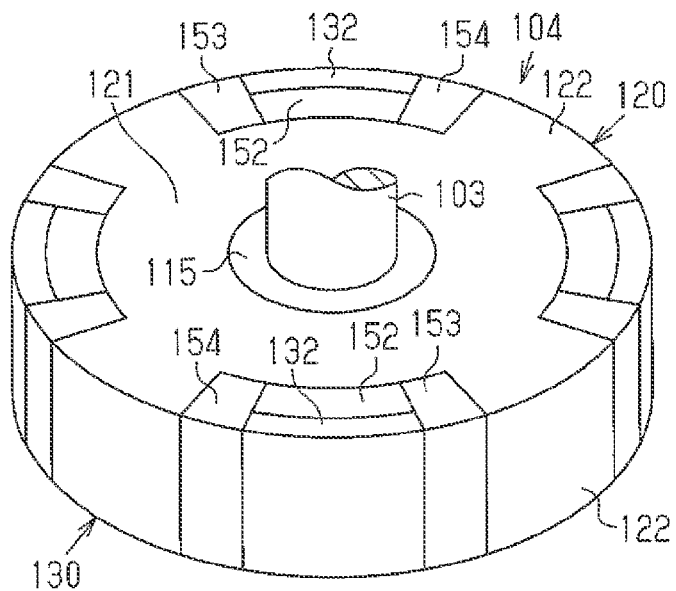
FIG. 8A is a perspective view of the rotor shown in FIG. 7 as viewed from a first rotor core.
Figure 8B:
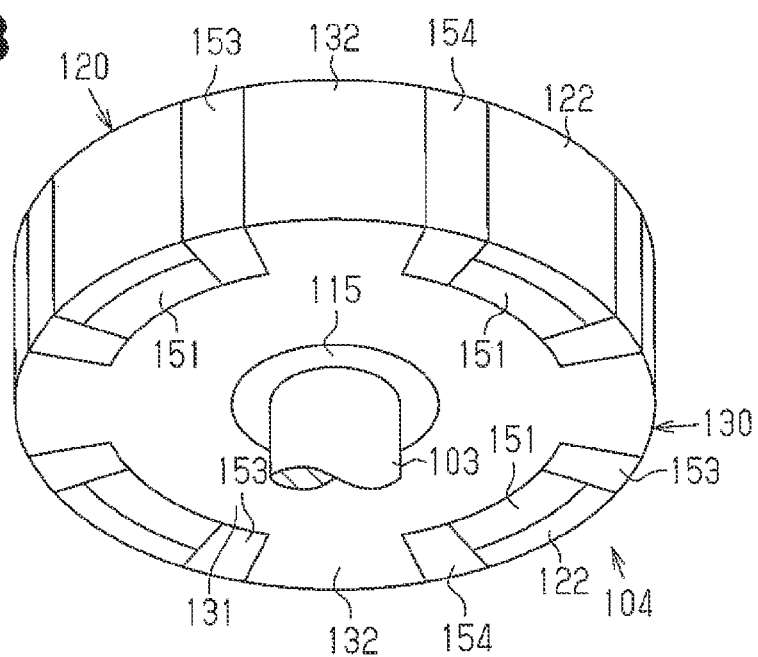
FIG. 8B is a perspective view of the rotor shown in FIG. 7 as viewed from a second rotor core.

As shown in FIG. 7, the brushless motor 11 includes a motor housing 101, a stator 102 fixed to an inner circumferential surface of the motor housing 101, a rotation shaft 103 located inside the stator 102, and a rotor 104 of a so-called Lundell-type structure which is fixed to the rotation shaft 103 and which integrally rotates together with the rotation shaft 103. The rotation shaft 103 is a non-magnetic stainless shaft. The rotation shaft 103 is supported by a bearing (not shown) provided on the motor housing 101 such that the rotation shaft 103 is rotatable relative to the motor housing 101.

The stator 102 includes a cylindrical stator core 110, and an outer circumferential surface of the stator core 110 is fixed to an inner surface of the motor housing 101. A plurality of teeth 111 are formed on an inner side of the stator core 110 in the axial direction. The teeth 111 are arranged in the circumferential direction with the same pitch. The teeth 111 extend radially inward. Each of the teeth 111 is a T-shaped tooth, and an inner circumferential surface 111a thereof in the radial direction is an arcuate surface formed by axially extending an arc of a circle extending about the center axis O of the rotation shaft 103.

Slots 112 are formed between the teeth 111. In the second embodiment, the number of the teeth 111 is twelve, and the number of the slots 112 is also twelve like the teeth 111. Three-phase windings, namely, U-phase windings 113u, V-phase windings 113v, and W-phase windings 113w are wound as concentrated windings around the twelve teeth 111 sequentially in the circumferential direction.

Figure 12:
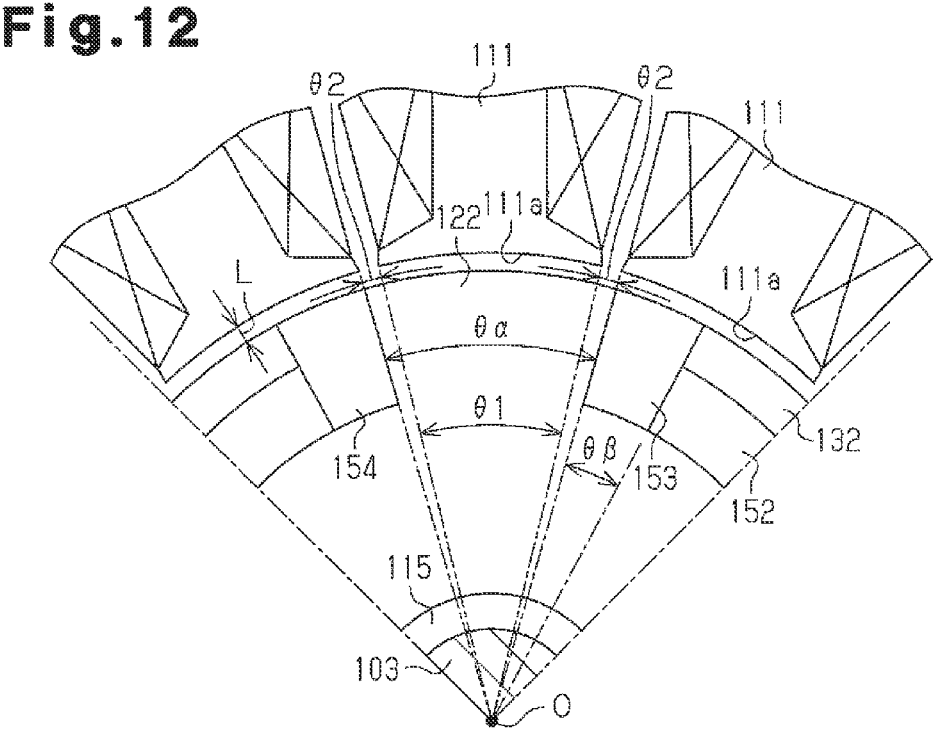
FIG. 12 is a diagram illustrating claw-shaped magnetic poles, interpolar magnets, and an opening angle of teeth shown in FIG. 7.

Here, as shown in FIG. 12, the angle between two ends of the inner circumferential surface 111a of each of the teeth 111 in the circumferential direction extending about the center axis O of the rotation shaft 103 is referred to as the first teeth-side opening angle θ1. The angle between the inner circumferential surfaces 111a of the adjacent teeth 111, i.e., between opposed ends of the inner circumferential surfaces 111a in the circumferential direction extending about the center axis O of the rotation shaft 103 is referred to as the second teeth-side opening angle θ2.

Three-phase power-supply voltage is applied to the wound windings 113u, 113v, and 113w to form a rotating field in the stator 102, and the rotor 104 fixed to the rotation shaft 103 arranged in the stator 102 is rotated in the forward direction (clockwise direction in FIG. 7) and rotated in the reverse direction (counterclockwise direction in FIG. 7).

As shown in FIGS. 8A to 11, the rotor 104 is arranged at the inner side of the stator 102 in an air gap over distance L (see FIG. 12). The rotor 104 includes a fixing cylinder 115, first and second rotor cores 120 and 130, and a field magnet 140.

Figure 10:
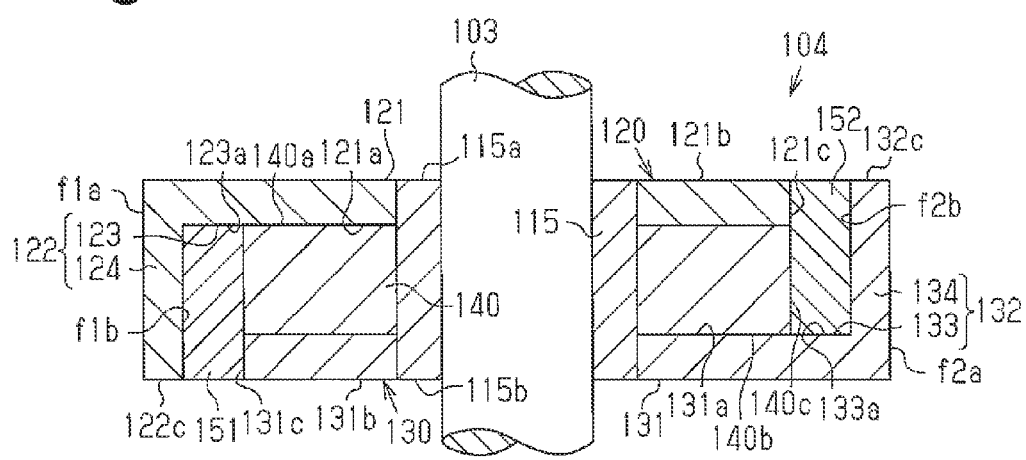
FIG. 10 is a combined cross-sectional view taken along line A-O-B in FIG. 9.
Figure 11:
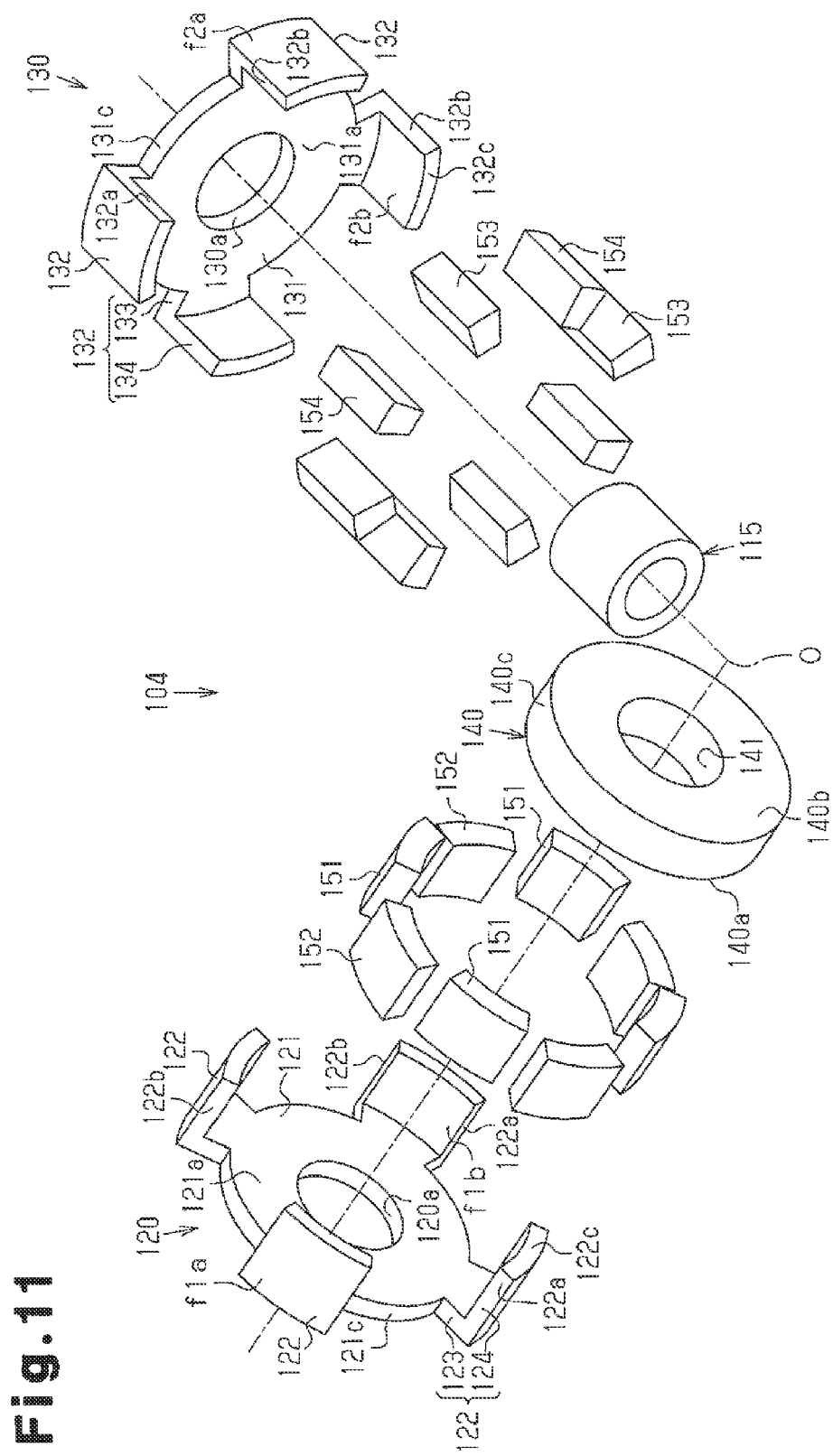
FIG. 11 is an exploded perspective view of the rotor shown in FIG. 7.

As shown in FIGS. 10 and 11, the fixing cylinder 115 is made of non-magnetic material. In the second embodiment, the fixing cylinder 115 is cylindrical in shape and is made of stainless material. An inner circumferential surface of the fixing cylinder 115 is bonded to an outer circumferential surface of the rotation shaft 103 under pressure and is fixed to the rotation shaft 103. The first and second rotor cores 120 and 130 and the field magnet 140 are arranged on an outer circumferential surface of the fixing cylinder 115.

The length of the fixing cylinder 115 in the axial direction is greater than that of the field magnet 140. The first and second rotor cores 120 and 130 and the field magnet 140 are combined with each other so that the field magnet 140 is arranged between the first and second rotor cores 120 and 130. In the second embodiment, the lengths of the first and second rotor cores 120 and 130 and the field magnet 140 in the axial direction conform to the length of the fixing cylinder 115.

As shown in FIG. 11, the first rotor core 120 includes a disk-shaped first core base 121 made of magnetic steel sheet which is soft magnetic material. A through bore 120a is formed in a center portion of the first core base 121. The through bore 120a, through which the fixing cylinder 115 extends, is adhered and fixed to the fixing cylinder 115 using non-magnetic adhesive (since fixing cylinder 115 is made of non-magnetic material, this adhesive may be magnetic adhesive). A plurality of (four in this embodiment) first claw-shaped magnetic poles 122 project radially outward from an outer circumferential surface 121c of the first core base 121 in equal intervals. The first claw-shaped magnetic poles 122 extend in the axial direction. Here, a portion of each of the first claw-shaped magnetic poles 122 that projects radially outward from the outer circumferential surface 121c of the first core base 121 is referred to as the first basal portion 123, and a distal end of the first claw-shaped magnetic pole 122 that is bent in the axial direction is referred to as the first magnetic pole portion 124.

Figure 9:
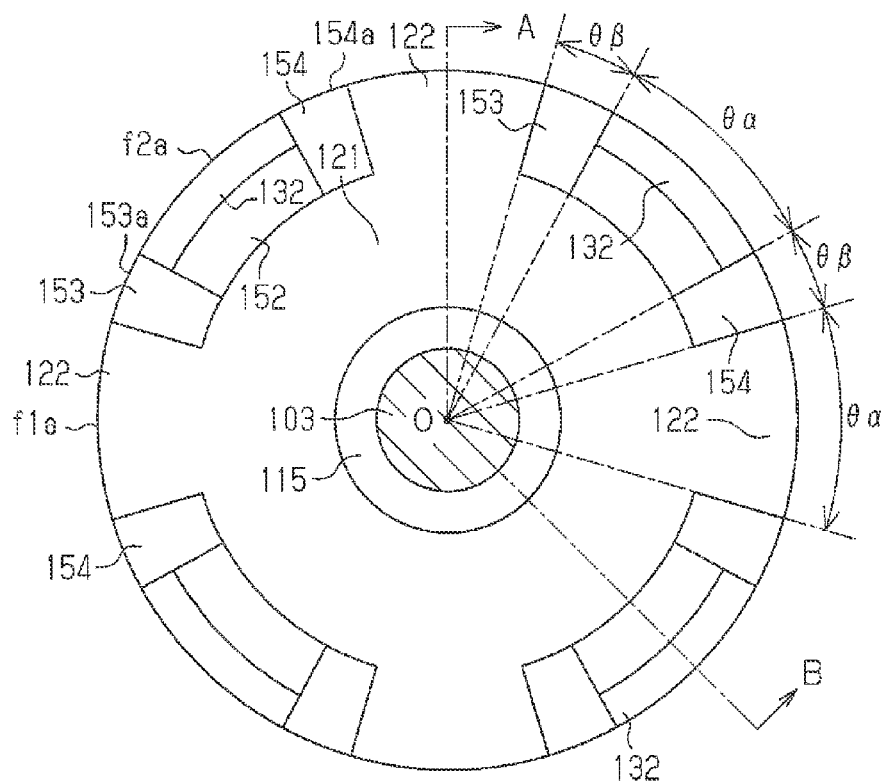
FIG. 9 is a front view of the rotor shown in FIG. 7 as viewed from its axial direction.

Both end surfaces 122a and 122b in the circumferential direction of the first claw-shaped magnetic pole 122 including the first basal portion 123 and the first magnetic pole portion 124 are radially extending flat surfaces. The angle of each of the first claw-shaped magnetic poles 122 in the circumferential direction extending about the center axis O of the rotation shaft 103, i.e., the angle between the two end surfaces 122a and 122b in the circumferential direction is set to be smaller than the angle of the distance between the first claw-shaped magnetic poles 122 which are adjacent to each other in the circumferential direction. Here, as shown in FIGS. 9 and 12, the angle of each of the first claw-shaped magnetic poles 122 in the circumferential direction extending about the center axis O of the rotation shaft 103 is referred to as the first rotor-side opening angle θα. The first rotor-side opening angle θα is set such that there is a fixed relationship between the first and second teeth-side opening angles θ1 and θ2, which will be described later.

The cross-section of a radially outer circumferential surface f1a of the first magnetic pole portion 124 in a direction perpendicular to the axis is an arc of a circle extending about the center axis O of the rotation shaft 103.

As shown in FIG. 11, the second rotor core 130 is made of the same material as that of the first rotor core 120 and has the same shape as that of the first rotor core 120. The second rotor core 130 has a disk-shaped second core base 131 formed from magnetic steel sheet. A through bore 130a is formed in a center portion of the second core base 131. The through bore 130a, through which the fixing cylinder 115 extends, is adhered and fixed to the fixing cylinder 115 using non-magnetic adhesive (since fixing cylinder 115 is made of non-magnetic material, this adhesive may be magnetic adhesive). Four second claw-shaped magnetic poles 132 project radially outward from an outer circumferential surface 131c of the second core base 131 in equal intervals.

The second claw-shaped magnetic poles 132 extend in the axial direction. Here, a portion of each of the second claw-shaped magnetic poles 132 that projects radially outward from the outer circumferential surface 131c of the second core base 131 is referred to as the second basal portion 133, and a distal end of the second claw-shaped magnetic pole 132 that is bent in the axial direction is referred to as the second magnetic pole portion 134.

Circumferential end surfaces 132a and 132b of the second claw-shaped magnetic pole 132 including the second basal portion 133 and the second magnetic pole portion 134 are flat surfaces that extend in the radial direction. The angle of each of the second claw-shaped magnetic poles 132 in the circumferential direction extending about the center axis O of the rotation shaft 103, i.e., the angle between the two circumferential end surfaces 132a and 132b is set to be smaller than an angle of a distance between the second claw-shaped magnetic poles 132 that are adjacent to each other in the circumferential direction. Here, the angle of the second claw-shaped magnetic pole 132 in the circumferential direction extending about the center axis O of the rotation shaft 103 is referred to as the first rotor-side opening angle θα like the first rotor core 120.

The cross-section of a radially outer circumferential surface f2 a of the second magnetic pole portion 134 in a direction perpendicular to the axis is an arc of a circle extending about the center axis O of the rotation shaft 103.

The second claw-shaped magnetic poles 132 are respectively arranged between the corresponding first claw-shaped magnetic poles 122. Here, the second rotor core 130 is coupled to the first rotor core 120 such that the field magnet 140 (see FIG. 10) is arranged between the first core base 121 and the second core base 131 in the axial direction.

As shown in FIGS. 10 and 11, the field magnet 140, which is held between the first rotor core 120 and the second rotor core 130, is a disk-shaped permanent magnet made of neodymium magnet.

As shown in FIG. 11, a through bore 141 is formed in a central position of the field magnet 140. The through bore 141, which the fixing cylinder 115 extends through, is adhered and fixed to the fixing cylinder 115 using non-magnetic adhesive (since fixing cylinder 115 is made of non-magnetic material, this adhesive may be magnetic adhesive). A side surface 140a of the field magnet 140 abuts against an opposing surface 121a of the first core base 121, another side surface 140b of the field magnet 140 abuts against an opposing surface 131a of the second core base 131, and the abutting surfaces are adhered and fixed to each other using magnetic adhesive through which magnetic flux extends.

The outer diameter of the field magnet 140 conforms to the outer diameters of the first and second core bases 121 and 131, and the thickness of the field magnet 140 is set to have a predetermined thickness.

More specifically, as shown in FIG. 10, when the field magnet 140 is arranged between the first rotor core 120 and the second rotor core 130, a distal end surface 122c of the first claw-shaped magnetic pole 122 (first magnetic pole portion 124) and a non-facing surface 131b of the second core base 131 are flush with each other. In the same manner, a distal end surface 132c of the second claw-shaped magnetic pole 132 (second magnetic pole portion 134) and a non-facing surface 121b of the first core base 121 are flush with each other. Further, an outer circumferential surface 140c of the field magnet 140 is flush with outer circumferential surfaces 121c and 131c of the first and second core bases 121 and 131.

As shown in FIG. 10, the field magnet 140 is magnetized in the axial direction such that a side of the field magnet 140 closer to the first rotor core is a north pole (first magnetic pole) and a side of the field magnet 140 closer to the second rotor core is a south pole (second magnetic pole). Therefore, the first claw-shaped magnetic poles 122 of the first rotor core 120 function as north poles (first magnetic poles) due to the field magnet 140, and the second claw-shaped magnetic poles 132 of the second rotor core 130 are made to function as south poles (second magnetic poles) due to the field magnet 140.

Therefore, the rotor 104 of the second embodiment is a rotor of a so-called Lundell-type structure using the field magnet 140. In the rotor 104, the first claw-shaped magnetic poles 122 which become north poles and the second claw-shaped magnetic poles 132 which become south poles are alternately arranged in the circumferential direction. The number of magnetic poles of the rotor 104 is eight.

As shown in FIG. 10, a first back surface auxiliary magnet 151 is arranged and fixed in a space formed by a back surface f1 b (radially inner surface) of the first magnetic pole portion 124, i.e., the outer circumferential surface 131c of the second core base 131, the outer circumferential surface 140c of the field magnet 140 and a surface 123a of the first basal portion 123 closer to the second rotor core 130.

The first back surface auxiliary magnet 151 has a sectoral and substantially box-shaped cross-section in a direction perpendicular to the axis of the first back surface auxiliary magnet 151. To reduce magnetic flux leakage at this location, the first back surface auxiliary magnet 151 is magnetized in the radial direction such that the pole of a portion of the auxiliary magnet 151 that abuts against the back surface f1 b of the first magnetic pole portion 124 becomes a north pole which is the same as the first claw-shaped magnetic pole 122, and the pole of a portion of the auxiliary magnet 151 that abuts against the second core base 131 becomes a south pole which is the same as the second core base 131.

As shown in FIG. 10, a second back surface auxiliary magnet 152 is arranged and fixed in a space formed by a back surface f2 b (radially inner surface) of the second magnetic pole portion 134, i.e., the outer circumferential surface 121c of the first core base 121, the outer circumferential surface 140c of the field magnet 140 and a surface 133a of the second basal portion 133 closer to the first rotor core 120.

The second back surface auxiliary magnet 152 has a sectoral and substantially box-shaped cross-section in a direction perpendicular to the axis of the second back surface auxiliary magnet 152. To reduce magnetic flux leakage at this location, the second back surface auxiliary magnet 152 is magnetized in the radial direction such that the pole of a portion of the auxiliary magnet 152 that abuts against the back surface f2 b of the second magnetic pole portion 134 becomes a south pole which is the same as the second claw-shaped magnetic pole 132, and the pole of a portion of the auxiliary magnet 152 that abuts against the first core base 121 becomes a north pole which is the same as the first core base 121.

First and second interpolar magnets 153 and 154 are arranged and fixed between the first claw-shaped magnetic pole 122 where the first back surface auxiliary magnet 151 is arranged and the second claw-shaped magnetic pole 132 where the second back surface auxiliary magnet 152 is arranged in the circumferential direction. The first and second interpolar magnets 153 and 154 have sectoral and substantially box-shaped cross-sections in directions perpendicular to their axes.

More specifically, the first interpolar magnet 153 is arranged between a flat surface, formed by a circumferential end surface 122a of the first claw-shaped magnetic pole 122 and a circumferential end surface of the first back surface auxiliary magnet 151, and a flat surface, formed by a circumferential end surface 132b of the second claw-shaped magnetic pole 132 and a circumferential end surface of the second back surface auxiliary magnet 152. The cross-section of a radially outer circumferential surface 153a of the first interpolar magnet 153 in a direction perpendicular to the axis of the radially outer circumferential surface 153a has an arc shape of a circle extending about the center axis O of the rotation shaft 103. The radially outer circumferential surface 153a and the radially outer circumferential surfaces f1 a and f2 a of the first magnetic pole portion 124 and the second magnetic pole portion 134 are flush with each other.

As shown in FIGS. 9 and 12, a circumferential angle of each of the first interpolar magnets 153 extending about the center axis O of the rotation shaft 103 is referred to as the second rotor-side opening angle $\theta\beta$. The second rotor-side opening angle $\theta\beta$ is set such that it has a fixed relationship between the first and second teeth-side opening angles $\theta1$ and $\theta2$ as will be described later.

In the same manner, the second interpolar magnet 154 is arranged between a flat surface, formed by the circumferential end surface 122b of the first claw-shaped magnetic pole 122, a circumferential end surface of the first back surface auxiliary magnet 151, and a flat surface, formed by a circumferential end surface 132a of the second claw-shaped magnetic pole 132 and a circumferential end surface of the second back surface auxiliary magnet 152. The cross-section of a radially outer circumferential surface 154a of the second interpolar magnet 154 in a direction perpendicular to the axis of the radially outer circumferential surface 154a has an arc shape of a circle extending about the center axis O of the rotation shaft 103. The radially outer circumferential surface 154a and the radially outer circumferential surfaces f1 a and f2 a of the first magnetic pole portion 124 and the second magnetic pole portion 134 are flush with each other.

Here, as shown in FIG. 9, a circumferential angle of each of the second interpolar magnets 154 extending about the center axis O of the rotation shaft 103 is referred to as the second rotor-side opening angle $\theta\beta$ like the first interpolar magnet 153.

The first and second interpolar magnets 153 and 154 are magnetized in the circumferential direction such that they have the same magnetic poles as the first and second claw-shaped magnetic poles 122 and 132 (first claw-shaped magnetic pole becomes a north pole and second claw-shaped magnetic pole becomes a south pole).

Next, variations in the output of the brushless motor 11 when changing the first and second rotor-side opening angles $\theta\alpha$ and $\theta\beta$ with respect to the first and second teeth-side opening angles $\theta1$ and $\theta2$ will be discussed.

An experiment was carried out to study variations in the output of the brushless motor 11.

In the brushless motor 11, the number of the teeth 111 was twelve, and the number n of magnetic poles of the rotor 104 was eight. The first teeth-side opening angle $\theta1$ was fixed and the first rotor-side opening angle $\theta\alpha$ was changed within a range from $\theta\alpha=0°$ to $\theta\alpha=360/n=45°$ to study variations in the output torque.

Figure 13:
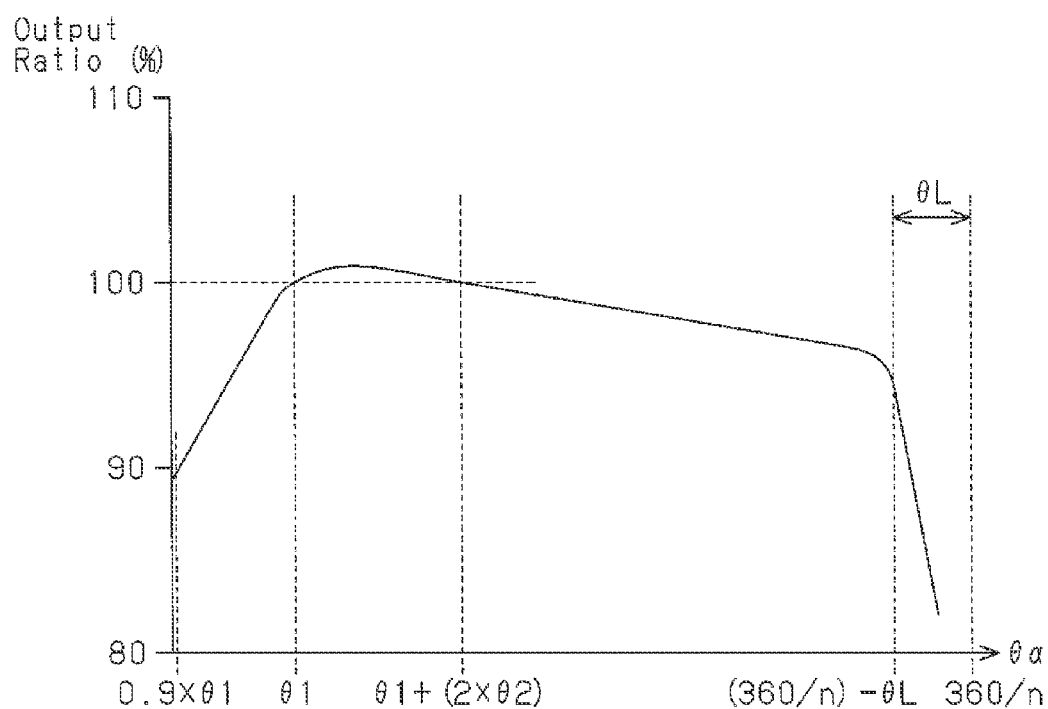
FIG. 13 is a diagram showing the relationship between the first teeth-side opening angle in FIG. 12, a first rotor-side opening angle, and torque.

FIG. 13 is a graph showing the output torque when the first teeth-side opening angle $\theta1$ obtained through the experiment was fixed and the first rotor-side opening angle $\theta\alpha$ was varied.

The horizontal axis shows the first rotor-side opening angle $\theta\alpha$. The vertical axis shows, in percentage, the output torque ratio (%) using the output torque of the brushless motor 11 as a reference (100%) when the first rotor-side opening angle $\theta\alpha$ was the same as the first teeth-side opening angle $\theta1$ ($\theta\alpha=\theta1$).

The following is apparent from FIG. 13.

$$0<\theta\alpha<\theta1$$

If the first rotor-side opening angle $\theta\alpha$ is increased from $\theta\alpha=0$ to $\theta\alpha=\theta1$, the output torque also increases as the first rotor-side opening angle $\theta\alpha$ increases.

It is considered that this is because an increase in the area of the radial outer circumferential surface f1a (f2a) of the first magnetic pole portion 124 (second magnetic pole portion 134) opposed to inner circumferential surfaces 111a of the tooth 111 relatively increases the output torque.

$$\theta1\leq\theta\alpha\leq\theta1+2\times\theta2$$

Until the first rotor-side opening angle $\theta\alpha$ increases from $\theta\alpha=\theta1$ to $\theta\alpha=\theta1+(2\times\theta2)$, the value of the output torque (%) is maintained at 100% or greater.

It is considered that this is because the output torque is in a saturated state since the radially outer circumferential surface f1a (f2a) of the first magnetic pole portion 124 (second magnetic pole portion 134) becomes greater than an area of the inner circumferential surfaces 111a and the radially outer circumferential surface f1a (f2a) does not extend over the inner circumferential surfaces 111a of the three teeth 111.

$$\theta1+2\times\theta2<\theta\alpha<(360/n)-\theta L$$

Until the first rotor-side opening angle $\theta\alpha$ reaches $\theta\alpha=(360/n)-\theta L=45-\theta L$ from $\theta\alpha=\theta1+(2\times\theta2)$, the output torque (%) gradually decreases.

It is considered that this is because the radially outer circumferential surface f1a (f2a) of the first magnetic pole portion 124 (second magnetic pole portion 134) is gradually opposed to the inner circumferential surfaces 111a of the three teeth 111 at the same time, and a magnetic circuit that short-circuits the three-phase magnetic flux is generated and reduces the output torque.

Here, $\theta L$ is the angle of the second rotor-side opening angle $\theta\beta$ when circumferential lengths (arc lengths) of the radially outer circumferential surfaces 153a and 154a of the first and second interpolar magnets 153 and 154 become equal to a distance L of an air gap between the stator 102 and the rotor 104.

$$(360/n)-\theta L\leq\theta\alpha\leq(360/n)$$

If the first rotor-side opening angle θα becomes equal to or greater than θα=(360/n)−θL, the output torque (%) suddenly decreases to 90% or less.

It is considered that this is because the distance (arc length) between the first magnetic pole portion 124 and the second magnetic pole portion 134 becomes shorter than the distance L of the air gap, the magnetic flux is short-circuited between the first magnetic pole portion 124 and the second magnetic pole portion 134, i.e., the magnetic flux of the rotor 104 (magnetic pole portion) is not effectively guided to the stator 102 (teeth 111), and the output torque of the brushless motor 11 is suddenly decreased.

From a result of the experiment, it was found that if the first rotor-side opening angle θα was in the range of θ1≤θα<(360/n)−θL, the brushless motor 11 could be driven.

If the first rotor-side opening angle θα is set to a value between θ1≤θα≤θ1+(2×θ2), high output torque can be obtained.

Especially, if the first rotor-side opening angle θα is set to θα=θ1+(2×θ2), as the rotor 104 rotates, the first magnetic pole portion 124 (second magnetic pole portion 134) separates from the teeth 111 to which the first magnetic pole portion 124 (second magnetic pole portion 134) is opposed and at the same time, the first magnetic pole portion 124 (second magnetic pole portion 134) approaches an adjacent tooth 111. Hence, if the first rotor-side opening angle θα is set to θα=θ1+(2×θ2), cogging torque can be reduced. Further, since the first and second interpolar magnets 153 and 154 can be reduced in size, costs of the magnets can be reduced.

If the first rotor-side opening angle θα is determined, the second rotor-side opening angle θβ is directly determined. That is, the second rotor-side opening angle θβ is obtained by the following equation:

$$\theta\beta=(360/n)-(\theta1+2\times\theta2)$$

From this reason, when the first rotor-side opening angle θα is within a range of θ1≤θα≤θ1+(2×θ2), the second rotor-side opening angle θβ is within the following range:

$$(360/n)-(\theta1+2\times\theta2)\leq\theta\beta\leq(360/n)-\theta1$$

At this time, the number n of magnetic poles is eight. Therefore, θβ=(360/8)−(θ1+2×θ2)=45−(θ1+2×θ2).

Here, the following (Example 1) and (Example 2) will be described based on numeric values of the first teeth-side opening angle θ1.

EXAMPLE 1

When the first teeth-side opening angle θ1 is 27° and the second teeth-side opening angle θ2 is 3°, the first rotor-side opening angle θα becomes as follows.

That is, from θα=θ1=27° and θα=θ1+(2×θ2)=33°, when the first rotor-side opening angle θα is within a range of 27°≤θα≤33°, high output torque can be obtained.

At this time, if viewed from the second rotor-side opening angle θβ, when θα=θ1=27°, θβ becomes 18°, and when θα=θ1=33°, θβ becomes 12°. That is, when the second rotor-side opening angle θβ is in a range of 12°≤θβ≤18°, high output torque can be obtained.

When the first rotor-side opening angle θα is (360/8)−θL, the second rotor-side opening angle θβ becomes θL.

EXAMPLE 2

For example, when the first teeth-side opening angle θ1 is 28° and the second teeth-side opening angle θ2 is 2°, the first rotor-side opening angle θα becomes as follows.

From θα=θ1=28° and θα=θ1+(2×θ2)=32°, when the first rotor-side opening angle θα is within a range of 28°≤θα≤32°, high output torque can be obtained.

If this situation is viewed from the second rotor-side opening angle θβ, when θα=θ1=28°, θβ becomes 17°, and when θα=θ1=32°, θβ becomes 13°. That is, when the second rotor-side opening angle θβ is within a range of 13°≤θβ≤17°, high output torque can be obtained.

When the first rotor-side opening angle θα is θα=(360/8)−θL, the second rotor-side opening angle θβ becomes θβ=θL.

Next, an assembling method of the rotor 104 of the brushless motor 11 having the above-described configuration will be described.

First, the fixing cylinder 115 is inserted into the through bore 141 of the field magnet 140 to a predetermined position. At this insertion position, an outer circumferential surface of the fixing cylinder 115 and an inner circumferential surface of the through bore 141 of the field magnet 140 are adhered and fixed to each other using a non-magnetic adhesive.

Next, the fixing cylinder 115 is inserted into the through bore 120a of the first rotor core 120 (first core base 121) such that the opposing surface 121a of the first core base 121 and the side surface 140a of the field magnet 140 are opposed to each other. The opposing surface 121a of the first core base 121 and the side surface 140a of the field magnet 140 are adhered and fixed to each other using magnetic adhesive, an inner circumferential surface of the through bore 120a of the first core base 121 and an outer circumferential surface of the fixing cylinder 115 are adhered and fixed to each other using non-magnetic adhesive. At this time, an annular first end surface 115a of the fixing cylinder 115 closer to the first core base is flush with the non-facing surface 121b of the first core base 121.

Next, the fixing cylinder 115 is inserted into the through bore 130a of the opposing surface 131a of the second core base 131 and the second rotor core 130 (second core base 131) such that the opposing surface 131a of the second core base 131 and the side surface 140b of the field magnet 140 are opposed to each other.

While adjusting a relative position in the circumferential direction with the first rotor core 120 which is fixed first, the opposing surface 131a of the second core base 131 and the side surface 140b of the field magnet 140 are adhered and fixed to each other using a magnetic adhesive, and an inner circumferential surface of the through bore 130a of the second core base 131 and the outer circumferential surface of the fixing cylinder 115 are adhered and fixed to each other using non-magnetic adhesive.

At this time, an annular second end surface 115b of the fixing cylinder 115 closer to the second core base is flush with the non-facing surface 131b of the second core base 131.

As a result, the first and second rotor cores 120 and 130 are adhered and fixed to the field magnet 140, and the first rotor core 120, the second rotor core 130 and the field magnet 140 are adhered and fixed to the fixing cylinder 115.

A module in which the first rotor core 120, the second rotor core 130, the field magnet 140 and the fixing cylinder 115 are integrally formed is coupled to the rotation shaft 103.

More specifically, the first rotor core 120, the second rotor core 130 and the field magnet 140 are fixed to the fixing cylinder 115, the rotation shaft 103 is press-fitted into the fixing cylinder 115 up to a predetermined position, and the fixing cylinder 115 is fixed to the rotation shaft 103. When the rotation shaft 103 is press-fitted into the fixing cylinder 115, the fixing cylinder 115 and the rotation shaft 103 are first arranged in line so that the center axis O of the rotation shaft 103 and the center axis of the fixing cylinder 115 are aligned with each other.

Next, in a state where one of openings of the fixing cylinder 115, e.g., the second end surface 115b is arranged on the rotation shaft 103, the annular first end surface 115a of the fixing cylinder 115 is pressed in the axial direction using a cylindrical jig. If the first end surface 115a of the fixing cylinder 115 is pressed by the cylindrical jig, the rotation shaft 103 is press-fitted into one of the openings of the fixing cylinder 115.

If the fixing cylinder 115 is press-fitted into the rotation shaft 103 to a predetermined position, a press-fitting and fixing operation of the module including the first rotor core 120, the second rotor core 130, the field magnet 140, and the fixing cylinder 115 into the rotation shaft 103 is completed, and the assembling operation of the rotor 104 is completed.

Next, the operation of the brushless motor 11 configured as described above will be described.

In the brushless motor 11, three-phase power-supply voltage is applied to the three-phase windings 113u, 113v, and 113w which are wound around the teeth 111 of the stator core 110. This forms a rotating field in the stator 102, and the rotor 104 fixed to the rotation shaft 103 arranged in the stator 102 is rotated based on the rotating field.

At this time, if the first rotor-side opening angle $\theta\alpha$ is set in a range of $\theta1 \le \theta\alpha \le \theta1+(2\times\theta2)$, the radially outer circumferential surface f1a (f2a) of first magnetic pole portion 124 (second magnetic pole portion 134) straddles the inner circumferential surfaces 111a of the three teeth 111, and the radially outer circumferential surface f1a (f2a) is not opposed to the inner circumferential surfaces 111a of the three teeth 111. Therefore, by setting the first rotor-side opening angle $\theta\alpha$ in the range of $\theta1 \le \theta\alpha \theta1+(2\times\theta2)$, high output torque can be obtained.

Further, if the first rotor-side opening angle $\theta\alpha$ is set to $\theta\alpha=\theta1+(2\times\theta2)$, as the rotor 104 rotates, the first magnetic pole portion 124 (second magnetic pole portion 134) which is opposed to one of the teeth 111 separates from that tooth 111. At the same time, the first magnetic pole portion 124 (second magnetic pole portion 134) approaches an adjacent tooth 111. Hence, if the first rotor-side opening angle $\theta\alpha$ is set to $\theta\alpha=\theta1+(2\times\theta2)$, cogging torque can be reduced.

The first rotor-side opening angles $\theta\alpha$ of the first and second magnetic pole portions 124 and 134 configuring the first and second claw-shaped magnetic poles 122 and 132 are set in a range of $\theta1 \le \theta\alpha < (360/n)-\theta L$. Thus, output torque capable of driving the brushless motor 11 can be obtained.

In the rotor 104, the module composed of the first rotor core 120, the second rotor core 130, the field magnet 140 and the fixing cylinder 115 is fixed to the rotation shaft 103 through the fixing cylinder 115. Therefore, it becomes easy to assemble the rotor 104 into the rotation shaft 103 of the module.

Further, the axial length of the fixing cylinder 115 is set to be the same as the axial lengths of the first rotor core 120, the second rotor core 130, and the field magnet 140, which are combined so that the field magnet 140 is arranged between the first rotor core 120 and the second rotor core 130. Thus, the module is rigidly connected to the rotation shaft 103, and it is possible to prevent vibration and noise of the rotor 104 caused by rotation. The fixing cylinder 115 having a long axial length is made of non-magnetic material. This prevents magnetic flux of the field magnet 140 from leaking toward the rotation shaft as a leakage magnetic flux.

When the rotation shaft 103 is press-fitted into and fixed to the module, the field magnet 140 is adhered to the fixing cylinder 115. Thus, when the rotation shaft 103 is press-fitted into the module, a load is not applied directly to the field magnet 140. This avoids damages inflicted to the field magnet 140 by a load.

Further, the first and second rotor cores 120 and 130 are adhered and fixed to the field magnet 140 using magnetic adhesive. Thus, magnetic resistance between the first and second rotor cores 120 and 130 and the field magnet 140 can be reduced. Further, it is possible to easily and accurately adjust relative positions of the first magnetic pole portion 124 of the first rotor core 120 and the second magnetic pole portion 134 of the second rotor core 130 in the circumferential direction. As a result, the brushless motor 11 generates smooth rotation.

Further, the first and second rotor cores 120 and 130 and the field magnet 140 are adhered and fixed to the fixing cylinder 115 using a non-magnetic adhesive. Thus, it is possible to prevent a leakage magnetic flux by the non-magnetic adhesive together with the rotation shaft 103 and the fixing cylinder 115 which are made of non-magnetic material.

Next, advantages of the second embodiment in addition to advantage (1) of the first embodiment will be described below.

(5) In the second embodiment, the first rotor-side opening angle $\theta\alpha$ is set in the range of $\theta1 \le \theta\alpha < (360/n)-\theta L$. Thus, it is possible to obtain output torque capable of driving the brushless motor 11.

If the first rotor-side opening angle $\theta\alpha$ is set in the range of $\theta1 \le \theta\alpha \le \theta1+(2\times\theta2)$, it is possible to realize the brushless motor 11 with high output torque. Especially, if the first rotor-side opening angle $\theta\alpha$ is set to $\theta\alpha=\theta1+(2\times\theta2)$, it is possible to realize the brushless motor 11 that reduces cogging torque.

(6) In the second embodiment, the first rotor core 120, the second rotor core 130, and the field magnet 140 are coupled the fixing cylinder 115 and modularized. Therefore, the rotor 104 may be formed just by press-fitting and fixing the rotation shaft 103 into the fixing cylinder 115. Therefore, the assembling operation of the rotor 104 becomes extremely easy. Further, since the field magnet 140 is adhered to the fixing cylinder 115, a load produced when press fitting the rotation shaft 103 is not applied directly to the field magnet 140. Therefore, the field magnet 140 is not damaged during the coupling operation.

Further, the axial length of the fixing cylinder 115 is set to the same axial length as the first rotor core 120, the second rotor core 130, and the field magnet 140 combined with each other so that the field magnet 140 is arranged between the first rotor core 120 and the second rotor core 130. Therefore, the first and second rotor cores 120 and 130 and the field magnet 140 are fixed to the rotation shaft 103 through the fixing cylinder 115 to form a rigid structure, and it is possible to prevent vibration and noise of the rotor 104 caused by rotation.

(7) In the second embodiment, the first and second rotor cores 120 and 130 are adhered and fixed to the field magnet 140. Thus, it is possible to easily and accurately adjust the relative positions of the first magnetic pole portion 124 of the first rotor core 120 and the second magnetic pole portion 134 of the second rotor core 130 in the circumferential direction. As a result, the brushless motor 11 produces smooth rotation.

(8) In the second embodiment, the first and second rotor cores 120 and 130 are adhered and fixed to the field magnet 140 using a magnetic adhesive. Thus, magnetic resistance between the first and second rotor cores 120 and 130 and the field magnet 140 can be reduced.

(9) In the second embodiment, the first and second rotor cores 120 and 130 and the field magnet 140 are adhered and fixed to the fixing cylinder 115 using a non-magnetic adhesive. Hence, magnetic flux leakage is inhibited by the non-magnetic adhesive together with the rotation shaft 103 and the fixing cylinder 115, which are made of non-magnetic material.

The second embodiment may be modified as follows.

Although the rotor 104 is provided with the first and second back surface auxiliary magnets 151 and 152 in the second embodiment, the first and second back surface auxiliary magnets 151 and 152 may be omitted.

Although the rotor 104 is provided with the first and second interpolar magnets 153 and 154 in the second embodiment, the first and second interpolar magnets 153 and 154 may be omitted. The first and second back surface auxiliary magnets 151 and 152 may also be omitted.

Although the rotor 104 is fixed to the rotation shaft 103 through the fixing cylinder 115 in the second embodiment, the fixing cylinder 115 may be omitted. For example, the rotation shaft 103 may be press-fitted into and fixed to the first and second rotor cores 120 and 130. At that time, the field magnet 140 is sandwiched and fixed between the first and second rotor cores 120 and 130.

Figure 14:
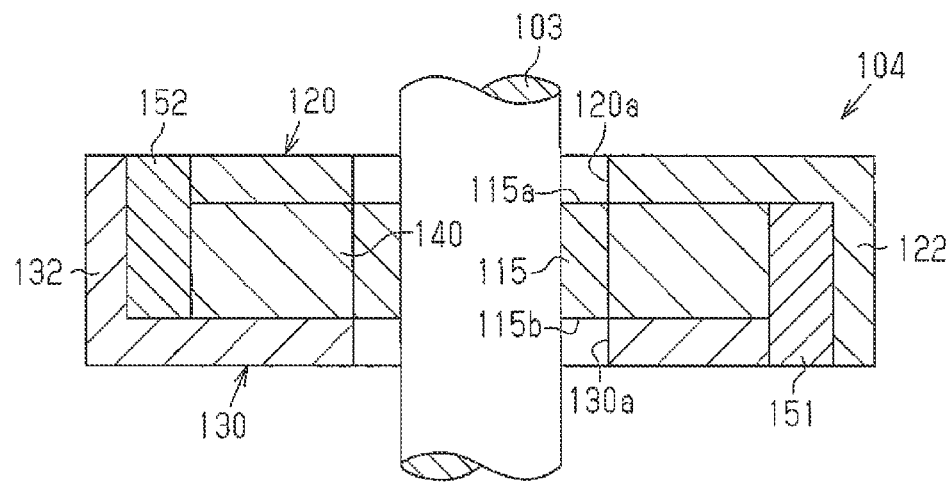
FIGS. 14 and 15 are diagrams illustrating another example of the rotor of the second embodiment.
Figure 15:
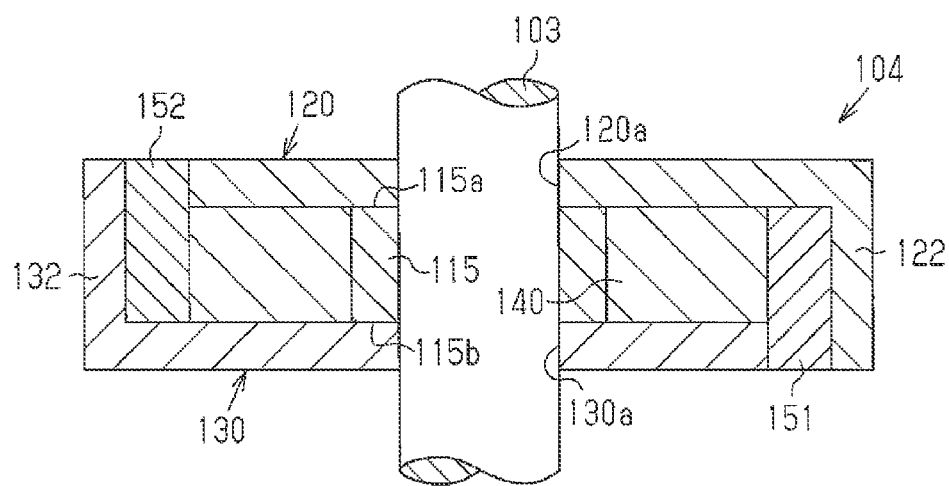

In the second embodiment, the axial length of the fixing cylinder 115 is set to the same axial length as the first rotor core 120, the second rotor core 130, and the field magnet 140, which are combined so that the field magnet 140 is arranged between the first rotor core 120 and the second rotor core 130. Instead, as shown in FIG. 14, the length of the fixing cylinder 115 may be the same as the thickness (length in axial direction) of the field magnet 140. In this case, the outer circumferential surface of the fixing cylinder 115 is adhered and fixed to the inner circumferential surface of the through bore 141 of the field magnet 140 using non-magnetic adhesive (since the fixing cylinder 115 is made of non-magnetic material, the adhesive may be magnetic adhesive). The first and second rotor cores 120 and 130 are fixed to the field magnet 140 using a magnetic adhesive. At this time, as shown in FIG. 14, a gap is formed between the outer circumferential surface of the rotation shaft 103 and the inner circumferential surfaces of the through bores 120a and 130a of the first and second rotor cores 120 and 130. In such a configuration, as shown in FIG. 15, inner diameters of the first and second rotor cores 120 and 130 should be set to such values that the inner circumferential surfaces of the through bores 120a and 130a can slide on the rotation shaft 103. The outer circumferential surface of the fixing cylinder 115 and the inner circumferential surfaces of the through bores 120a and 130a of the first and second rotor cores 120 and 130 may be adhered and fixed to each other using non-magnetic adhesive (since the rotation shaft 103 is made of non-magnetic material, the adhesive may be magnetic adhesive).

A third embodiment of the brushless motor including a rotor will now be described with reference to FIGS. 16 to 19. The brushless motor of the third embodiment is partially in common with the brushless motor 11 of the first embodiment. Therefore, only portions of the brushless motor that differ from the first embodiment will be described in detail, and description of the common portions will be omitted for the sake of convenience.

Figure 17:
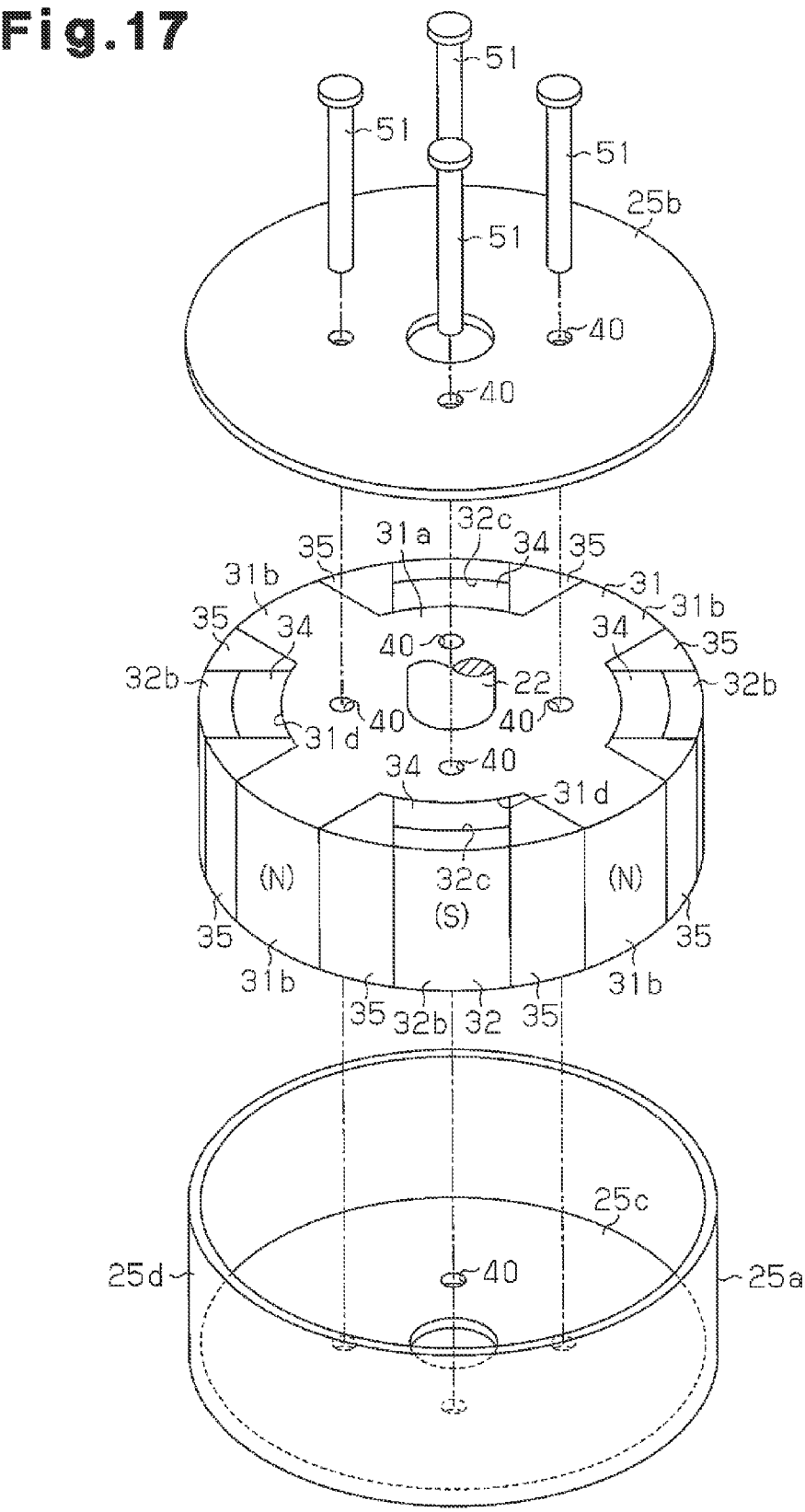
FIG. 17 is an exploded perspective view of a rotor shown in FIG. 16.
Figure 18:
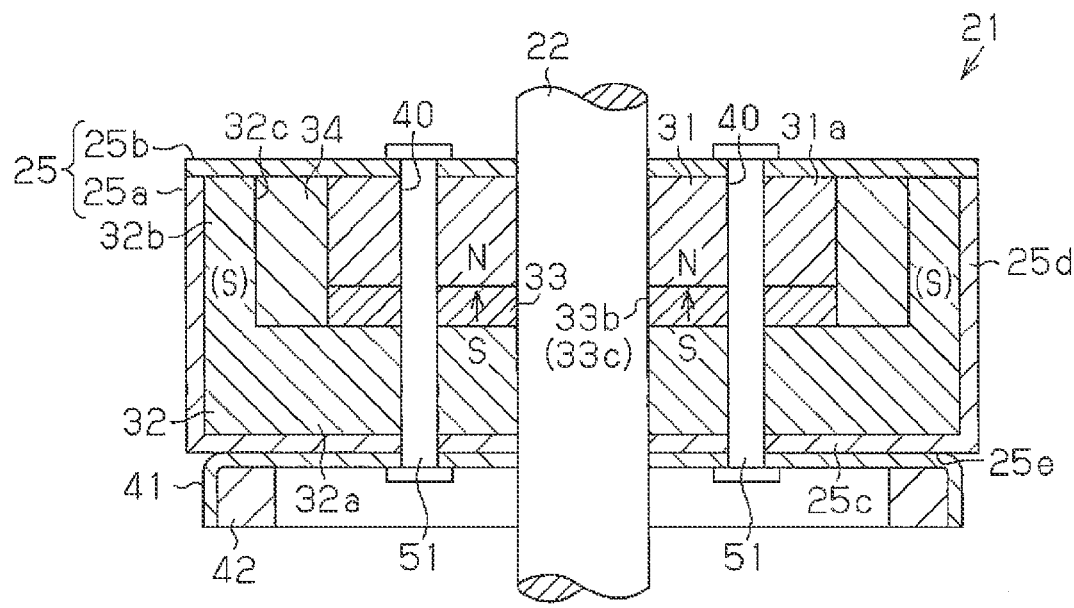
FIG. 18 is a cross-sectional view of the rotor shown in FIG. 17.

As shown in FIGS. 17 and 18, a rotor 21 includes, in a rotor case 25 (shatterproof cover), first and second rotor cores 31 and 32, an annular magnet 33, back surface auxiliary magnets 34 and interpolar magnets 35. The rotor case 25 is made of non-magnetic material, and includes a cylindrical rotor-side housing 25a, which has a closed end, and a disk-shaped lid 25b, which closes the open end of the rotor-side housing 25a. The rotor-side housing 25a includes a disk-shaped bottom 25c and a cylindrical portion 25d, which extends from one side surface of the bottom 25c in an axial direction of the rotation shaft 22. Solid line arrows in FIG. 18 show the magnetization direction (from south pole to north pole) of the annular magnet 33.

As shown in FIGS. 17 and 18, back surface auxiliary magnets 34 are arranged between back surfaces 32i (radially inner surfaces) of second claw-shaped magnetic poles 32b and outer circumferential surfaces 31d of the first core base 31a. Each of the back surface auxiliary magnets 34 provided on the back surfaces of the second claw-shaped magnetic poles 32b is magnetized such that a portion of the back surface auxiliary magnet 34 that abuts against the second claw-shaped magnetic pole 32b becomes a south pole and a portion of the back surface auxiliary magnet 34 that abuts against the outer circumferential surface of the first core base 31a becomes a north pole. Although not illustrated in the drawings, the back surface auxiliary magnets 34 are arranged between the back surfaces (radially inner surfaces) of the first claw-shaped magnetic poles 31b and an outer circumferential surface of a second core base 32a like the second claw-shaped magnetic pole 32b. The back surface auxiliary magnet 34 is magnetized such that a portion of the back surface auxiliary magnet 34 that abuts against the back surface of the first claw-shaped magnetic pole 31b becomes north pole which is the same as the first claw-shaped magnetic pole 31b, and a portion of the back surface auxiliary magnet 34 that abuts against the outer circumferential surface of the second core base 32a becomes south pole which is the same as the second core base 32a. As the back surface auxiliary magnet 34, it is possible to use a ferrite magnet for example.

As shown in FIG. 18, an axial length of the back surface auxiliary magnet 34 of the first claw-shaped magnetic pole 31b and an axial length of the back surface auxiliary magnet 34 of the second claw-shaped magnetic pole 32b are set such that the back surface auxiliary magnets 34 are stacked in the axial direction at an axial position of the rotor 21 where the annular magnet 33 is arranged. In other words, the axial lengths of the back surface auxiliary magnets 34 are set such that they extend from the two surfaces of the rotor 21 to an axial position where the annular magnet 33 is arranged.

As shown in FIG. 18, each of the interpolar magnets 35 is arranged between the first claw-shaped magnetic pole 31b and the second claw-shaped magnetic pole 32b in the circumferential direction. The interpolar magnets 35 are magnetized in the circumferential direction such that portions having the same pole as the first and second claw-shaped magnetic poles 31b and 32b are opposed to each other (such that a portion of the interpolar magnet 35 in the vicinity of the first claw-shaped magnetic pole 31b becomes a north pole and a portion of the interpolar magnet 35 in the vicinity of the second claw-shaped magnetic pole 32b becomes a south pole).

Figure 16:
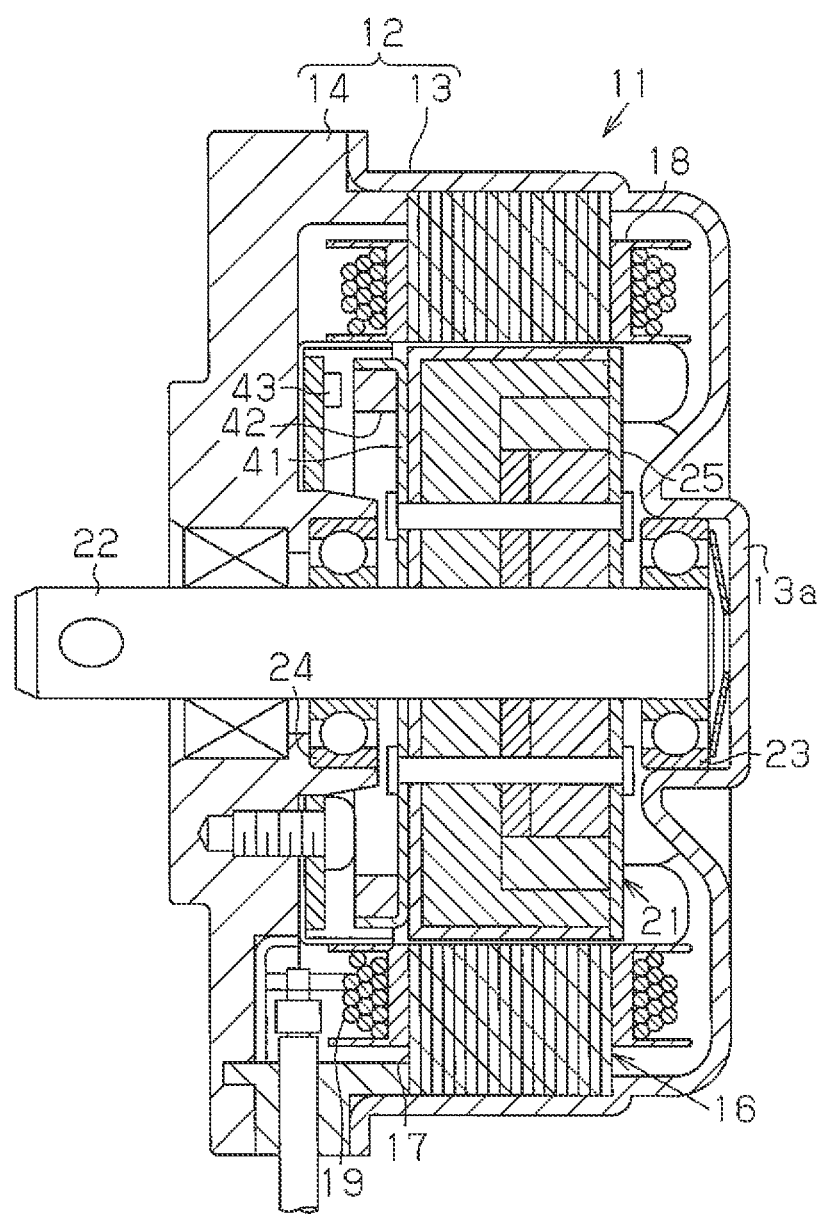
FIG. 16 is a cross-sectional view of a brushless motor according to a third embodiment of the present disclosure.

As shown in FIG. 16, in the third embodiment, a magnet fixing member 41 is arranged on an outer bottom surface 25e of the bottom 25c of the rotor-side housing 25a. A sensor magnet 42 that detects a rotation position of the rotor is accommodated in the magnet fixing member 41.

Figure 19:
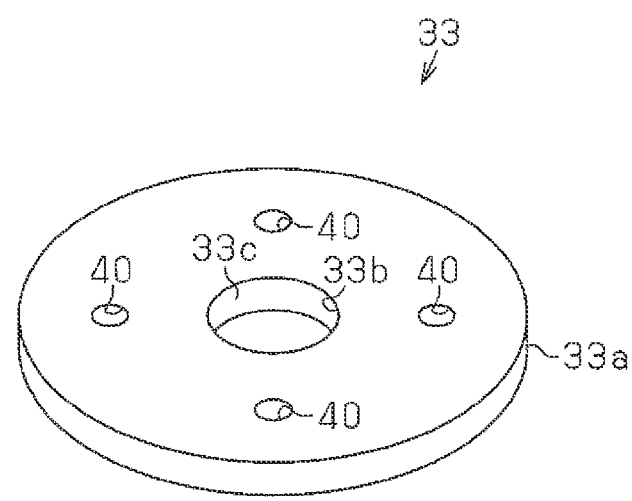
FIG. 19 is a perspective view of an annular magnet shown in FIG. 18.

As shown in FIGS. 17 to 19, a plurality of through bores 40 serving as communication portions are formed at positions where the first and second rotor cores 31 and 32, the annular magnet 33, the rotor case 25 accommodating these members, and the magnet fixing member 41 are overlapped in the axial direction. The through bores 40 are formed at predetermined intervals (90° intervals in the circumferential direction in this embodiment) on a circle extending about the rotation shaft 22. Each of the through bores 40 is formed at a radially central portion of the radially outer surface 33a of the annular magnet 33 and an inner surface 33c of the insertion bore 33b through which the rotation shaft 22 is inserted. Rivets 51 are inserted into the through bores 40 and in this state, the rivets 51 are swaged, thereby fixing the first and second rotor cores 31 and 32, the annular magnet 33, the rotor case 25 accommodating these members, and the magnet fixing member 41. In the third embodiment, each of the rivets 51 is made of a non-magnetic material.

In the third embodiment, the through bores 40, which extend from one axial side to the other axial side in the first rotor core 31, the second rotor core 32, and the annular magnet 33, function as reinforcements together with the rivets 51 inserted into the through bores 40.

In the motor 11 configured as described above, when three-phase drive current is supplied to the windings 19 through an external power-supply circuit (not shown), a magnetic field is generated in the stator 16 for rotating the rotor 21, and the rotor 21 is rotated and driven.

Next, the operation of the above motor will be described.

In the motor 11 of the third embodiment, the rivets 51 are inserted into the through bores 40 formed in the first and second rotor cores 31 and 32 and the annular magnet 33 configuring the rotor 21 and in this state, the rivets 51 are swaged. Thus, movements of the bottom 25c and the lid 25b of the rotor-side housing 25a in the axial direction is restricted. In this manner, the first and second rotor cores 31 and 32 and the annular magnet 33 are rigidly fixed to each other. Since the rivets 51 are made of non-magnetic material, short circuiting of a magnetic flux of the annular magnet 33 is reduced.

Next, advantages of the third embodiment in addition to advantage (1) of the first embodiment will be described below.

(10) The rivets 51, which serve as the fixing members, are inserted into the through bores 40, which serve as the communication portions, and the rivets 51 fix the first and second rotor cores 31 and 32 and the annular magnet 33, which serves as the field magnet. Thus, it is possible to further rigidly fix the rotor cores 31 and 32 and the annular magnet 33 to each other.

(11) The plurality of through bores 40 arranged in a circle are formed at positions where the annular magnet 33 and the first and second rotor cores 31 and 32 are overlapped in the axial direction. By swaging the rivets 51 inserted into the through bores 40, the first and second rotor cores 31 and 32 are fixed to the annular magnet 33. By fixing the first and second rotor cores 31 and 32 to the annular magnet 33 in this manner, separation of the first and second rotor cores 31 and 32 and the annular magnet 33 by vibration or the like is limited, and the first and second rotor cores 31 and 32 are further rigidly fixed to the annular magnet 33. Since an adhesive or the like that would be melted by heat is not used, heat resistance may be enhanced.

(12) Since the rivets 51 are made of non-magnetic material, it is possible to reduce short circuit of a magnetic flux of the annular magnet 33, and output of the rotor 21 can be enhanced.

(13) By forming the plurality of through bores 40 at equal angular intervals in the circumferential direction, preferable weight balance can be obtained. Hence, vibration can be reduced.

(14) Since the through bores 40 are formed at radially central portions of the radially outer surface 33a of the annular magnet 33 and the inner surface 33c of the insertion bore 33b, the distance from the through bore 40 to the radially outer surface 33a and the distance from the through bore 40 to the inner surface 33c of the insertion bore 33b may be equal. This limits cracking of the annular magnet 33 that would be caused when forming the through bores 40.

(15) The back surface auxiliary magnet 34 and the interpolar magnet 35 serving as the auxiliary magnets are provided in a gap formed in the back surfaces 32i of the claw-shaped magnetic poles 31b and 32b and in the gap between the first claw-shaped magnetic pole 31b and the second claw-shaped magnetic pole 32b in the circumferential direction. Due to the magnets 34 and 35, leakage of magnetic flux from the gap of the rotor 21 is limited.

(16) The plate-shaped lid 25b, serving as the sandwiching portion, and the plate-shaped bottom 25c, serving as the sandwiching portion, sandwich the first and second rotor cores 31 and 32. The simple structure restricts movement of the lid 25b and the bottom 25c (rotor-side housing 25a) in the axial direction. This ensures the fastening of the lid 25b to the bottom 25c.

(17) By providing the cylindrical portion 25d as the annular wall, scattering of the magnets 33 to 35 is limited.

(18) The lid 25b and the bottom 25c serving as the sandwiching portions are made of non-magnetic material. This reduces short circuiting of a magnetic flux of the magnets 33 to 35 and increases the output of the rotor 21.

The third embodiment may be modified as follows.

Figure 20:
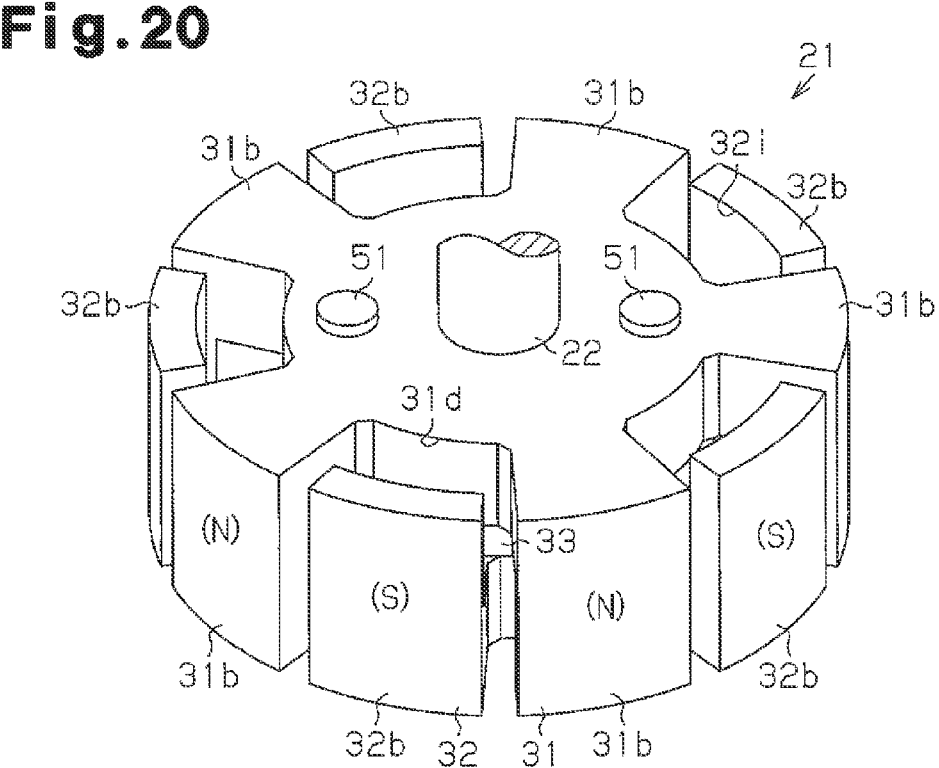
FIG. 20 is a perspective view of a rotor in another example of the third embodiment.
Figure 21:
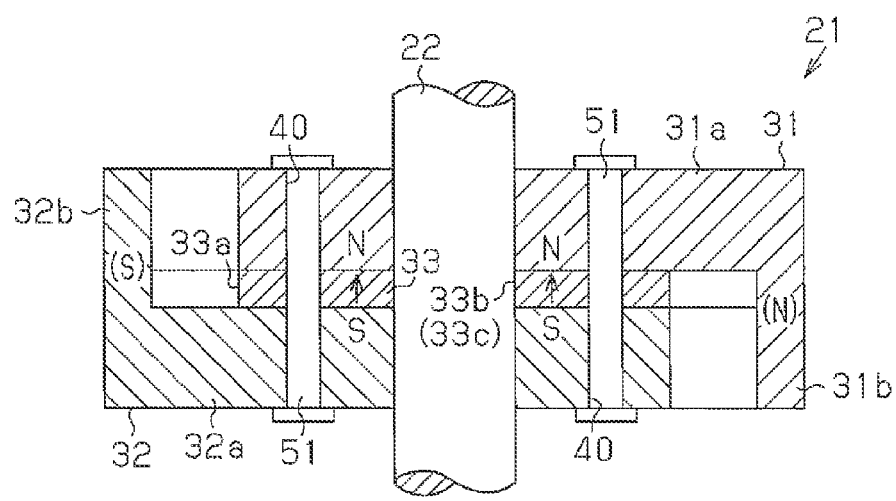
FIG. 21 is a cross-sectional view of the rotor shown in FIG. 20.

In the third embodiment, the rivets 51 are arranged in the through bores 40 which are provided at 90° intervals from one another in the circumferential direction. Instead, the number of through bores 40 and the number of rivets 51 paired with the through bores 40 may be freely changed. For example, the number of through bores 40 and the number of rivets 51 paired with the through bores 40 may be two as shown in FIGS. 20 and 21. Further, the through bores 40 do not have to be formed at equal angular intervals.

Figure 22:
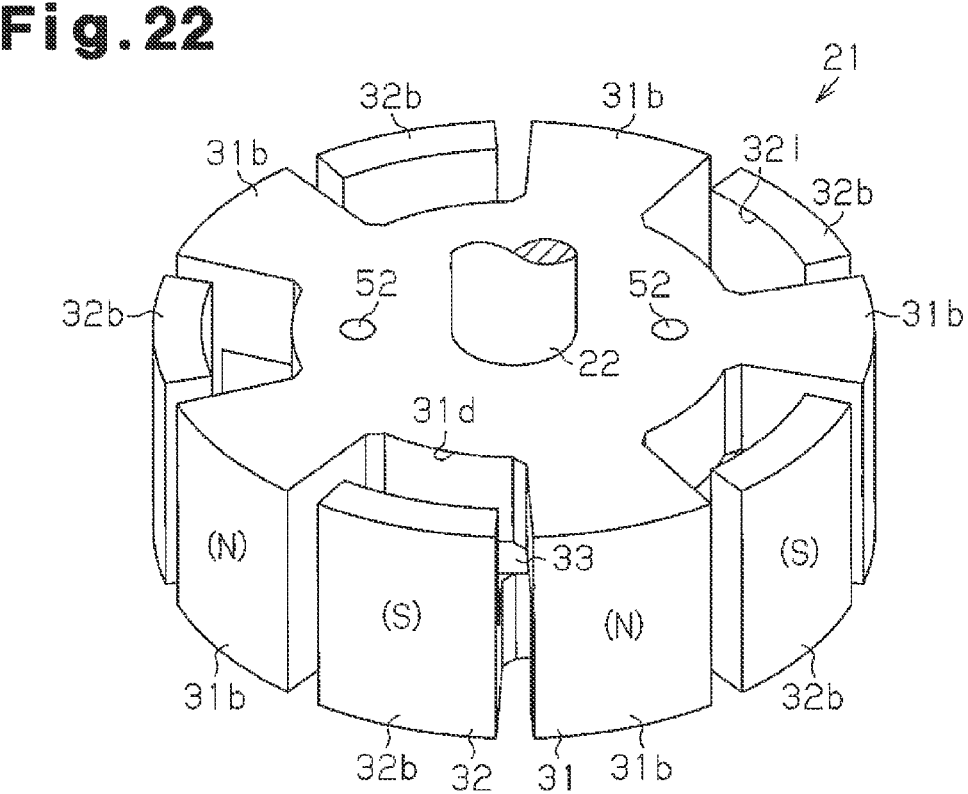
FIG. 22 is a perspective view of a rotor in another example of the third embodiment.

Although the first and second rotor cores 31 and 32 include four claw-shaped magnetic poles 31b and 32b in the third embodiment, the invention is not limited to this configuration. As shown in FIGS. 20 and 22 for example, the first and second rotor cores 31 and 32 may include five claw-shaped magnetic poles 31b and 32b. The number of claw-shaped magnetic poles 31b and 32b may be freely changed.

Figure 23:
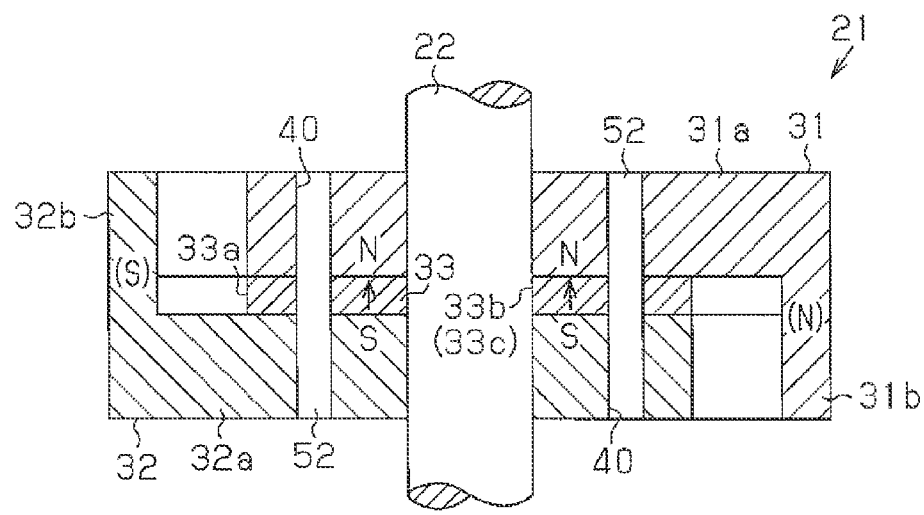
FIG. 23 is a cross-sectional view of the rotor shown in FIG. 22.

Although the first and second rotor cores 31 and 32, the annular magnet 33 and the like are accommodated in the rotor case 25 in the third embodiment, the rotor case 25 may be omitted as shown in FIGS. 21 and 23.

Although the back surface auxiliary magnet 34 and the interpolar magnet 35 are provided as the auxiliary magnets in the third embodiment, the auxiliary magnets may be omitted as shown in FIGS. 20 to 23. Alternatively, only one of the back surface auxiliary magnet 34 and the interpolar magnet 35 may be provided.

The rotor 21 and the magnet fixing member 41 accommodating the sensor magnet 42 are fixed to each other using the rivets 51 in the third embodiment. Instead, for example, when the magnet fixing member 41 is arranged at a position separated from the rotor case 25, the rivets 51 do not have to be used.

The first and second rotor cores 31 and 32 and the annular magnet 33 are fixed to each other by swaging the rivets 51 as the fixing members in the third embodiment.

Instead, as shown in FIGS. 22 and 23, for example, the first and second rotor cores 31 and 32 and the annular magnet 33 may be fixed to each other by press fitting rod-shaped fixing portions 52 into the through bores 40. The rivets 51 may be changed to other fastening members such as bolts and nuts. The first and second rotor cores 31 and 32 and the annular magnet 33 may be fixed to each other by welding fixing members. It is possible to employ such a configuration in which female threaded portions are formed in inner surfaces of the through bores 40, and male thread portions serving as fixing members are engaged with the female threaded portions to fix the first and second rotor cores 31 and 32 and the annular magnet 33 to each other.

Figure 24:
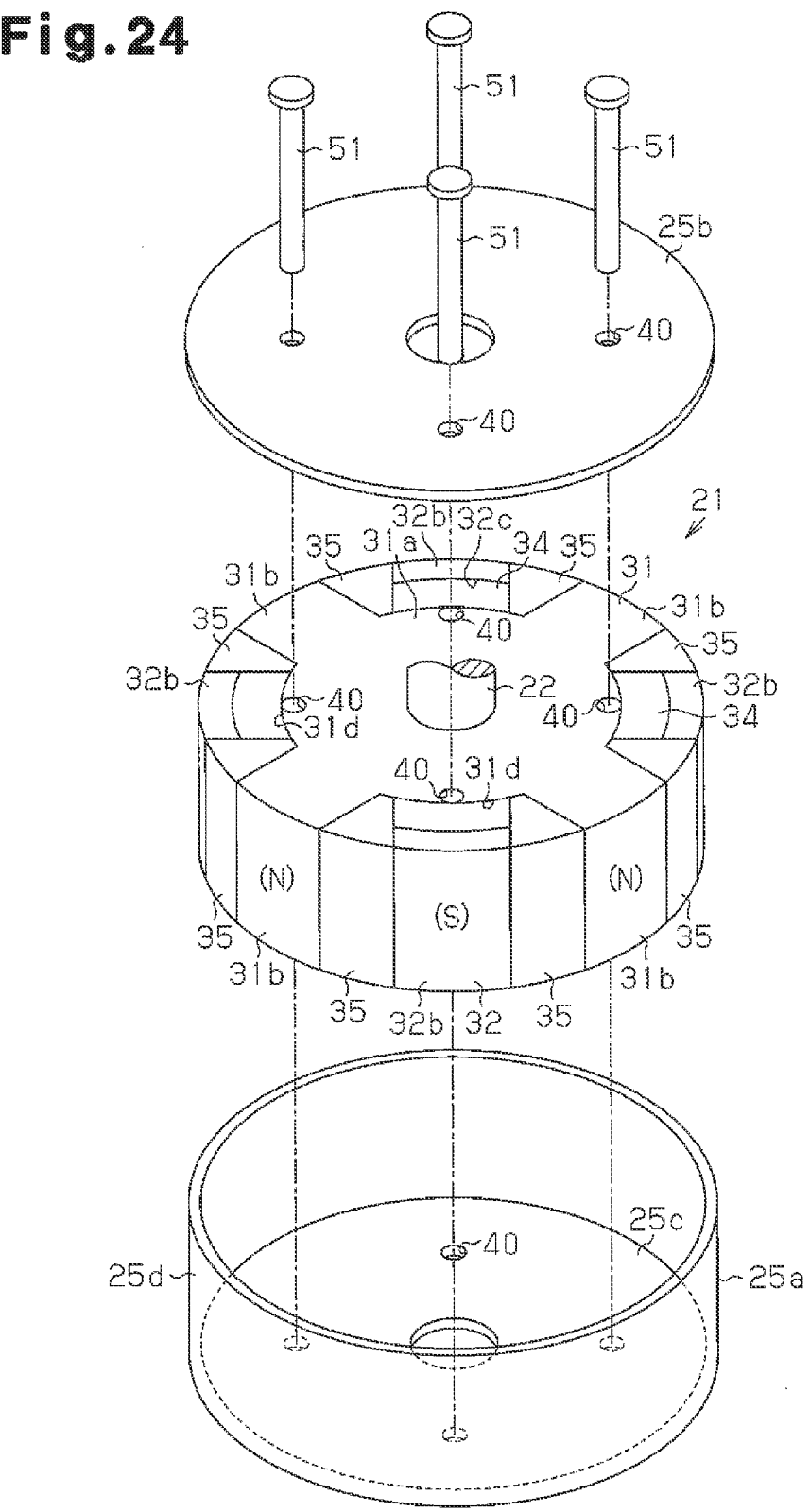
FIG. 24 is an exploded perspective view of a rotor in another example of the third embodiment.
Figure 25:
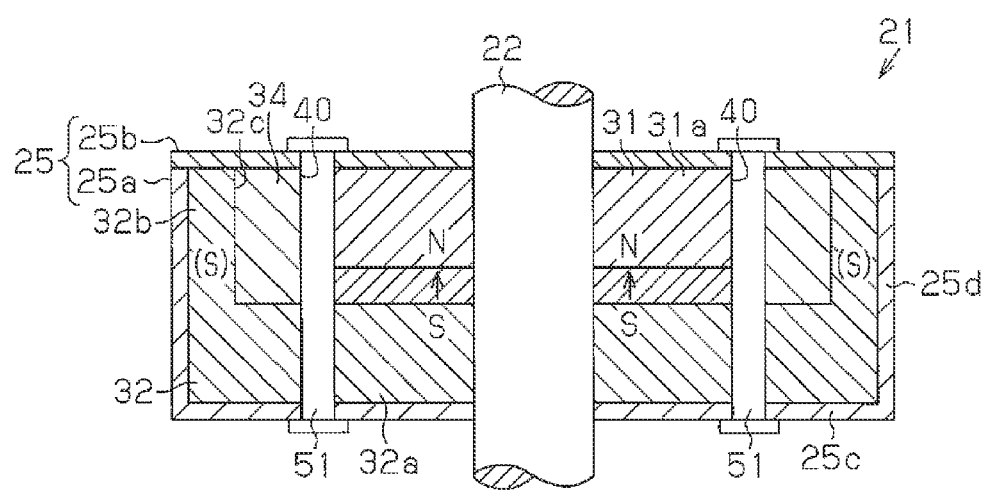
FIG. 25 is a cross-sectional view of the rotor shown in FIG. 24.
Figure 26:
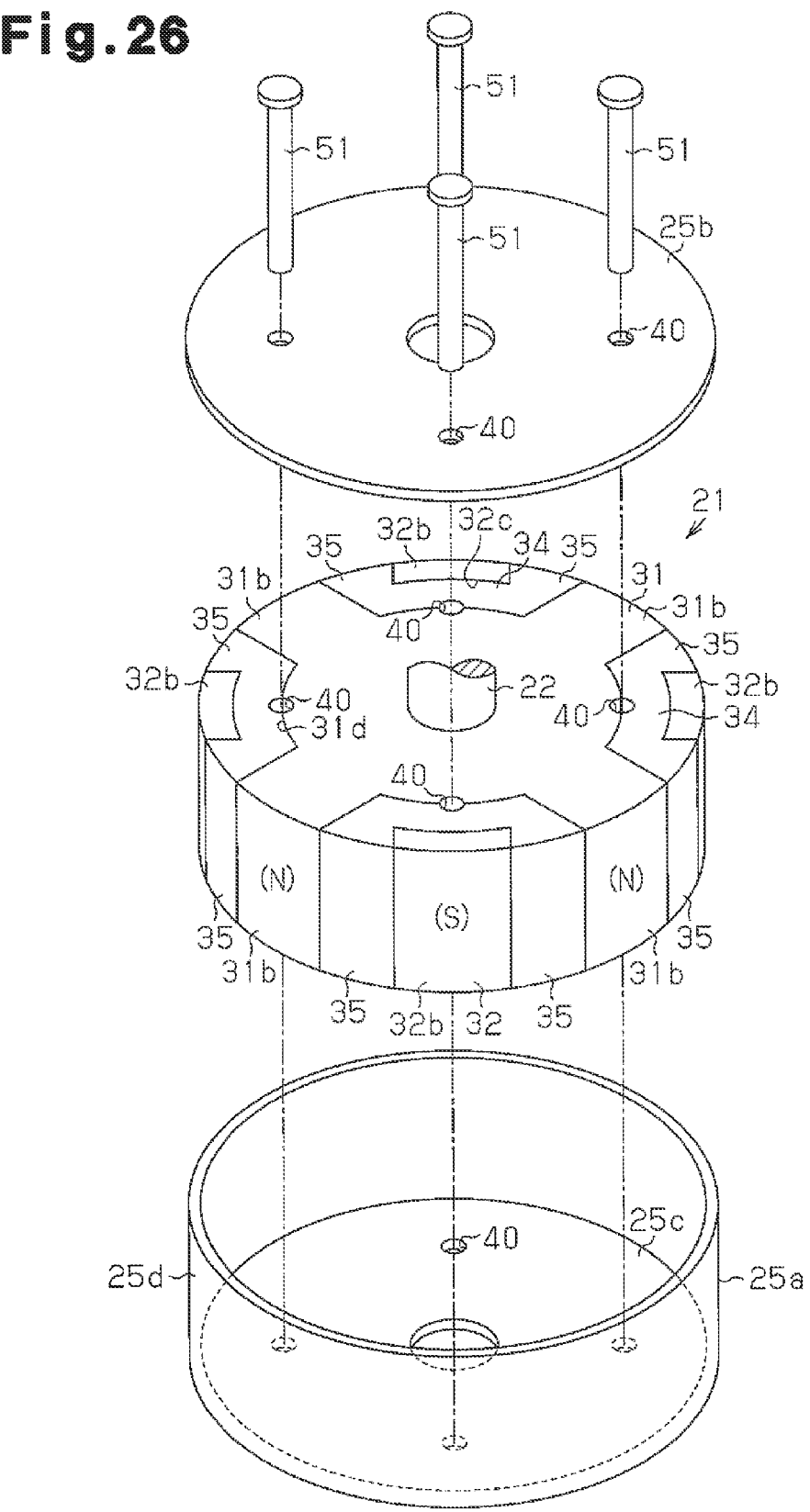
FIG. 26 is an exploded perspective view of a rotor in another example of the third embodiment.
Figure 27:
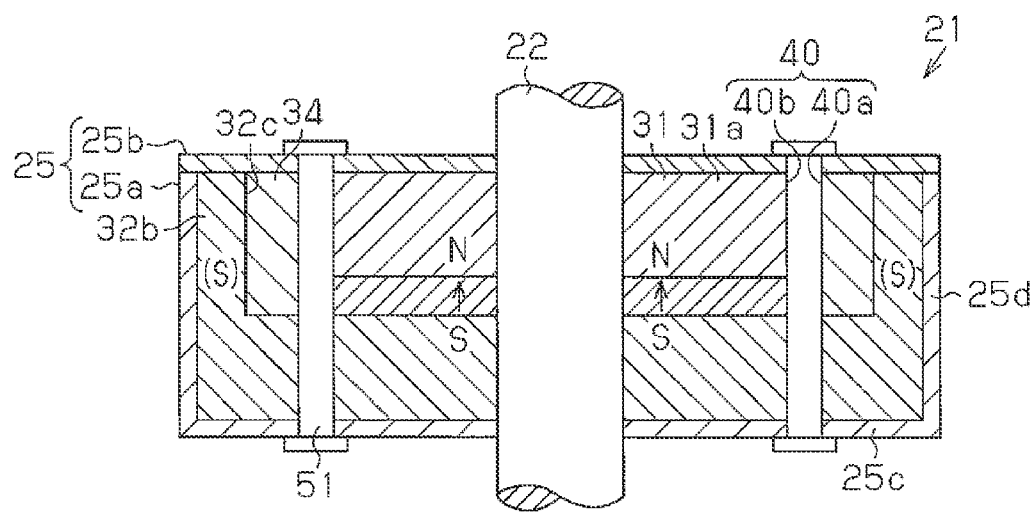
FIG. 27 is a cross-sectional view of the rotor shown in FIG. 26.

The through bores 40 are formed at radially central portions of the radially outer surface 33a of the annular magnet 33 and the inner surface 33c of the insertion bore 33b in the third embodiment. Instead, as shown in FIGS. 24 and 25, for example, the through bores 40 may be formed proximal to radially outer sides of the annular magnet 33.

Figure 28:
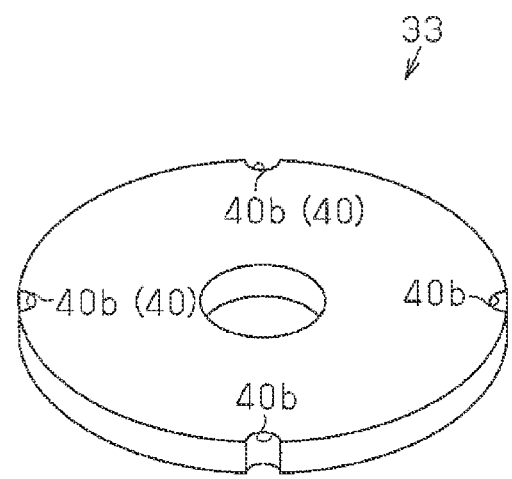
FIG. 28 is a perspective view of an annular magnet shown in FIG. 26.
Figure 29:
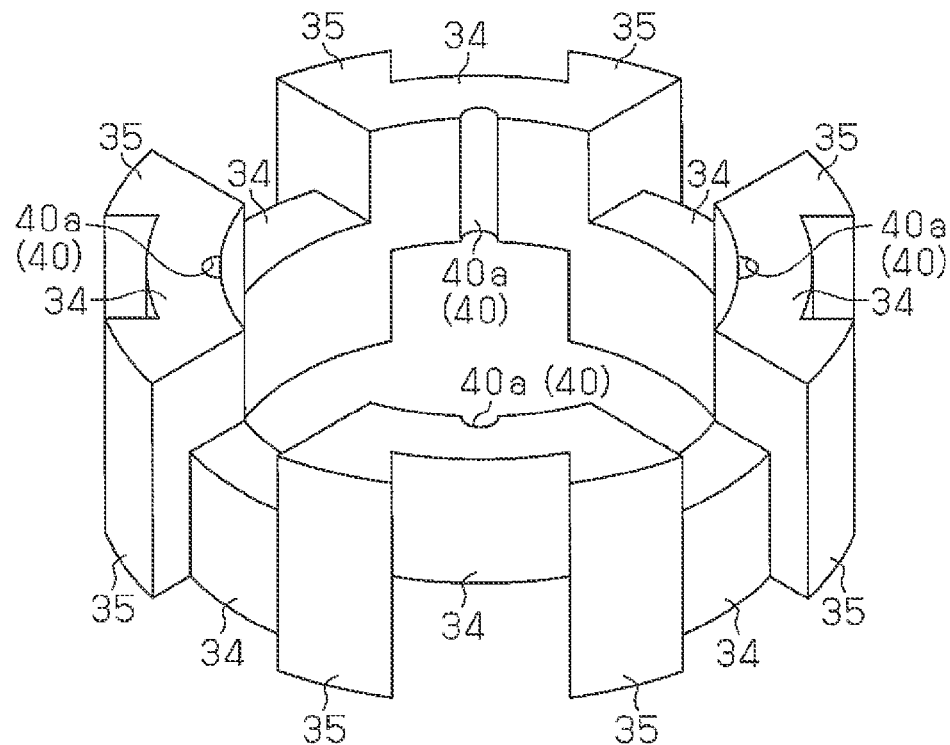
FIG. 29 is a perspective view of auxiliary magnets shown in FIG. 26.

The through bores 40 are provided at the positions where the first and second rotor cores 31 and 32 and the annular magnet 33 are overlapped with each other in the axial direction in the third embodiment. Instead, as shown in FIGS. 26 to 29, for example, each of the through bores 40 may be formed such that the through bore 40 extends over both of the back surface auxiliary magnet 34 and the annular magnet 33 serving as the auxiliary magnets. More specifically, as shown in FIGS. 26 to 29, each of the through bores 40 includes a first notch 40a formed in a radially inner side of the back surface auxiliary magnet 34 and extending in the axial direction, and a second notch 40b formed in a radially outer side of the annular magnet 33 and extending in the axial direction. As shown in FIGS. 28 and 29, the first notches 40a are formed in four (half) of a total of eight back surface auxiliary magnets 34, and the first notches 40a are arranged at equal angular intervals (90° in circumferential direction in this configuration) in the circumferential direction. The second notches 40b formed in the annular magnet 33 are formed at positions corresponding to the first notches 40a, i.e., positions opposed to the first notches 40a in the radial direction.

Like the annular magnet 33, the first notches 40a configuring the through bores 40 are also formed in the first and second rotor cores 31 and 32. In this case, the back surface auxiliary magnet 34 serving as the auxiliary magnet is also fixed by the fixing members provided in the through bores 40.

In the configuration shown in FIGS. 26 to 29, the back surface auxiliary magnet 34 and the interpolar magnet 35 are integrally configured. Hence, by fixing the back surface auxiliary magnet 34 using the rivets 51, the interpolar magnet 35 resists separation.

Figure 30:
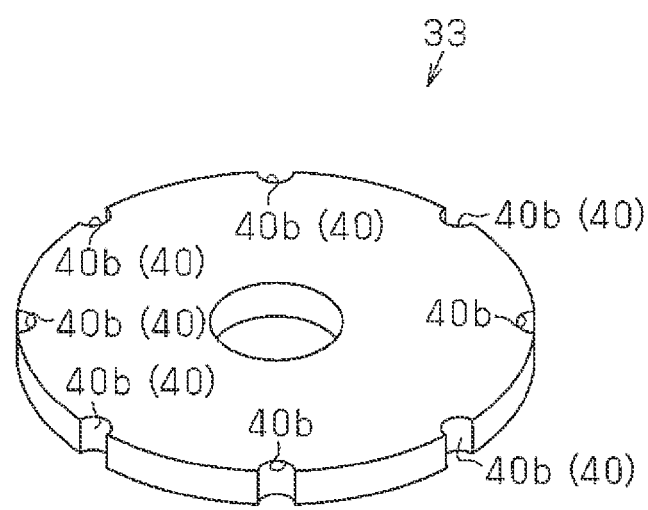
FIG. 30 is a perspective view of an annular magnet in another example of the third embodiment.
Figure 31:
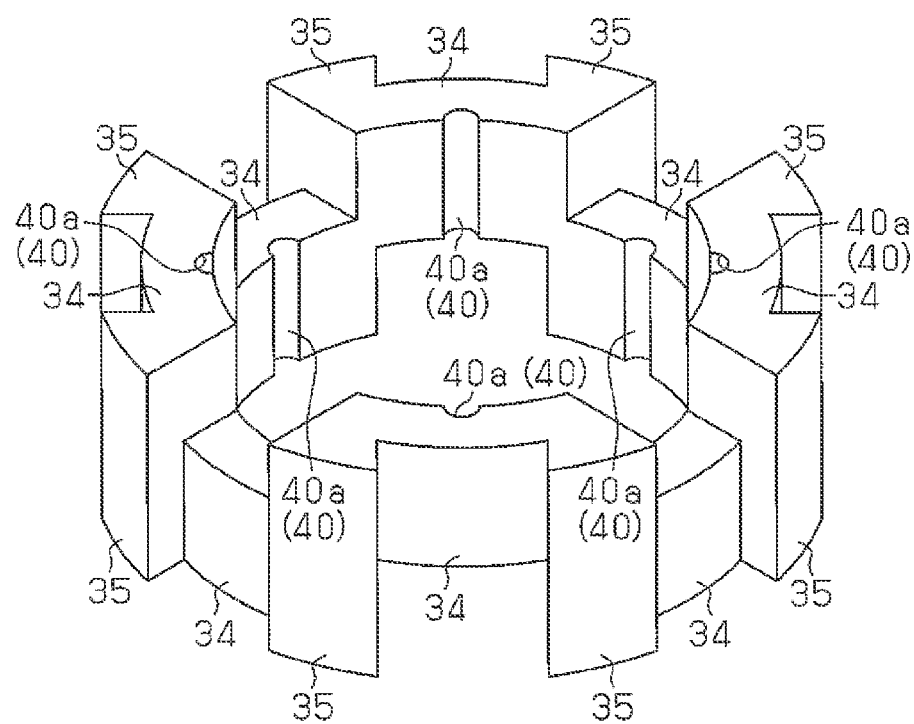
FIG. 31 is a perspective view of auxiliary magnets shown in FIG. 30.

In FIGS. 26 to 29, the four through bores 40 arranged in the circumferential direction are formed by the first notches 40a and the second notches 40b. Instead, as shown in FIGS. 30 and 31, for example, the same number (eight in this configuration) of through bores 40 as the poles arranged at equal angular intervals (45° intervals in the circumferential direction of this configuration) in the circumferential direction may be formed by the first notches 40a and the second notches 40b. FIG. 31 shows only six first notches 40a of the back surface auxiliary magnets 34. Like the annular magnet 33, the second notches 40b are formed also in the first and second rotor cores 31 and 32. If the number of through bores 40 is the same as the poles formed at equal angular intervals in the circumferential direction, the magnetic influence received by the magnetic poles due to the through bores 40 may be equalized. Thus, a preferable magnetic balance may be obtained. Further, instead of the through bores 40 formed by the notches 40a and 40b as described above, in the configuration shown in FIG. 2 or 3, the same number of through bores 40 as the poles may be formed at equal angular intervals from one another in the circumferential direction.

The through bores 40 are provided with fixing members (rivets 51 and the fixing portions 52) in the third embodiment and the modifications of the third embodiment. Instead, for example, it is possible to employ a configuration including eight through bores 40, four provided with the fixing members such as the rivets 51 and the fixing portions 52, and the remaining four through bores 40 used for positioning in the circumferential direction.

Figure 32:
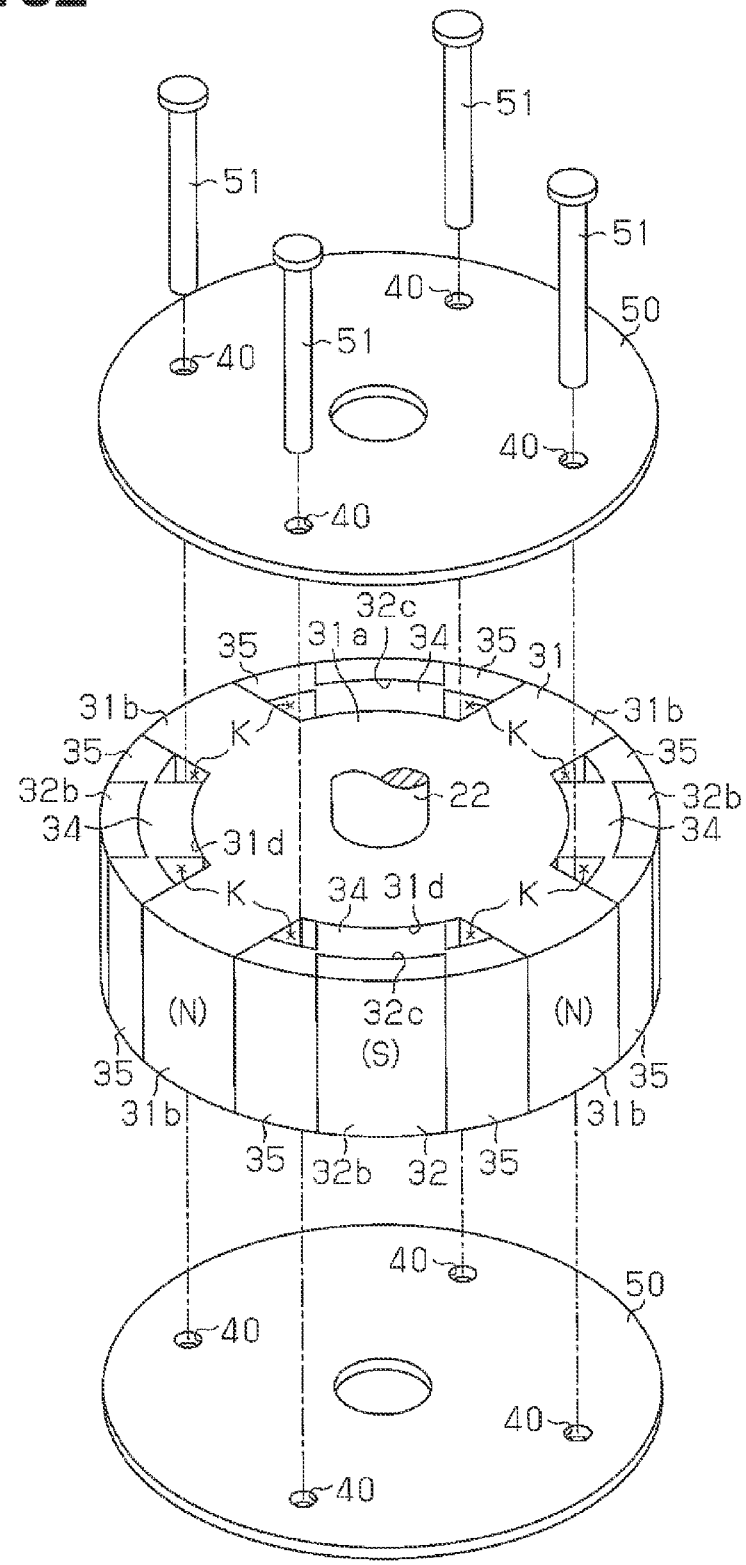
FIG. 32 is an exploded perspective view of a rotor in another example of the third embodiment.
Figure 34:
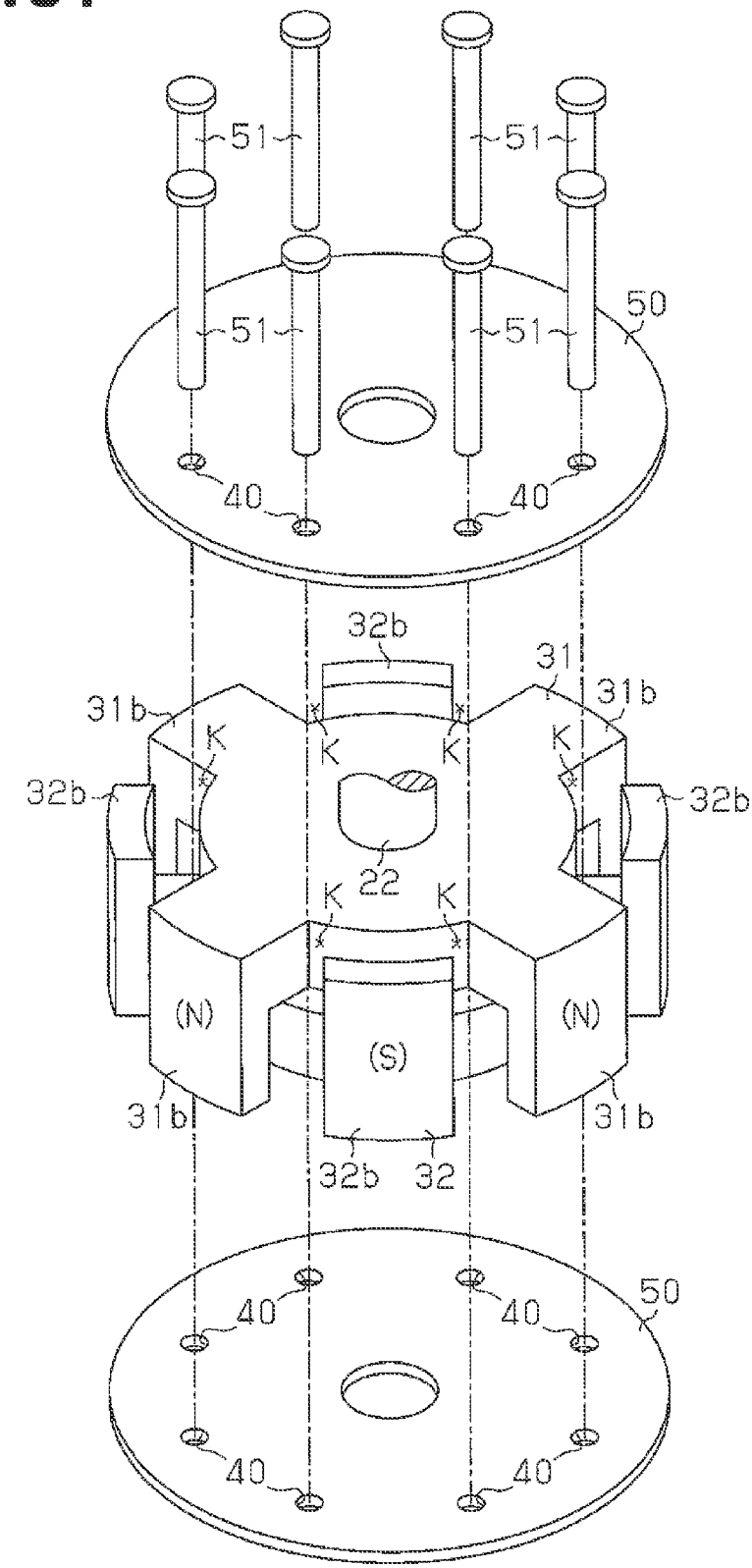
FIG. 34 is an exploded perspective view of a rotor in another example of the third embodiment.

The through bores 40, which are formed in the first rotor core 31, the second rotor core 32, and the annular magnet 33, serves as the insertion portions in the third embodiment. Instead, as shown in FIGS. 32 and 34, for example, the rivets 51 may be inserted into gaps K located between the claw-shaped magnetic poles 31b and 32b in the circumferential direction. In this case, there is no need to separately form insertion portions (through bores 40) in the first rotor core 31, the second rotor core 32, and the annular magnet 33. This allows the structure to be simplified. When the interpolar magnets 35 are formed between the claw-shaped magnetic poles 31b and 32b (gaps K) in the circumferential direction, the interpolar magnets 35 are located at radially outer sides of the gaps K as shown in FIG. 32, and the remaining gaps K may be used as the insertion portions. When the auxiliary magnets such as the interpolar magnets 35 and the back surface auxiliary magnets 34 are omitted as shown in FIG. 34, the rivets can be inserted into the gaps K.

Figure 33:
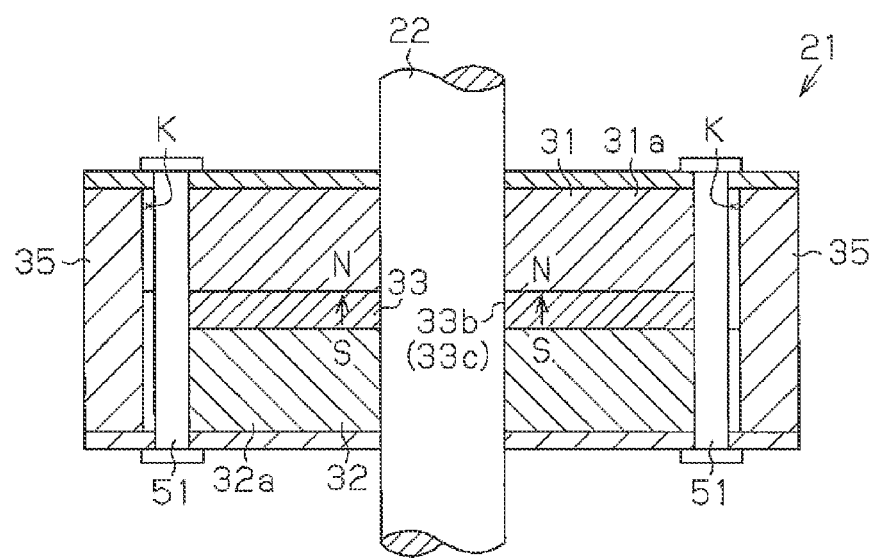
FIG. 33 is a cross-sectional view of the rotor shown in FIG. 32.

The entire rotor cores 31 and 32 are covered with the rotor-side housing 25a and the lid 25b in which the bottom 25c and the cylindrical portion 25d are integrally formed as the sandwiching portions in the third embodiment. Instead, as shown in FIGS. 32 and 33, for example, a disk-shaped sandwiching portion 50 corresponding to the lid 25b and the bottom 25c may be used. If the interpolar magnets 35 and the back surface auxiliary magnets 34 are used in such a configuration, it is preferable to integrally form (integrally configure) the interpolar magnet 35 and the back surface auxiliary magnet 34. In this case, even when the cylindrical portion 25d (see FIG. 17) is omitted, it is possible to limit separation of the interpolar magnets 35 (scattering of magnets).

A fourth embodiment of the brushless motor will now be described.

Figure 35:
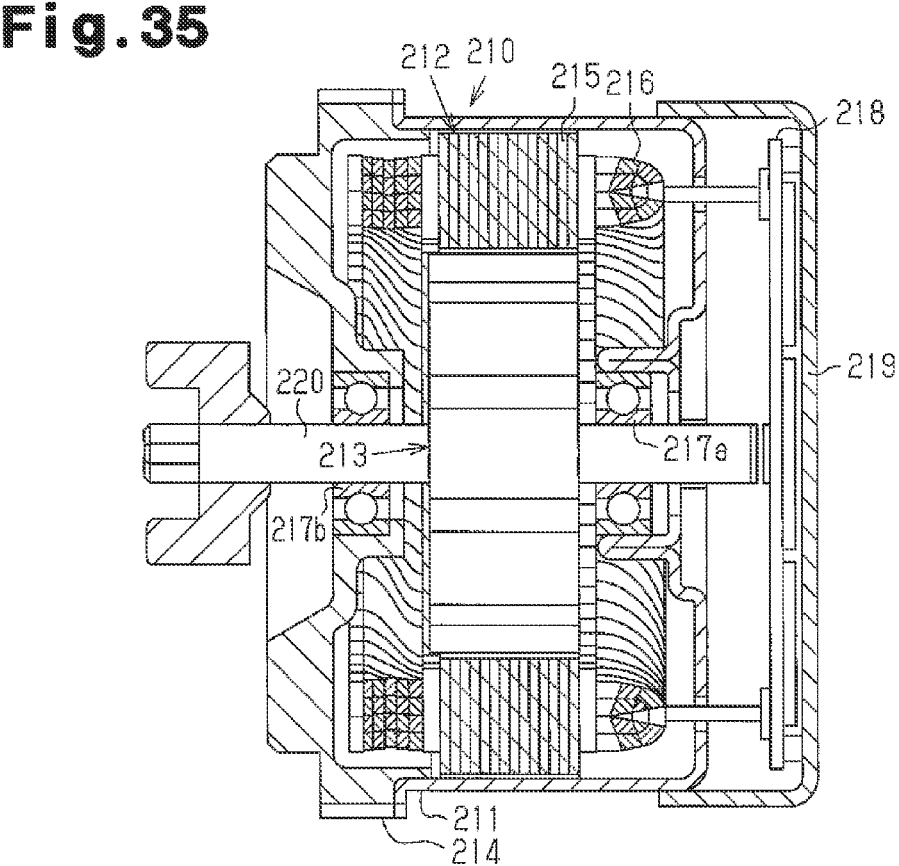
FIG. 35 is a cross-sectional view of a motor according to a fourth embodiment of the present disclosure.

As shown in FIG. 35, a cylindrical housing 211, which has a closed end, of a motor 11 accommodates motor components such as a stator 212 and a rotor 213. An end plate 214 for closing an opening of the housing 211 is mounted on the opening of the housing 211.

The stator 212 has an armature core 215 including a plurality of teeth extending radially inward, and a segment conductor winding (SC winding) 216 wound around the teeth of the armature core 215. The stator 212 is fixed to an inner circumferential surface of the housing 211. The rotor 213 is rotatably arranged in the stator 212, and a rotation shaft 220 of the rotor 213 is rotatably supported by bearings 217a and 217b held by a bottom central portion of the housing 211 and a central portion of the end plate 214.

A circuit accommodating box 219 accommodating a circuit substrate 218 is mounted on an outer side of a bottom of the housing 211. A power supply circuit and the like are configured on the circuit substrate 218. The circuit substrate 218 and the winding 216 of the stator 212 are connected to each other. A rotating field is generated at the stator 212 when power is supplied from the circuit substrate 218 to the winding 216, and the rotor 213 is rotated and driven.

Figure 36:
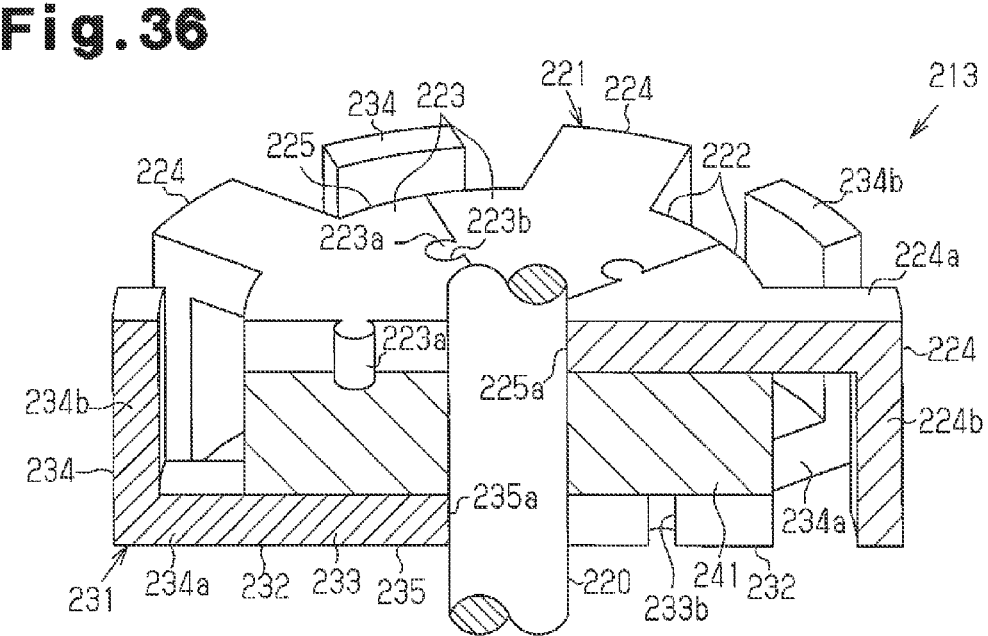
FIG. 36 is a perspective view of a rotor shown in FIG. 35.
Figure 37:
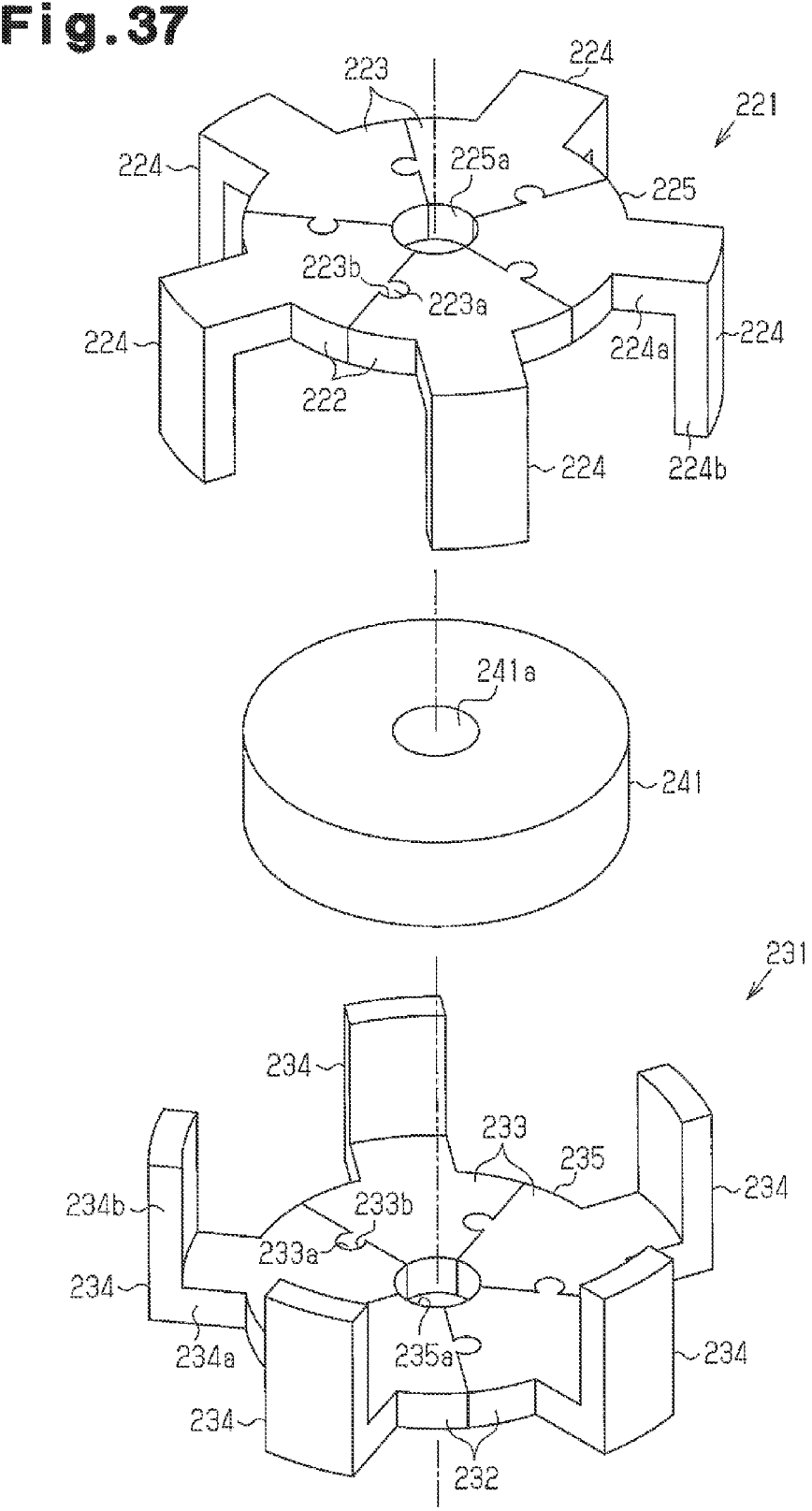
FIG. 37 is an exploded perspective view of the rotor (rotor cores, field magnet) shown in FIG. 35.

As shown in FIGS. 36 and 37, the rotor 213 is of a so-called Lundell-type structure and includes the rotation shaft 220, first and second rotor cores 221 and 231, and a field magnet 241.

The first rotor core 221 is configured by annularly arranging a plurality of (five in this embodiment) core segments 222 having the same shapes in the circumferential direction. Each of the core segments 222 is formed by punching an oriented magnetic steel sheet. The core segment 222 includes a basal portion 223, which is substantially sectoral as viewed from the axial direction, and a first claw-shaped magnetic pole 224 (salient-pole) formed on a circumferentially central portion of an outer circumferential surface of the basal portion 223.

The basal portion 223 of each of the core segments 222 is annularly arranged in the circumferential direction and configures a disk-shaped core base 225. Circumferential end surfaces of the basal portions 223 (boundaries of basal portions 223 which are adjacent to each other in the circumferential direction) extend straight along a radial direction with respect to an axial direction of the rotation shaft 220. The boundaries of the basal portions 223 which are adjacent to each other in the circumferential direction are arranged at equal intervals in the circumferential direction in the first rotor core 221.

A connecting convex portion 223*a* (connecting portion) is formed on one circumferential end surface of each of the basal portions 223, and a connecting concave portion 223*b* (connecting portion) is formed in the other circumferential end surface of the basal portion 223. The connecting convex portion 223*a* and the connecting concave portion 223*b* are substantially circular in shape as viewed from the axial direction, and the connecting convex portion 223*a* of each of the basal portions 223 is fitted into the connecting concave portion 223*b* of the circumferential adjacent basal portion 223. Thus, the adjacent basal portions 223 are engaged with each other in the circumferential direction and are connected to each other so that they do not separate from each other. A shaft fixing bore 225*a* is formed in a radially center portion of the disk-shaped core base 225 including the basal portion 223. The rotation shaft 220 is inserted into and fixed to the shaft fixing bore 225*a* by an adhesive or the like.

Only one first claw-shaped magnetic pole 224 is formed on one core segment 222, and five first claw-shaped magnetic poles 224 are formed on the entire first rotor core 221 at equal intervals in the circumferential direction. The first claw-shaped magnetic pole 224 includes a projection 224*a* projecting radially outward from an outer circumferential surface of the basal portion 223, and a claw 224*b* extending axially toward one side from a projecting distal end of the projection 224*a*. The claw 224*b* is formed by bending the projection 224*a* at a right angle, and an outer circumferential surface of the claw 224*b* is opposed to the stator 212.

The second rotor core 231 has the same configuration as that of the first rotor core 221. That is, the second rotor core 231 includes a plurality of core segments 232, which has basal portions 233 (including connecting convex portions 233*a* and connecting concave portions 233*b*) and second claw-shaped magnetic poles 234 (including projections 234*a* and claws 234*b*). Each of the core segments 232 has the same shape as that of the core segment 222 of the first rotor core 221.

In the fourth embodiment, the connecting convex portion 223*a* (233*a*) and the connecting concave portion 223*b* (233*b*) formed in each of the core segments 222 (232) to connect circumferential adjacent core segments 222 (232) to each other function as reinforcements.

The first and second rotor cores 221 and 231 are arranged such that the first and second claw-shaped magnetic poles 224 and 234 are opposed to each other. The first and second rotor cores 221 and 231 are combined with each other such that the first and second claw-shaped magnetic poles 224 and 234 are alternately arranged at equal intervals in the circumferential direction, and such that predetermined gaps are formed between adjacent first and second claw-shaped magnetic poles 224 and 234. The first and second rotor cores 221 and 231 are arranged such that the field magnet 241 is held between the core bases 225 and 235 of the first and second rotor cores 221 and 231 in the axial direction.

The field magnet 241 is annular and has a central portion in which a shaft insertion bore 241*a* is formed. The rotation shaft 220 is inserted into the shaft insertion bore 241*a* and the shaft fixing bores 225*a* and 235*a* of the core bases 225 and 235 to fix the rotation shaft 220 to the core bases 225 and 235. An outer circumferential surface of the field magnet 241 is opposed to back surfaces (inner circumferential surfaces) of the claw-shaped magnetic poles 224 and 234 through a gap in the radial direction. The field magnet 241 is magnetized in the axial direction, and is arranged such that one axial side surface of the field magnet 241 which abuts against the first rotor core 221 becomes a north pole and one axial side surface of the field magnet 241 which abuts against the second rotor core 231 becomes a south pole. That is, due to the field magnet 241, the first claw-shaped magnetic pole 224 functions as the north pole and the second claw-shaped magnetic pole 234 functions as the south pole. A neodymium magnet is used as the field magnet 241.

Figure 38:
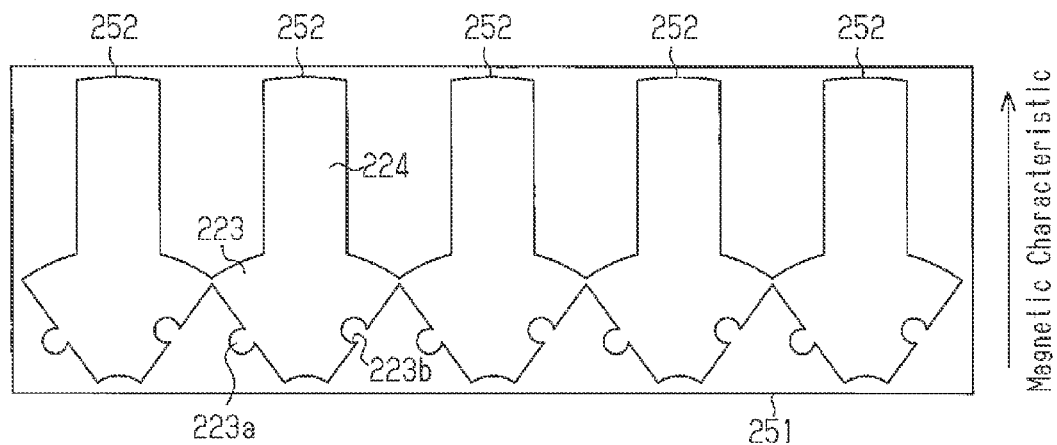
FIG. 38 is a schematic diagram illustrating a manufacturing procedure of the rotor cores shown in FIG. 37.
Figure 39:
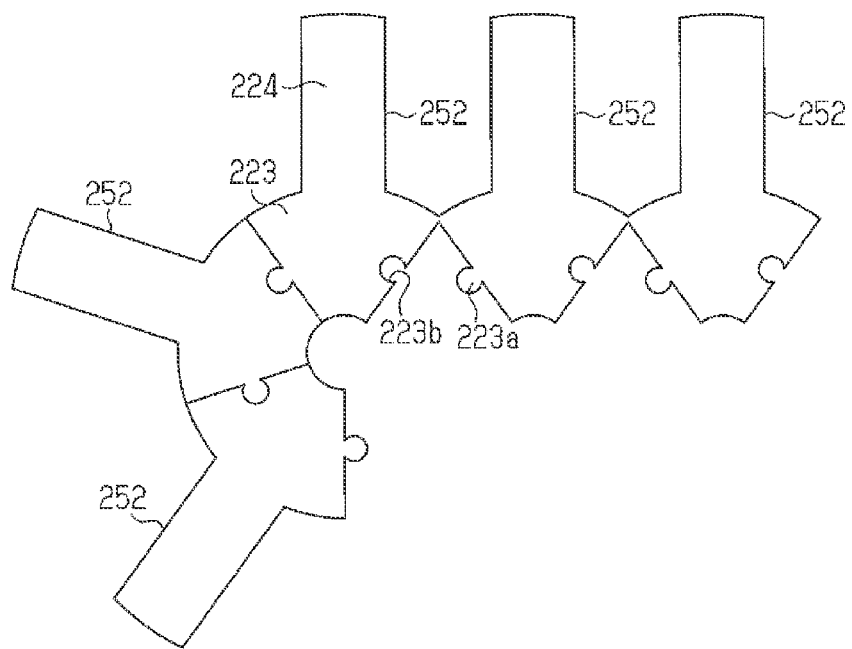
FIG. 39 is a schematic diagram for illustrating the manufacturing procedure of the rotor cores shown in FIG. 37.

A manufacturing method and operation of the first and second rotor cores 221 and 231 in the fourth embodiment will now be described with reference to FIGS. 38 and 39. FIGS. 38 and 39 show a manufacturing procedure of the first rotor core 221.

As shown in FIG. 38, a plurality of core segment raw materials 252 are punched out from a magnetic steel sheet 251. At this time, the basal portion 223 and the first claw-shaped magnetic pole 224 prior to bending are formed on each of the core segment raw materials 252. The first claw-shaped magnetic poles 224 extend from the basal portions 223. The core segment raw materials 252 are punched out when they are arranged on a straight line such that the first claw-shaped magnetic pole 224 prior to bending becomes parallel to the first claw-shaped magnetic poles 224 of other core segment raw materials 252. Further, adjacent core segment raw materials 252 are connected to each other at ends of outer peripheral edges of the basal portions 223. The magnetic steel sheet 251 is an oriented magnetic steel sheet that is easily magnetized only in one direction. A punching direction is set such that a direction of magnetic characteristics of the magnetic steel sheet 251 (direction in which the magnetic steel sheet 251 is easily magnetized) conforms to an extending direction of the first claw-shaped magnetic pole 224 of the punched core segment raw material 252. The direction of magnetic characteristics of the magnetic steel sheet 251 conforms with a rolling direction of the magnetic steel sheet 251.

Next, as shown in FIG. 39, the core segment raw materials 252 which are arranged straight along a line after they are punched out are arranged annularly. At this time, the connecting convex portion 223a of the basal portion 223 is fitted into the connecting concave portion 233b of the adjacent basal portion 223. This connects the adjacent basal portions 223 to each other so that they are not separated from each other. Thus, the core segment raw materials 252 are integrally connected to one another when annularly arranged.

Next, the first claw-shaped magnetic poles 224 of the plurality of core segment raw materials 252 are bent at right angles into the same direction. Thus, the claw 224b (see FIGS. 36 and 37) is formed on each of the first claw-shaped magnetic poles 224.

Through the above-described procedures, the first rotor core 221 in which the first claw-shaped magnetic poles 224 are arranged on the outer portion of the disk-shaped core base 225 at equal intervals in the circumferential direction as shown in FIG. 37 is completed. Since the manufacturing method of the second rotor core 231 is similar to that of the first rotor core 221, a detailed description will be not be given.

According to such a manufacturing method, since the core segments 222 and 232 (core segment raw materials 252) are punched out from the magnetic steel sheet 251 when arranged in a straight line, waste of the magnetic steel sheet 251 is reduced as compared with when the rotor core is not divided and the cores are punched out as from an annularly arranged state. This increases yield. The core bases 225 and 235 of the rotor cores 221 and 231 are divided at equal intervals for the claw-shaped magnetic poles 224 and 234. Hence, it becomes easy to uniformly distribute the magnetic flux to the claw-shaped magnetic poles 224 and 234. As a result, output may be enhanced and torque pulsation may be reduced.

Next, advantages of the fourth embodiment in addition to advantage (1) of the first embodiment will be described.

(19) The rotor cores 221 and 231 are configured by annularly arranging, in the circumferential direction, the core segments 222 and 232 respectively including the claw-shaped magnetic poles 224 and 234 (salient-poles). Thus, the core segments 222 and 232 (core segment raw material 252) arranged on a straight line are punched out from the magnetic steel sheet 251, and the core segments 222 and 232 are annularly arranged in the circumferential direction. This allows for the rotor cores 221 and 231 to be formed. Hence, waste of the magnetic steel sheet 251 can be reduced as compared with when the rotor core is not divided in the circumferential direction and punched out from the steel sheet. As a result, the yield is enhanced. Since the core bases 225 and 235 of the rotor cores 221 and 231 are divided at equal intervals for the claw-shaped magnetic poles 224 and 234, it becomes easy to uniformly distribute magnetic flux to the claw-shaped magnetic poles 224 and 234. As a result, output may be enhanced, and torque pulsation may be reduced.

(20) The salient-poles of the rotor cores 221 and 231 are configured by the claw-shaped magnetic poles 224 and 234 that extend in the axial direction of the rotor 213. Hence, an opposing surface of the salient-pole opposed to the stator 212 in the radial direction may be widened in the axial direction of the rotor 213. This enhances the output.

(21) The claw-shaped magnetic poles 224 and 234 are bent in the axial direction of the rotor 213. It is possible to easily form the claw-shaped magnetic poles 224 and 234 that extend in the axial direction just by bending a portion of the core segment raw material 252 which is punched out from the magnetic steel sheet 251.

(22) The connecting convex portions 223a and 233a and the connecting concave portions 223b and 233b, which connect the circumferentially adjacent basal portions 223 and 233 to each other, are formed on and in the basal portions 223 and 233 of the core segments 222 and 232. Thus, the adjacent basal portions 223 and 233 can be rigidly connected to each other such that they do not separate from each other. As a result, the quality of the motor may be improved. Further, since there is no need to separately provide a connecting member for integrally connecting the core segments 222 and 232 to each other, an increase in the number of parts may be limited.

(23) The punching direction is set such that the direction of magnetic characteristics of the oriented magnetic steel sheet that configures the core segments 222 and 232 conforms to a radial direction of the rotor 213. This configuration makes it easy for magnetic flux to flow between the basal portions 223 and 233 and the claw-shaped magnetic poles 224 and 234. This configuration increases the output.

The fourth embodiment may be modified as follows.

That is, in the fourth embodiment, the brushless motor 11 may include a rotor core-connecting member for connecting the two rotor cores 221 and 231 to each other.

Figure 40:
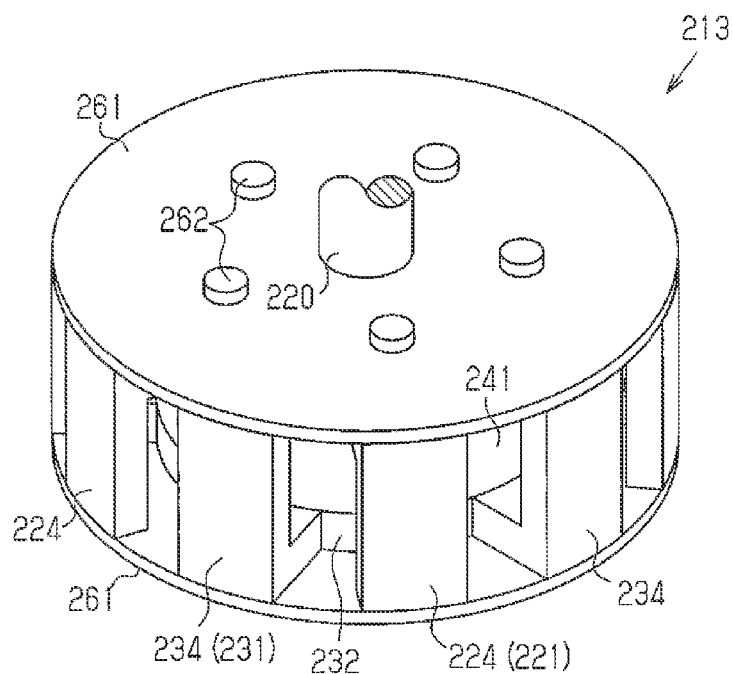
FIG. 40 is a perspective view of a rotor of another example of the fourth embodiment.
Figure 41:
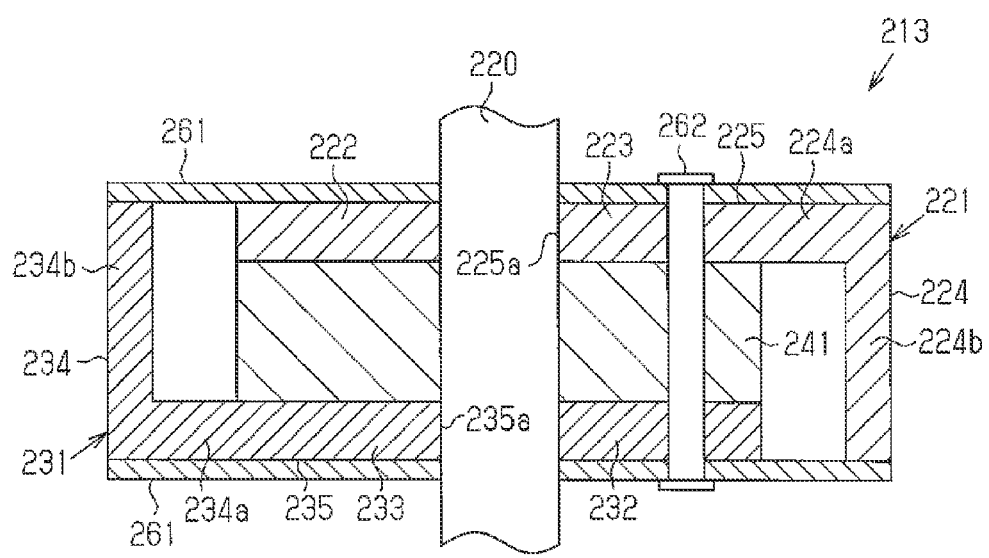
FIG. 41 is a schematic cross-sectional view of the rotor shown in FIG. 40.

For example, the brushless motor 11 may include two holding plates 261 and rivets 262 made of non-magnetic material shown in FIGS. 40 and 41. The rotor cores 221 and 231 sandwich the field magnet 241 in the axial direction. The two holding plates 261 further sandwich the sandwiched integral field magnet 241 from both sides in the axial direction. The rivets 262 connect the two holding plates 261 to each other such that the holding plates 261 are not separate from each other in the axial direction. In this example, the holding plates 261 and the rivets 262 configure the rotor core-connecting member.

The holding plates 261 are disk members made of non-magnetic material. The holding plates 261 abut against axially outer end surfaces of the rotor cores 221 and 231. An outer diameter of the holding plate 261 is equal to those of the claw-shaped magnetic poles 224 and 234.

The number of rivets 262 is set to the same number (five in this example) of the core segments 222 and 232 which configure the first and second rotor cores 221 and 231. The rivets 262 are provided at equal intervals in the circumferential direction. Each of the rivets 262 extends in the axial direction through the basal portion 223 of the first rotor core 221, the field magnet 241, the basal portion 233 of the second rotor core 231, and the holding plates 261. Both ends of each of the rivets 262 in the axial direction (longitudinal direction) are swaged. Thus, the holding plates 261 are locked to the both ends of the rivet 262 in the axial direction. That is, the rivets 262 connect the holding plates 261 to each other, and the rivets 262 extend through the basal portions 223 and 233 of the core segments 222 and 232 and the field magnet 241. Thus, the rivets 262 are engaged with the basal portions 223 and 233 and the field magnet 241 in the circumferential direction and the radial direction.

In this case, it is possible to rigidly and integrally form the two rotor cores 221 and 231 and the field magnet 241 together, and to limit separation of the core segments 222 and 232 from each other in the radial direction. As a result, it is possible to enhance quality of the motor. According to the configuration including the holding plates 261 and the rivets 262, the basal portions 223 and 233 of the core segments 222 and 232 may include the connecting convex portions 223a and 233a and the connecting concave portions 223*b* and 233*b* as in the above embodiment, or the connecting convex portions 223*a* and 233*a* and the connecting concave portions 223*b* and 233*b* may be omitted. When the connecting convex portions and the connecting concave portions are omitted, the basal portions 223 and 233 which are adjacent in the circumferential direction are merely abutted against each other. Therefore, when the connecting convex portions 223*a* and 233*a* and the connecting concave portions 223*b* and 233*b* are omitted, the shapes of the core segments 222 and 232 can be simplified.

In the fourth embodiment, the adjacent core segments 222 and 232 are connected to each other through the connecting portions (connecting convex portions 223*a* and 233*a* and connecting concave portions 223*b* and 233*b*) which are integrally formed on the basal portions 223 and 233. Instead, for example, the core segments 222 and 232 may be integrated by a discrete core segment-connecting member.

Figure 42:
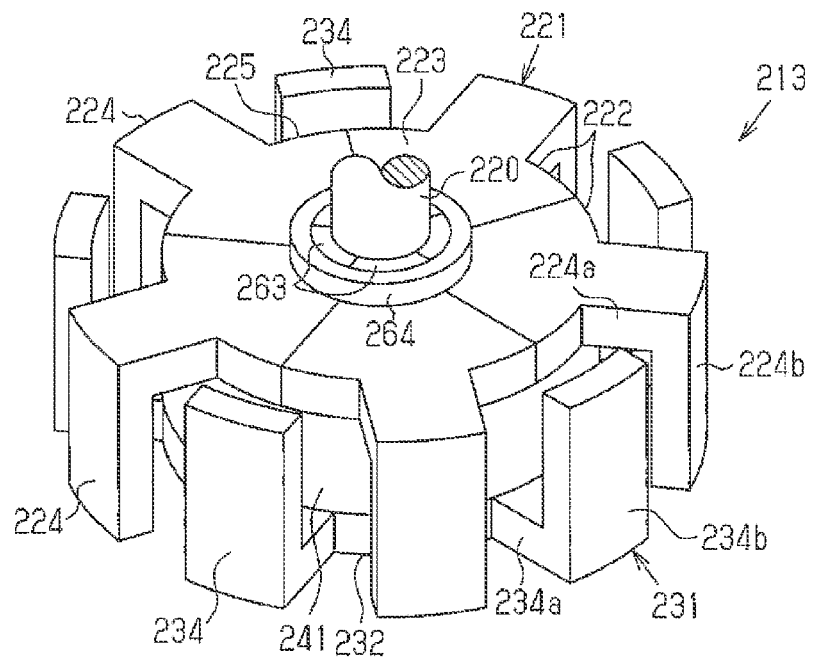
FIG. 42 is a perspective view of a rotor of another example of the fourth embodiment.
Figure 43:
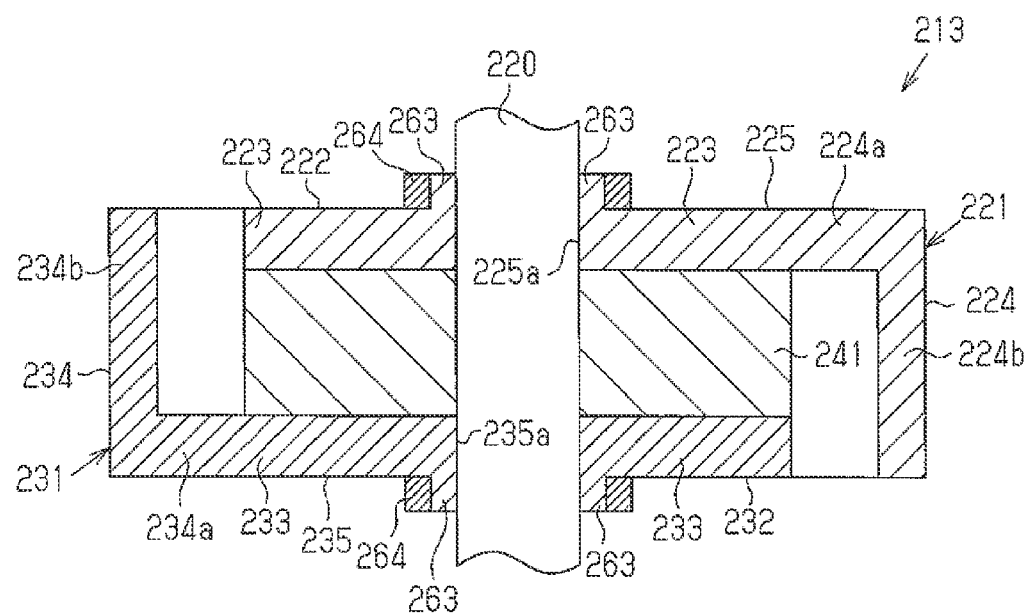
FIG. 43 is a schematic cross-sectional view of the rotor shown in FIG. 42.

In an example shown in FIGS. 42 and 43, extending portions 263 extending axially outward (in the direction opposite from the field magnet) are formed on inner peripheral ends of the basal portions 223 and 233 of the core segments 222 and 232. When the basal portions 223 and 233 are annularly arranged, the extending portions 263 are arranged annularly around the rotation shaft 220. A ring-shaped core segment-connecting member 264 is fitted to the extending portions 263 which are annularly arranged. Thus, in each of the rotor cores 221 and 231, the basal portions 223 and 233 of the core segments 222 and 232 are integrally connected. In this case, the core segments 222 and 232 of the first and second rotor cores 221 and 231 can be rigidly and integrally formed together through the core segment-connecting member 264. Hence, it is possible to enhance quality of the motor.

The claw-shaped magnetic poles 224 and 234 (especially axially extending claws 224*b* and 234*b*) are formed by bending portions of the core segment raw materials 252 in the fourth embodiment. Instead, for example, the claw-shaped magnetic pole (pawl) may be configured by laminating a plurality of magnetic steel sheets (oriented magnetic steel sheets) in the axial direction.

Figure 44:
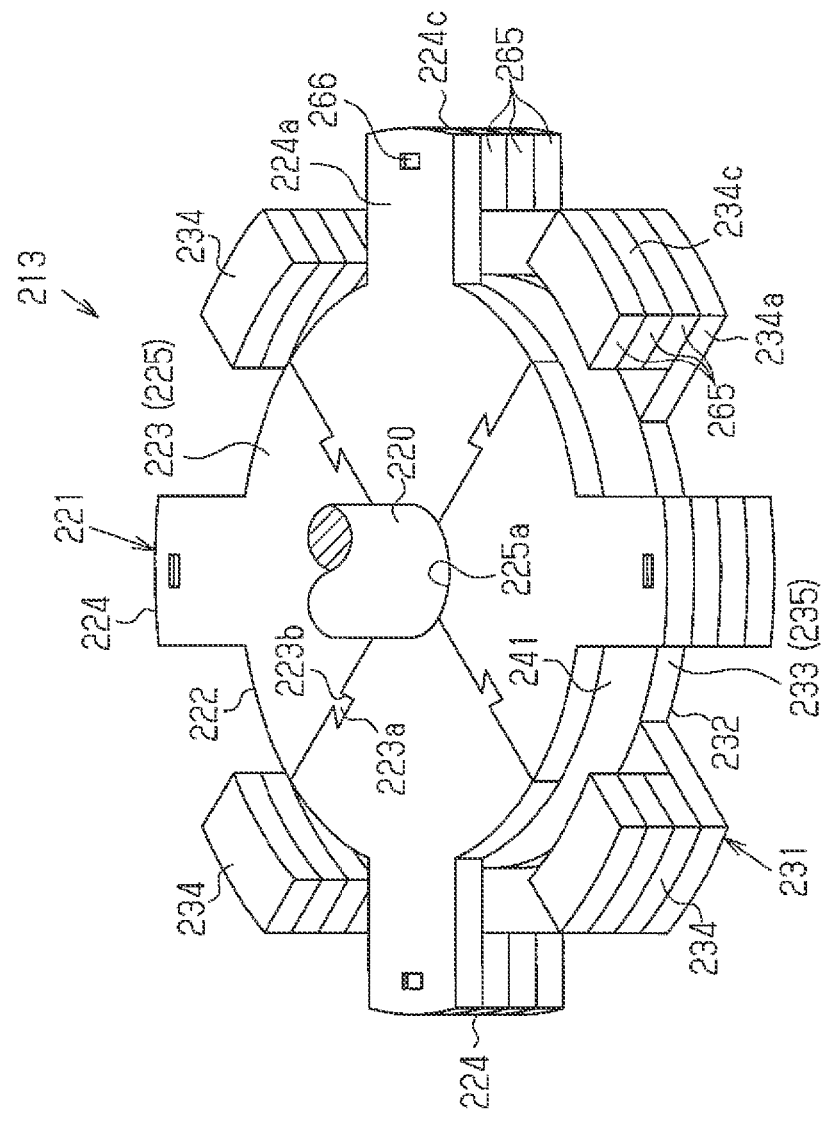
FIG. 44 is a perspective view of a rotor in another example of the fourth embodiment.
Figure 45:
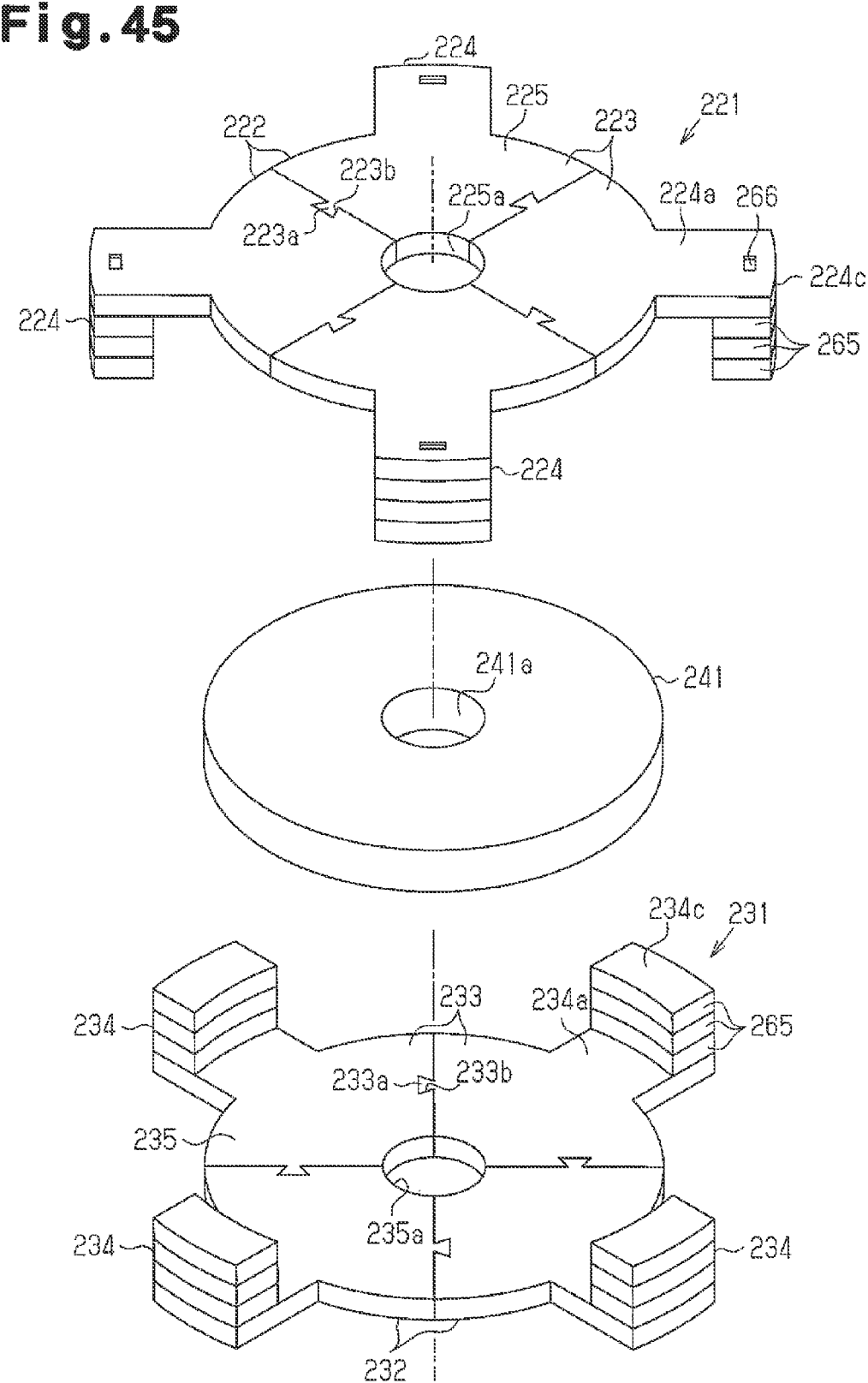
FIG. 45 is an exploded perspective view of the rotor shown in FIG. 44.

As shown in FIGS. 44 and 45 for example, the claw-shaped magnetic poles 224 and 234 respectively include claws 224*c* and 234*c* extending toward axially one side from projecting distal ends of projections 224*a* and 234*a* which are integrally formed on the basal portions 223 and 233. The claws 224*c* and 234*c* are formed by laminating, on one another, a plurality of sheet members 265 on the projecting distal ends of the projections 224*a* and 234*a*. The claws 224*c* and 234*c* include the same number of sheet members 265. The sheet members 265 have the same shapes, and distal ends of the sheet members 265 and the projections 224*a* and 234*a* are fixed to each other with swaging/fixing portions 266. The sheet members 265 are made of oriented magnetic steel sheet. The core segments 222 and 232 are punched out such that the direction of magnetic characteristics of the each of the sheet members 265 (direction in which the sheet member is easily magnetized) and a radial direction of the rotor 213 match with each other.

Figure 46:
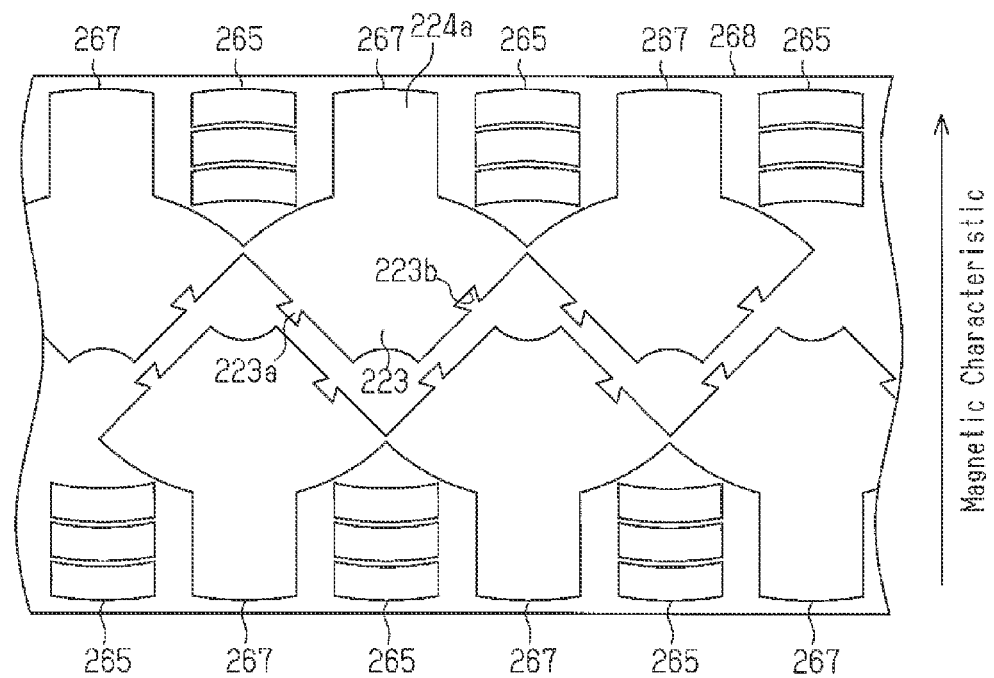
FIG. 46 is a schematic diagram illustrating a manufacturing procedure of the rotor cores shown in FIG. 44.

Next, a manufacturing procedure of the rotor cores 221 and 231 in the above-described configuration will be described with reference to FIG. 46. FIG. 46 shows the manufacturing procedure of the first rotor core 221 as an example. As shown in FIG. 46, the sheet members 265 and core segment raw materials 267 including the basal portions 223 and the projections 224*a* (portions of the first claw-shaped magnetic poles 224) are punched out from the same magnetic steel sheet 268. At this time, the plurality of core segment raw materials 267 are punched out in a state where they are arranged on a straight line such that the projections 224*a* are parallel to each other. A punch cutting die for the sheet members 265 is set at a position between the projections 224*a* of the adjacent core segment raw materials 267. If the core segment raw materials 267 and the sheet members 265 are punched out using such a layout, waste of the magnetic steel sheet 251 can further be reduced, and it is possible to further enhance yields. An extending direction of the projection 224*a* of the core segment raw material 267 and a radial direction of the sheet members 265 (short direction of sheet members 265 in FIG. 46) conform to the direction of magnetic characteristics of the magnetic steel sheet 268.

After the core segment raw materials 267 and the sheet members 265 are punched out, the basal portions 223 of the core segment raw materials 267 are annularly connected to one another. The sheet members 265 are laminated on the projections 224*a* of the core segment raw materials 267 in the axial direction (plate thickness direction of core segment raw material 267). By swaging and fixing the laminated projections 224*a* and the sheet members 265 to each other, the first rotor core 221 is completed. A manufacturing procedure of the second rotor core 231 is the same as that of the first rotor core 221.

The order of the procedure for annularly connecting the basal portions 223 to one another and the procedure for laminating the sheet members 265 on the projections 224*a* is not set, and any one of them may be carried out first. The sheet members 265 and the projection 224*a* may adhesively be fixed to each other instead of swaging.

In this case also, it is possible to reduce waste of the magnetic steel sheet 268 and to enhance yields. Further, it is possible to make the radial direction of the rotor 213 conform to the direction of magnetic characteristics of the claws 224*c* and 234*c* (sheet members 265) of the first and second claw-shaped magnetic poles 224 and 234. Hence, a magnetic flux easily flows in the radial direction in the claws 224*c* and 234*c*. As a result, it is possible to enhance output.

In the example shown in FIGS. 44 to 46, the connecting convex portions 223*a* and 233*a* and the connecting concave portions 223*b* and 233*b* which connect the core segments 222 and 232 to each other have wedge shapes. However, they may have circular shapes as in the above embodiments.

Conversely, the circular connecting convex portions 223*a* and 233*a* and the circular connecting concave portions 223*b* and 233*b* of the above embodiments may be formed into the wedge shapes. The connecting convex portions 223*a* and 233*a* and the connecting concave portions 223*b* and 233*b* are formed on and in the basal portion 223 one each, but they may be formed two each.

Figure 47:
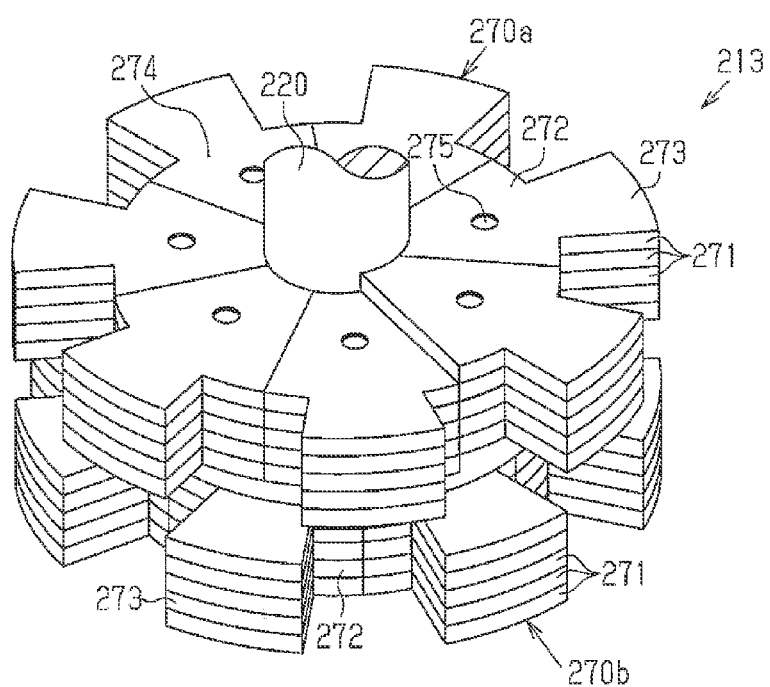
FIG. 47 is a perspective view of a rotor of another example of the fourth embodiment.

As shown in FIG. 47, first and second rotor cores 270*a* and 270*b* may be configured by a plurality of spirally laminated core segments 271. More specifically, each of the core segments 271 includes a basal portion 272 which is similar to the basal portions 223 and 233 of the above embodiment, and a salient-pole 273 projecting radially outward from the basal portion 272. The core segments 271 are punched out from a magnetic steel sheet and formed when arranged on a straight line. After the core segments 271 are punched out, the core segments 271 which are arranged on the straight line are spirally laminated on one another, the core segments 271 are arranged annularly, and they are laminated on one another in the axial direction. That is, in the rotor cores 270*a* and 270*b* of this example, core bases 274 are configured by annularly arranged and axially laminated basal portions 272. Salient-poles of outer portions of the core bases 274 are configured by laminating salient-poles 273 of the core segments 271 on one another in the axial direction. That is, in this example, the axially extending claws 224b and 234b (see the above embodiment) are omitted. Instead, the core segments 271 having the salient-poles 273 are laminated to one another in the axial direction. Hence, like the embodiment, the opposing surface of the rotor 213 which is opposed to the stator 212 in the radial direction can be widened in the axial direction. The core segments 271 are integrally connected to one another by swaging the axially laminated basal portions 272 in the axial direction by swaging/fixing portions 275. The salient-poles 273 of the first rotor cores 270a and the salient-poles 273 of the second rotor cores 270b are alternately arranged in the circumferential direction as viewed from the axial direction. One salient-pole 273 and the other salient-pole 273 function as different magnetic poles.

In this case also, it is possible to reduce waste of the magnetic steel sheet 251 and to enhance yields.

In the fourth embodiment and the different examples shown in FIGS. 40 to 47, the number of salient-poles (claw-shaped magnetic poles 224 and 234 and salient-pole 273) of the rotor cores 221, 231, 270a and 270b may be changed as necessary.

In the fourth embodiment, the adjacent core segments 222 and 232 are connected to each other through the connecting convex portions 223a and 233a and the connecting concave portions 223b and 233b. Instead, they may be adhered and fixed each other.

In the fourth embodiment and the example shown in FIG. 46, the core segment raw materials 252 and 267 are punched out such that the adjacent core segment raw materials 252 and 267 are connected to each other. Instead, for example, the core segment raw materials 252 and 267 may be punched out such that the adjacent core segment raw materials 252 and 267 separate from each other.

The present disclosure is applied to an inner rotor type motor 11 in which the rotor 213 is arranged on an inner peripheral side of the stator 212 in the fourth embodiment. Instead, for example, the present disclosure may be embodied in an outer rotor type motor in which the rotor is arranged on an outer peripheral side of the stator.

The configuration of not only the rotor 213 but also of the motor 11 may be changed as necessary.

A fifth embodiment of the brushless motor will now be described with reference to FIGS. 48 to 50. The brushless motor of the fifth embodiment includes parts that are the same as the brushless motor 11 of the first embodiment.

Therefore, only portions of the brushless motor that differ from the first embodiment will be described in detail, and description of the common portions will be omitted for the sake of convenience.

Figure 48:
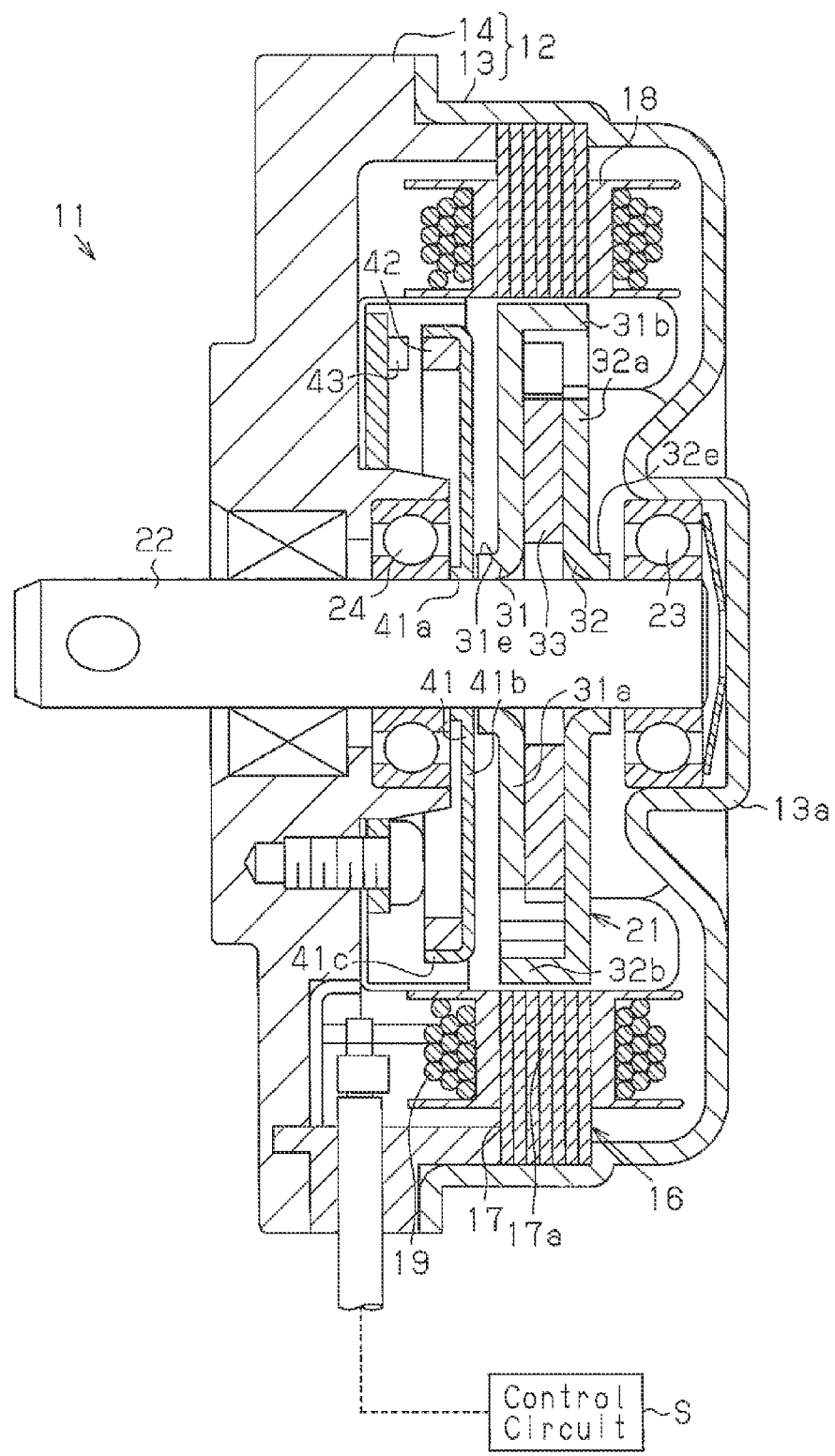
FIG. 48 is a cross-sectional view of a motor according to a fifth embodiment of the present disclosure.
Figure 49:
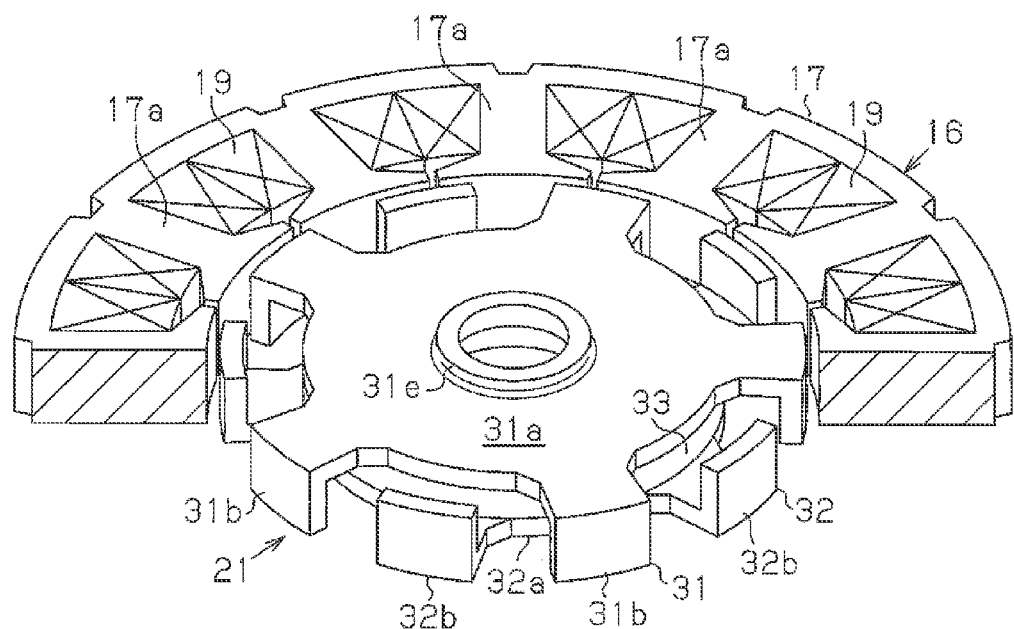
FIG. 49 is a partially cross-sectional perspective view of the motor shown in FIG. 48.

As shown in FIGS. 48 and 49, a substantially cylindrical boss 31e is formed in a central portion of a first core base 31a of a first rotor core 31. A rotation shaft 22 extends through the boss 31e. A plurality of (five in this embodiment) first claw-shaped magnetic poles 31b are provided on an outer portion of the first core base 31a at equal intervals. Each of the first claw-shaped magnetic poles 31b projects radially outward, and extends along an axial direction toward a direction opposite from a projecting direction of the boss 31e.

Second rotor cores 32 have the same shapes as those of first rotor cores 31. A substantially cylindrical boss 32e is formed in a central portion of a second core base 32a. The rotation shaft 22 extends through the boss 32e. A plurality of second claw-shaped magnetic poles 32b are provided on an outer portion of the second core base 32a at equal intervals. Each of the second claw-shaped magnetic poles 32b projects radially outward, and extends along an axial direction toward a direction opposite from a projecting direction of the boss 32e.

Figure 50:
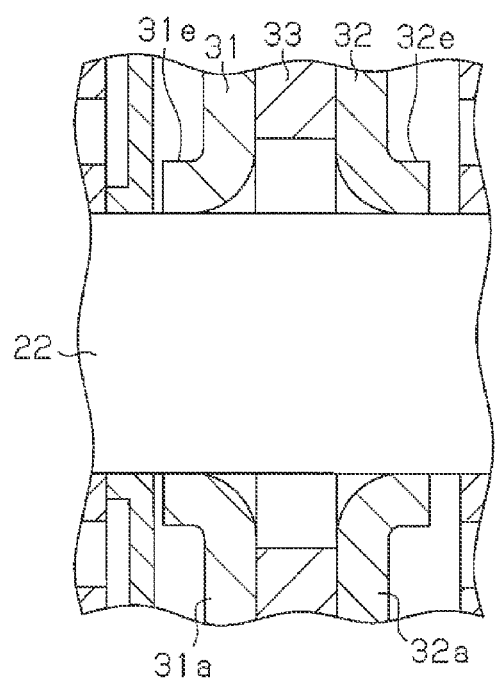
FIG. 50 is a partially enlarged cross-sectional view of the rotor shown in FIG. 48.

Here, as shown in FIG. 50, the bosses 31e and 32e formed in the first and second core bases 31a and 32a of the fifth embodiment are formed by burring. The bosses 31e and 32e are swaged from a radially outer side in a state where the rotation shaft 22 extends through the bosses 31e and 32e, and the bosses 31e and 32e are fixed to the rotation shaft 22.

In the fifth embodiment, the bosses 31e and 32e function as reinforcements.

In the rotor 21 of the fifth embodiment, the five first claw-shaped magnetic poles 31b which become north poles and the five second claw-shaped magnetic poles 32b which become south poles are alternately arranged in the circumferential direction, and the number of poles is ten (five pairs of poles). That is, in the fifth embodiment, the number of poles of the rotor 21 is set to "ten", and the number of teeth 17a of a stator 16 is set to "twelve". An inner diameter of an annular magnet 33 of the fifth embodiment is set greater than outer diameters of the bosses 31e and 32e.

As shown in FIG. 48, a magnet fixing member 41 includes a disk portion 41b. A fixing boss 41a is formed in a central portion of the disk portion 41b. The magnet fixing member 41 also includes a cylindrical portion 41c extending in a cylindrical form from an outer edge of the disk portion 41b. An annular sensor magnet 42 is fixed to the magnet fixing member 41 such that the sensor magnet 42 abuts against an inner circumferential surface of the cylindrical portion 41c and a surface of the disk portion 41b. The fixing boss 41a is fitted to the rotation shaft 22. Thus, the magnet fixing member 41 is fixed to the rotation shaft 22 at a position close to the first rotor core 31.

In a front end plate 14, a hall IC 43 as a magnetic sensor is provided at a position opposed to the sensor magnet 42 in the axial direction. If the hall IC 43 detects magnetic fields of the north pole and south pole based on the sensor magnet 42, the hall IC 43 outputs a High level detection signal and a Low level detection signal to a control circuit S.

Next, a manufacturing method of the rotor 21 configured as described above and its operation will be described.

The manufacturing method of the rotor 21 includes a burring process and a swaging process. In the burring process, the bosses 31e and 32e are formed in the first and second core bases 31a and 32a by burring. At this time, strong pressure is applied to portions of inner circumferential surfaces of the bosses 31e and 32e, and magnetic resistance at these portions becomes high. In the swaging process, the bosses 31e and 32e are swaged in a state where the rotation shaft 22 extend through the bosses 31e and 32e to fix the first rotor core 31 to the rotation shaft 22. At this time, strong pressure is applied to the outer circumferential surfaces of the bosses 31e and 32e, and magnetic resistance at these portions becomes high.

Next, advantages of the fifth embodiment in addition to advantage (1) of the first embodiment will be described below.

(24) The bosses 31e and 32e are formed by burring. The bosses 31e and 32e project in the axial direction toward a direction opposite from the projecting direction of the first and second claw-shaped magnetic poles 31b and 32b. If pressure is applied to metal by burring, magnetic resistance in the metal is increased by plastic deformation of the metal. Therefore, magnetic resistance of the bosses 31e and 32e becomes high. The bosses 31e and 32e project in the axial direction toward the direction opposite from the projecting direction of the first and second claw-shaped magnetic poles 31b and 32b. Hence, a contact portion between the first rotor core 31 and the rotation shaft 22 and a contact portion between the second rotor core 32 and the rotation shaft 22 separate from each other, and a magnetic path between the two contact portions becomes long. According to these facts, for example, it is possible to reduce a leakage magnetic flux in the axial direction generated between radially inner side portions of the first and second core bases 31a and 32a and by extension, to enhance motor efficiency. By the bosses 31e and 32e, it is possible to fix the first and second rotor cores 31 and 32 to the rotation shaft 22 over a wider axial range than plate thicknesses of the first and second core bases 31a and 32a. Hence, fixing strength between the rotation shaft 22 and the first and second rotor cores 31 and 32 can be increased.

(25) The first rotor core 31 is fixed to the rotation shaft 22 by swaging the bosses 31e and 32e in the state where the rotation shaft 22 extends through the bosses 31e and 32e. If pressure is applied to metal by swaging, magnetic resistance in the swaged metal is increased by plastic deformation of the metal. Therefore, magnetic resistance of the bosses 31e and 32e further becomes high. According to these facts, it is possible to further reduce the leakage magnetic flux in the axial direction generated between the radially inner side portions of the first and second core bases 31a and 32a and by extension, to further enhance the motor efficiency.

(26) The inner diameter of the annular magnet 33 is set to be greater than the outer diameters of the bosses 31e and 32e. Hence, it is possible to more effectively reduce the leakage magnetic flux in the axial direction.

The fifth embodiment may be modified as follows.

The bosses 31e and 32e are merely cylindrical in shape in the fifth embodiment. Instead, for example, inner circumferences of the bosses 31e and 32e may be formed to have non-circular shapes.

Figure 51A:
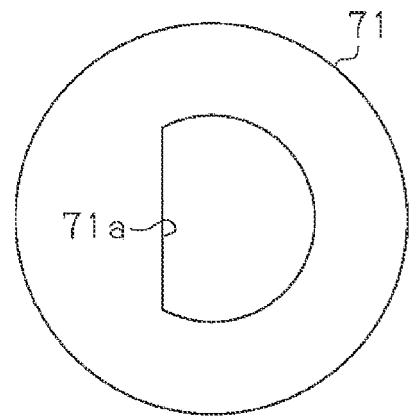
FIGS. 51A to 51C are plan views of bosses in other examples of the fifth embodiment.

As shown in FIG. 51A for example, an inner circumference 71a of a boss 71 may be of a D-shape as viewed from the axial direction. In this case, the rotation shaft has a shape corresponding to the inner circumference 71a of the boss 71.

Figure 51B:
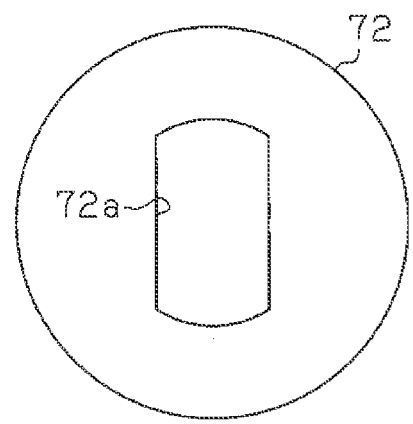

As shown in FIG. 51B for example, an inner circumference 72a of a boss 72 may be of a two-surface width shape, i.e., of a shape including two parallel surfaces as viewed from the axial direction. In this case, the rotation shaft has a shape corresponding to the inner circumference 72a of the boss 72.

Figure 51C:
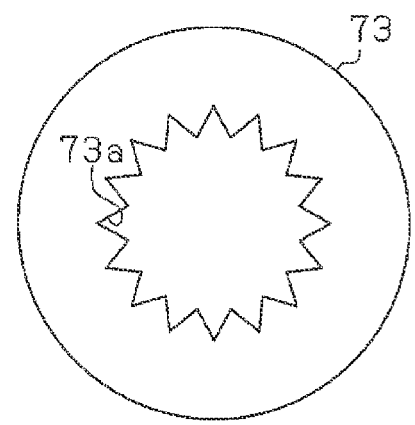

As shown in FIG. 51C, for example, an inner circumference 73a of a boss 73 may be of a serration shape as viewed from the axial direction. In this case, the rotation shaft has a shape corresponding to the inner circumference 73a of the boss 73.

Further, an inner circumference of a boss may be of a spline shape (not shown) as viewed from the axial direction for example. In this case, the rotation shaft has a shape corresponding to the inner circumference of the boss.

If these changes are employed, since the inner circumferences 71a to 73a of the bosses 71 to 73 are formed into non-circular shapes, it is possible to further enhance the fixing strength between the boss and the rotation shaft. Especially, the bosses 71 to 73 (by extension, also first and second rotor cores) and the rotation shaft are prevented from relatively rotating.

The bosses 31e and 32e are swaged in the state where the rotation shaft 22 extends through the bosses 31e and 32e and the rotor core 31 is fixed to the rotation shaft 22 in the fifth embodiment, but the invention is not limited to this configuration. For example, the rotor core 31 may be fixed to the rotation shaft by press fitting the rotation shaft into the bosses 31e and 32e.

Although the inner diameter of the annular magnet 33 is set greater than the outer diameters of the bosses 31e and 32e in the fifth embodiment, the invention is not limited to this configuration. For example, the inner diameter of the annular magnet 33 may be set to be equal to or smaller than the outer diameters of the bosses 31e and 32e.

In the fifth embodiment, the present disclosure is embodied in the brushless motor in which the number of poles of the rotor 21 is set to "ten" and the number of teeth 17a of a stator 16 is set to "twelve", but the number of rotor 21 and the number of teeth 17a of the stator 16 may be changed. For example, the present disclosure may be embodied in a brushless motor in which the number of poles of the rotor 21 is set to "eight" and the number of teeth 17a of a stator 16 is set to "twelve".

In the rotor 21 of the fifth embodiment, radially inner sides (back surfaces) of the first and second claw-shaped magnetic poles 31b and 32b may be provided with a back surface auxiliary magnet which is magnetized in the radial direction to suppress a leakage (short circuit) magnetic flux of these portions.

In the rotor 21 of the fifth embodiment, a circumferentially magnetized interpolar magnet may be provided between the first and second claw-shaped magnetic poles 31b and 32b in the circumferential direction to suppress a leakage magnetic flux of these portions.

The bosses 31e and 32e may be formed by sintering instead of burring, for example. The bosses formed by sintering are swaged and fixed to the rotation shaft as in the fifth embodiment. Thus, the same advantage as advantage (25) of the fifth embodiment can be obtained.

A sixth embodiment of the brushless motor will now be described with reference to FIGS. 52 to 54. The brushless motor of the sixth embodiment includes portions that are the same as the brushless motor 11 of the first embodiment. Therefore, only portions of the brushless motor that differ from the first embodiment will be described in detail, and description of the common portions will be omitted for the sake of convenience.

Figure 52:
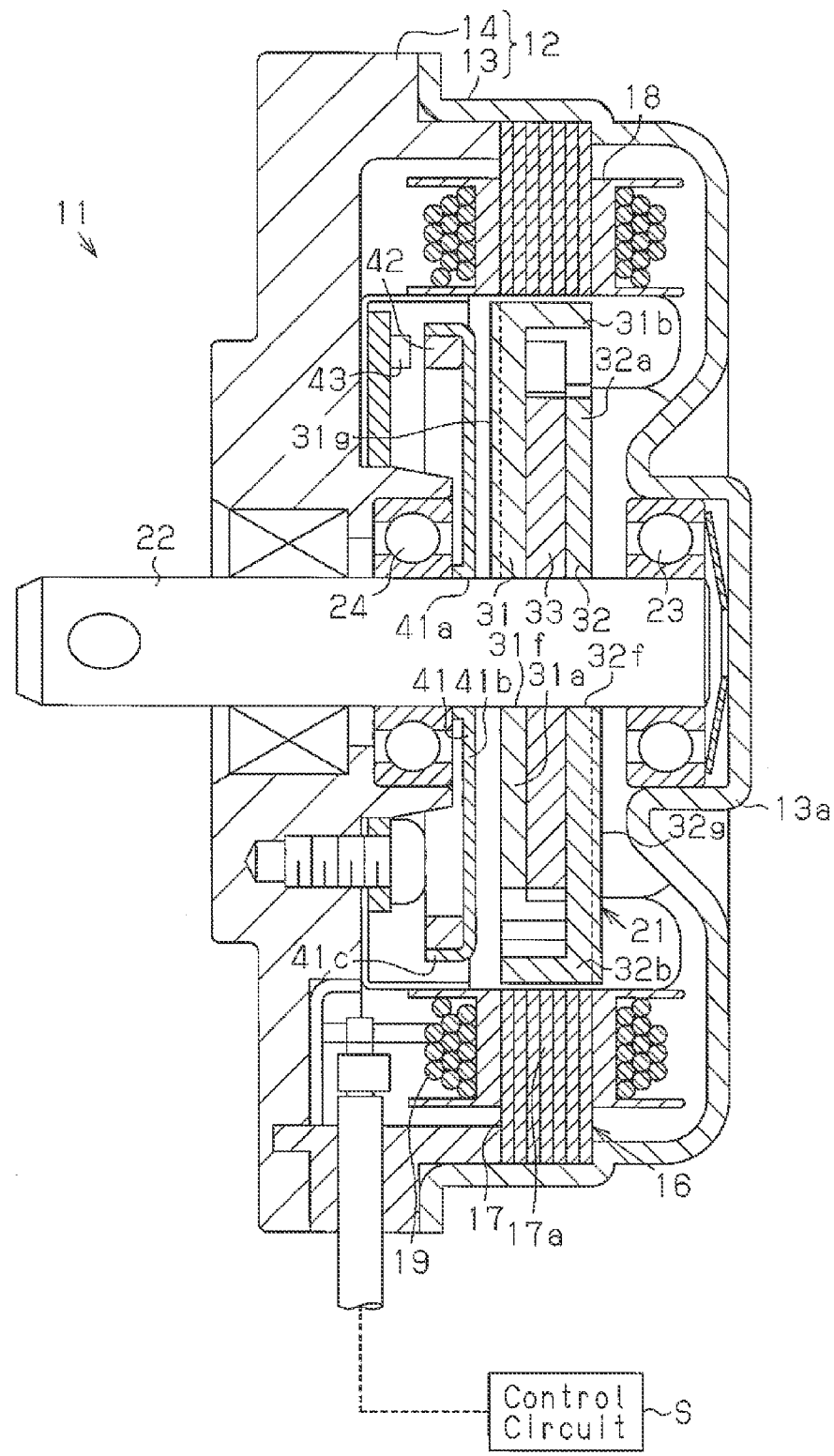
FIG. 52 is a cross-sectional view of a motor according to a sixth embodiment of the present disclosure.
Figure 53:
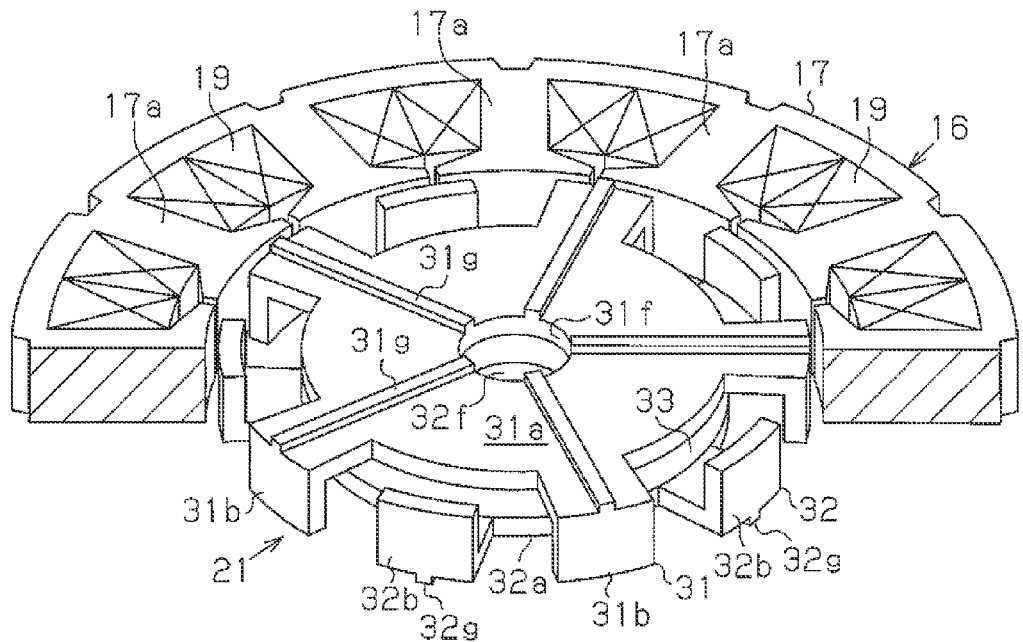
FIG. 53 is a partially cross-sectional perspective view of the motor shown in FIG. 52.
Figure 54:
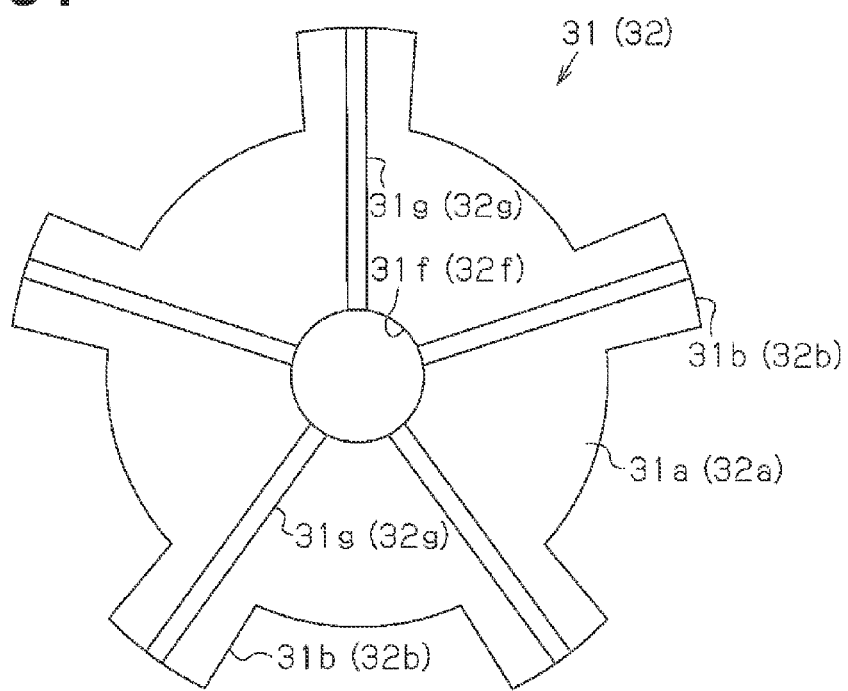
FIG. 54 is a plan view of first and second rotor cores shown in FIG. 53.

As shown in FIGS. 52 to 54, a central bore 31f is formed in a central portion of a first core base 31a of a first rotor core 31, and a rotation shaft 22 is inserted through the central bore 31f. A plurality of (five in this embodiment) first claw-shaped magnetic poles 31b are provided on an outer portion of the first core base 31a at equal intervals. The first claw-shaped magnetic poles 31b project radially outward and extend in the axial direction.

A second rotor core 32 has the same shape as that of the first rotor core 31. A central bore 32f is formed in a central portion of a second core base 32a, and the rotation shaft 22 is inserted through the central bore 32f. A plurality of second claw-shaped magnetic poles 32b are provided on an outer portion of the second core base 32a at equal intervals. The second claw-shaped magnetic poles 32b project radially outward and extend in the axial direction. The first and second rotor cores 31 and 32 are fixed to the rotation shaft 22 by press fitting the rotation shaft 22 into the central bores 31f and 32f.

In the rotor 21 of the sixth embodiment, the five first claw-shaped magnetic poles 31b which become north poles and the five second claw-shaped magnetic poles 32b which become south poles are alternately arranged in the circumferential direction, and the number of poles is ten (five pairs of poles). That is, in the sixth embodiment, the number of poles of the rotor 21 is set to "ten", and the number of teeth 17*a* of a stator 16 is set to "twelve".

Here, as shown in FIGS. 52 to 54, ribs 31*g* and 32*g* are formed on axial end surfaces of the first and second rotor cores 31 and 32. The ribs 31*g* and 32*g* extend from the first and second core bases 31*a* and 32*a* to the first and second claw-shaped magnetic poles 31*b* and 32*b*.

More specifically, the ribs 31*g* and 32*g* of the sixth embodiment extend from radially inner ends of the first and second core bases 31*a* and 32*a* to radially outer ends of the first and second claw-shaped magnetic poles 31*b* and 32*b*. The ribs 31*g* and 32*g* are (radially) arranged in the circumferential direction. The ribs 31*g* and 32*g* are provided at circumferentially central positions of the first and second claw-shaped magnetic poles 31*b* and 32*b* for the respective first and second claw-shaped magnetic poles 31*b* and 32*b*. A cross-section of each of the ribs 31*g* and 32*g* in the axial direction of the rotor 21 is quadrangle in shape. The ribs 31*g* and 32*g* having the above-described shapes are formed by pressing.

In the sixth embodiment, the ribs 31*g* and 32*g* function as reinforcements.

As shown in FIG. 52, a magnet fixing member 41 includes a disk portion 41*b* and a cylindrical portion 41*c*. A fixing boss 41*a* is formed in a central portion of the disk portion 41*b*. The cylindrical portion 41*c* cylindrically extends from an outer edge of the disk portion 41*b*. An annular sensor magnet 42 is fixed to the magnet fixing member 41 such that the annular sensor magnet 42 abuts against an inner circumferential surface of the cylindrical portion 41*c* and a surface of the disk portion 41*b*. The fixing boss 41*a* is fitted to the rotation shaft 22. Thus, the magnet fixing member 41 is fixed to the rotation shaft 22 at a position close to the first rotor core 31.

In a front end plate 14, a hall IC 43 serving as a magnetic sensor is provided at a position opposed to the sensor magnet 42 in the axial direction. If the hall IC 43 detects magnetic fields of the north pole and south pole based on the sensor magnet 42, the hall IC 43 outputs a High level detection signal and a Low level detection signal to the control circuit S.

Next, operation of the brushless motor 11 having the above-described configuration will be described.

When three-phase drive current is supplied from the control circuit S to a winding 19, a rotating field is generated in the stator 16, and the rotor 21 is rotated and driven. At this time, the sensor magnet 42 which is opposed to the hall IC 43 rotates and the level of the detection signal which is output from the hall IC 43 is switched in accordance with a rotation angle (position) of the rotor 21. Based on the detection signal, three-phase drive current which is switched with optimal timing is supplied from the control circuit S to the winding 19. Thus, a rotating field is excellently generated, and the rotor 21 is rotated and driven continuously is a satisfactory manner.

Next, advantages of the sixth embodiment other than the advantage (1) of the first embodiment will be described below.

(27) The ribs 31*g* and 32*g* extending from the first and second core bases 31*a* and 32*a* to the first and second claw-shaped magnetic poles 31*b* and 32*b* are formed on the first and second rotor cores 31 and 32. Hence, even if an external force caused when the rotation shaft 22 is press-fitted into the central bores 31*f* and 32*f* of the central portions of the first and second core bases 31*a* and 32*a* or a centrifugal force caused at the time of high speed rotation is applied for example, it is possible to limit deformation (bending) of the first and second claw-shaped magnetic poles 31*b* and 32*b* from their base ends.

(28) The ribs 31*g* and 32*g* extend from the radial inner ends of the first and second core bases 31*a* and 32*a*. Hence, even if an external force caused when the rotation shaft 22 is press-fitted into the central bores 31*f* and 32*f* of the central portions of the first and second core bases 31*a* and 32*a* is applied, for example, it is possible to limit deformation of the radially inner side portions of the first and second core bases 31*a* and 32*a*.

(29) The ribs 31*g* and 32*g* extend to the radially outer ends of the first and second claw-shaped magnetic poles 31*b* and 32*b*. Hence, it is possible to limit deformation of the radially outer side portions of the first and second claw-shaped magnetic poles 31*b* and 32*b*.

(30) The ribs 31*g* and 32*g* are arranged in the circumferential direction of the rotor 21. The ribs 31*g* and 32*g* are provided at circumferentially central portions of the first and second claw-shaped magnetic poles 31*b* and 32*b* for the respective first and second claw-shaped magnetic poles 31*b* and 32*b*. Hence, it is possible to limit deformation of the first and second claw-shaped magnetic poles 31*b* and 32*b* in a balanced manner. Since the circumferentially central portions of the first and second claw-shaped magnetic poles 31*b* and 32*b* are thick, magnetic balance is also enhanced.

(31) The ribs 31*g* and 32*g* are formed through pressing. Hence, it is easy to produce the ribs 31*g* and 32*g*.

The sixth embodiment may be modified as follows.

The central bores 31*f* and 32*f* are merely formed in the central portions of the first and second core bases 31*a* and 32*a* in the sixth embodiment. Instead, for example, bosses into which the rotation shaft 22 is press-fitted may be formed in the central portions of the first and second core bases 31*a* and 32*a* such that the bosses project in the axial direction.

Figure 55:
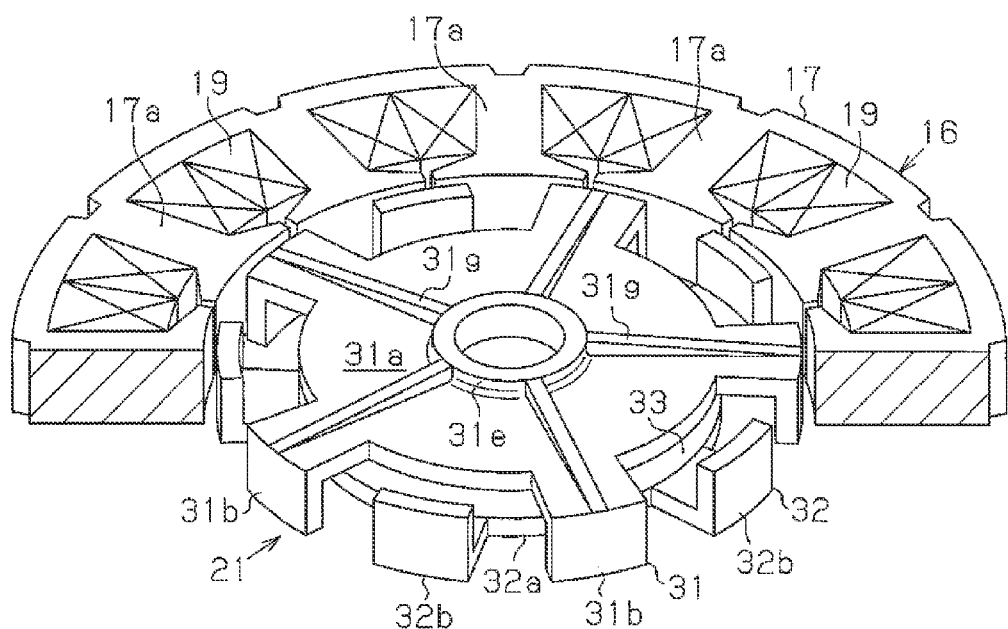
FIG. 55 is a partially cross-sectional perspective view of a motor of another example of the sixth embodiment.

The first and second core bases 31*a* and 32*a* may be changed as shown in FIG. 55, for example. In this example, a boss 31*e*, into which a rotation shaft 22 is press-fitted, is formed in a central portion of a first core base 31*a* such that the boss 31*e* projects in the axial direction. Ribs 31*g* in this example continuously extend from the boss 31*e* (ribs 31*g* are connected to boss 31*e*). The ribs 31*g* in this example extend to radially outer ends of the first claw-shaped magnetic poles 31*b*, and heights of the ribs 31*g* gradually become lower toward radially outer ends. The second rotor cores 32 are also configured in the same manner.

In this case, the same advantages as the sixth embodiment may also be obtained. Since the boss 31*e* is formed, it is possible to fix the first and second rotor cores 31 and 32 and the rotation shaft 22 to each other over a wide axial range. Thus, it is possible to enhance fixing strength between the first and second rotor cores 31 and 32 and the rotation shaft 22. Further, the ribs 31*g* continuously extend from the boss 31*e*. Hence, strengths of the ribs 31*g* and the boss 31*e* are enhanced, and it is possible to further limit deformation at radially inner sides of the first and second core bases 31*a* and 32*a*.

Shapes of the ribs 31*g* and 32*g* of the sixth embodiment may be modified as long as they extend from the first and second core bases 31*a* and 32*a* to the first and second claw-shaped magnetic poles 31*b* and 32*b*.

Figure 56A:
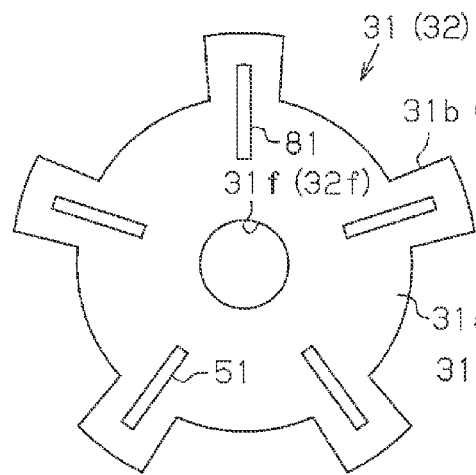
FIGS. 56A to 56D are plan views of first and second rotor cores of another example of the sixth embodiment.

The ribs may be changed as shown in FIG. 56A for example. Ribs 81 in this example extend along the radial direction from radially intermediate portions of first and second core bases 31*a* and 32*a* to radially intermediate portion of first and second claw-shaped magnetic poles 31*b* and 32*b*.

Figure 56B:
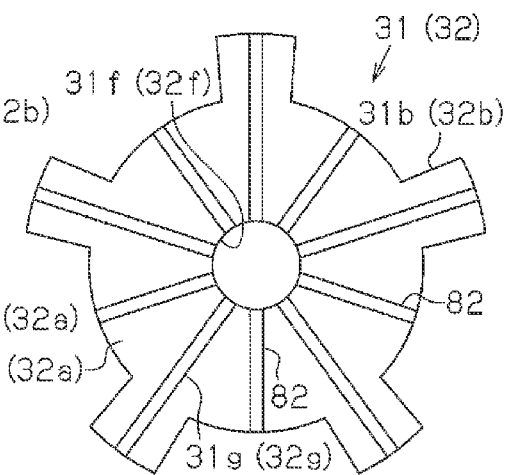

The ribs may be changed as shown in FIG. 56B for example. First and second rotor cores 31 and 32 in this example are provided with, in addition to ribs 31g and 32g of the sixth embodiment, auxiliary ribs 82 also at positions in the circumferential direction where first and second claw-shaped magnetic poles 31b and 32b are not formed. The auxiliary ribs 82 extend along the radial direction from radially inner ends to radially outer ends of first and second core bases 31a and 32a. Thus, the auxiliary ribs 82 can further limit deformation of the first and second core bases 31a and 32a.

Figure 56C:
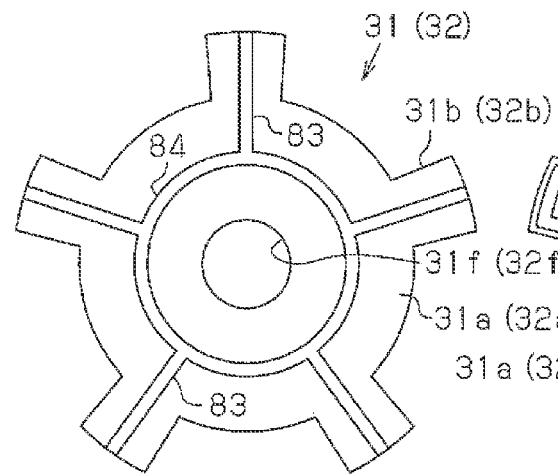

The ribs may be changed as shown in FIG. 56C for example. Ribs 83 of this example extend along the radial direction from radially intermediate portions of first and second core bases 31a and 32a to radially outer ends of first and second claw-shaped magnetic poles 31b and 32b. An annular rib 84 which is annular in shape is provided on a radially intermediate portion of each of the first and second core bases 31a and 32a such that the annular rib 84 connects radially inner ends of the ribs 83 to each other. Thus, it is possible to enhance the strength of the ribs 83.

Figure 56D:
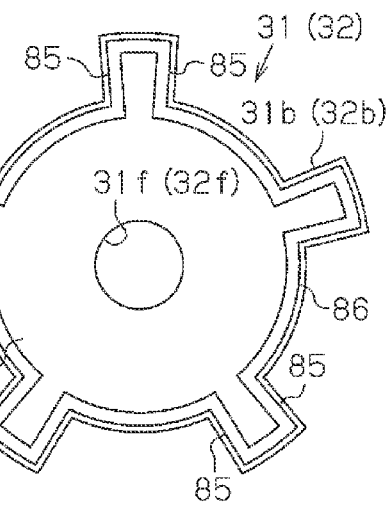

The ribs may be changed as shown in FIG. 56D for example. Ribs 85 in this example are portions of a piping rib 86 which extends along an outer edge of a flat surface of each of first and second core bases 31a and 32a and each of first and second claw-shaped magnetic poles 31b and 32b. In the piping rib 86, portions extending along the radial direction from each of the first and second core bases 31a and 32a to each of the first and second claw-shaped magnetic poles 31b and 32b are the ribs 85. In this example, each of the first and second claw-shaped magnetic poles 31b and 32b are provided with the ribs 85 in pairs. Hence, it is possible to further limit deformation (bending) of the first and second claw-shaped magnetic poles 31b and 32b from their base ends.

Although the cross-sections of the ribs 31g and 32g extending in the axial direction of the rotor 21 are tetragonal in shape in the sixth embodiment, the invention is not limited to this configuration. For example, the cross-sections may be arcuate or triangular in shape.

The ribs 31g and 32g are formed by pressing in the sixth embodiment. Instead, ribs having the similar shape may be formed by sintering, for example.

The present disclosure is applied to the brushless motor in which the number of poles of the rotor 21 is set to "ten" and the number of teeth 17a of a stator 16 is set to "twelve" in the sixth embodiment. However, the number of the poles of the rotor 21 and the number of the teeth 17a of the stator 16 may be changed. For example, the present disclosure may be embodied in a brushless motor in which the number of poles of the rotor 21 is set to "eight" and the number of teeth 17a of a stator 16 is set to "twelve".

In the rotor 21 of the sixth embodiment, radially inner sides (back surfaces) of the first and second claw-shaped magnetic poles 31b and 32b may be provided with radially magnetized back surface auxiliary magnets to reduce magnetic flux leakage (short circuit) at these portions.

In the rotor 21 of the sixth embodiment, a circumferentially magnetized interpolar magnet may be provided between the first and second claw-shaped magnetic poles 31b and 32b in the circumferential direction to reduce magnetic flux leakage at these portions.

Figures 57A, 57B:
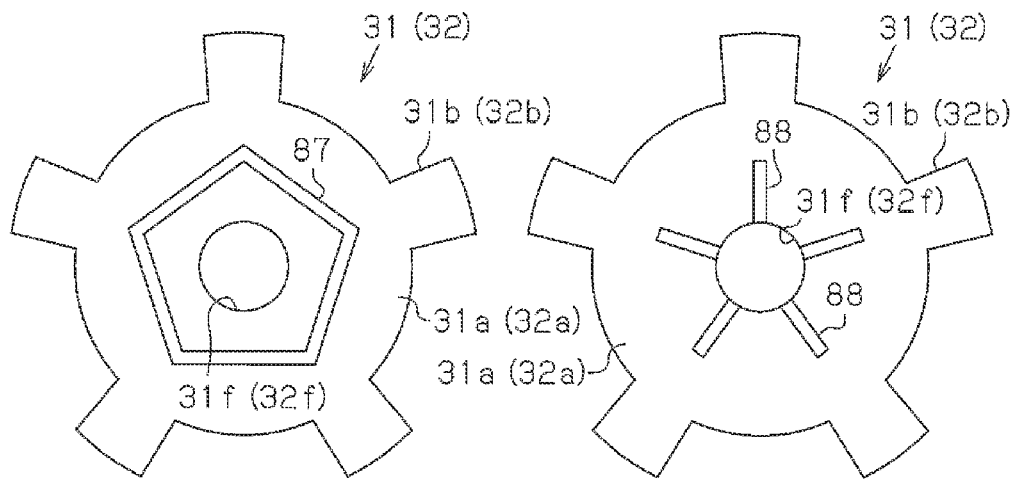
FIGS. 57A and 57B are plan views of first and second rotor cores in reference examples of the sixth embodiment.
Figure 58:
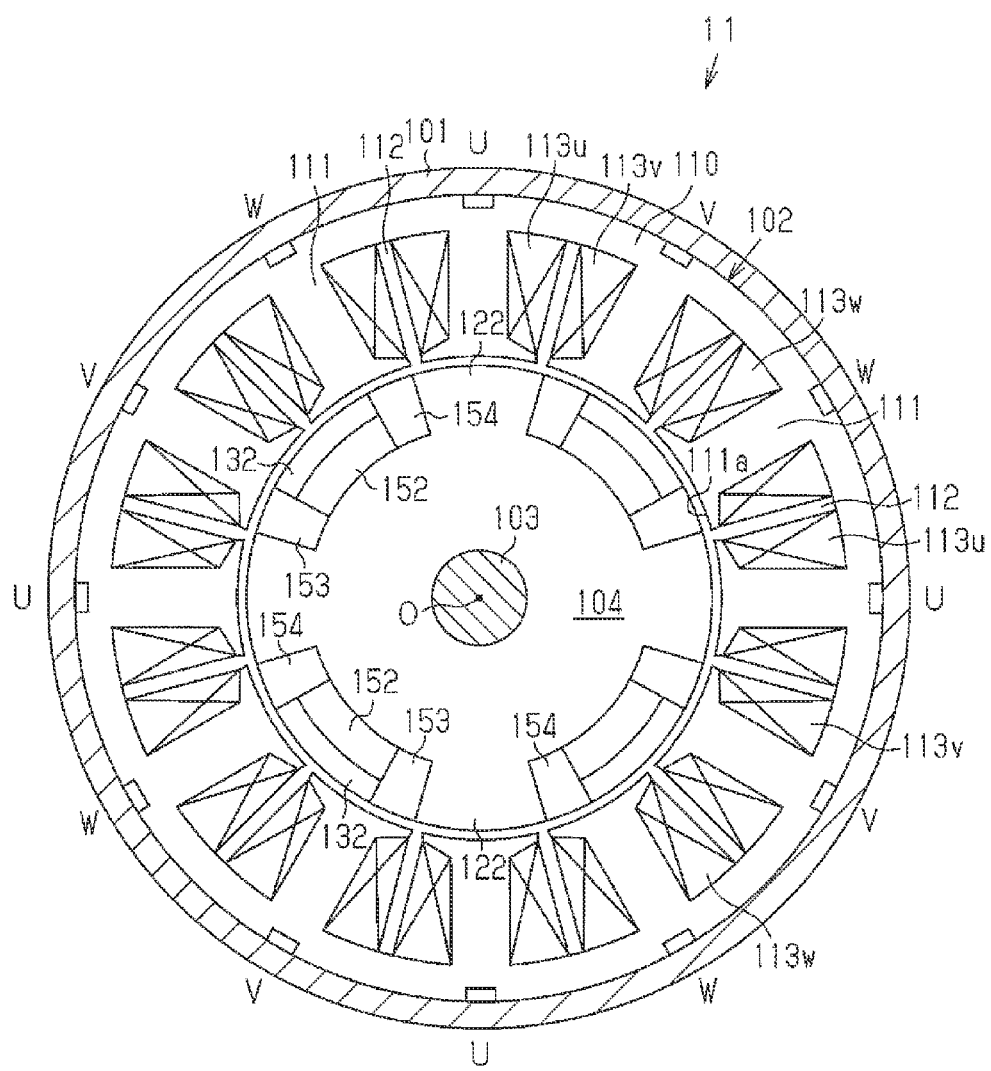
FIG. 58 is a cross-sectional view of a brushless motor according to a seventh embodiment of the present disclosure as viewed form its axial direction.
Figure 59A:
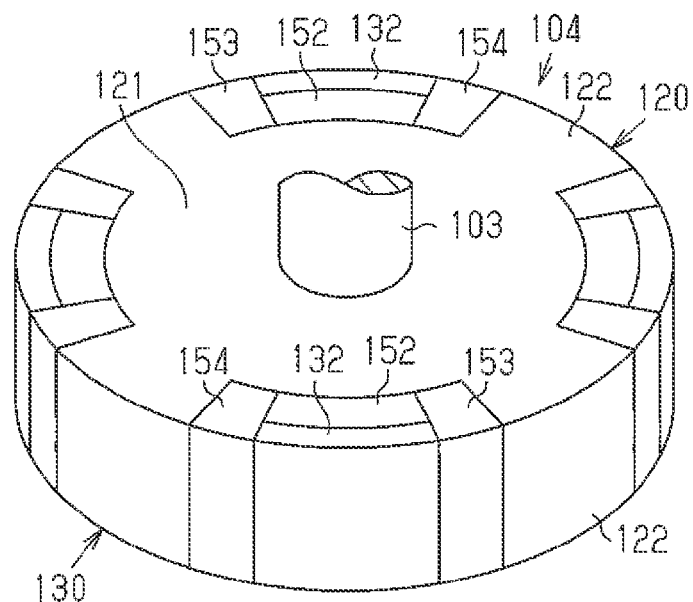
FIG. 59A is a perspective view of a rotor shown in FIG. 58 as viewed from a first rotor core.
Figure 59B:
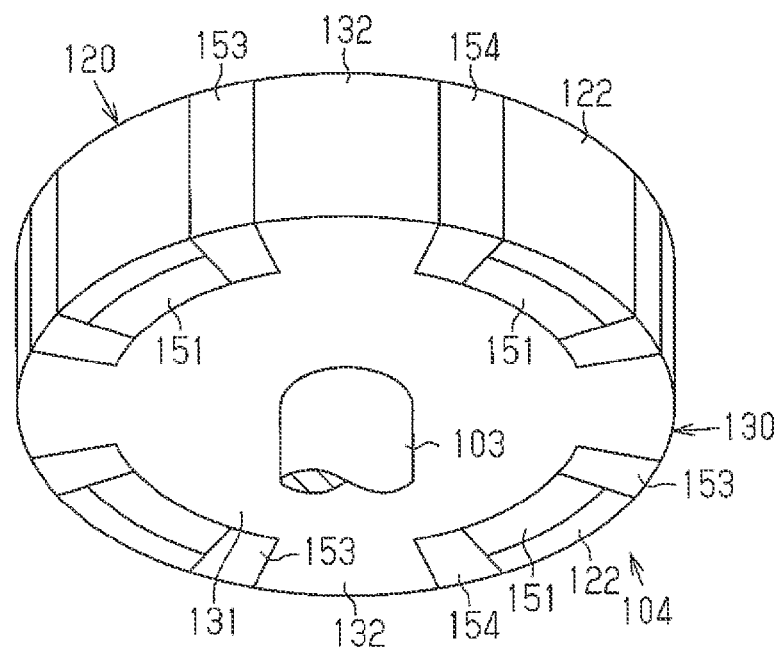
FIG. 59B is a perspective view of the rotor shown in FIG. 58 as viewed from a second rotor core.
Figure 60:
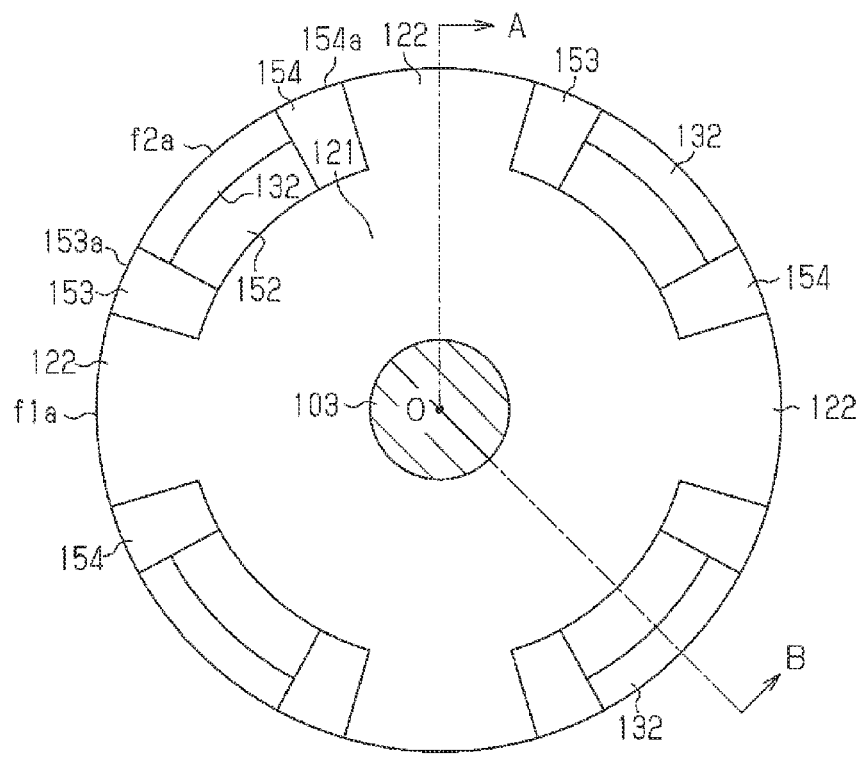
FIG. 60 is a front view of the rotor shown in FIG. 58 as viewed from its axial direction.

A reference example shown in FIG. 57A shows a polygonal rib 87 provided only on each of first and second core bases 31a and 32a of each of first and second rotor cores 31 and 32. In this example, the polygonal rib 87 is formed into a regular pentagonal shape as viewed from the axial direction, and vertexes (angles) are located at circumferential positions corresponding to the first and second claw-shaped magnetic poles 31b and 32b.

The polygonal rib 87 can be displaced in the radial direction in each of the first and second core bases 31a and 32a. Thus, it is possible to effectively limit deformation of the first and second core bases 31a and 32a.

A reference example shown in FIG. 57B shows inner ribs 88 provided only on first and second core bases 31a and 32a of each of first and second rotor cores 31 and 32. The inner ribs 88 extend along the radial direction from radially inner ends of the first and second core bases 31a and 32a to radially intermediate portions of the first and second core bases 31a and 32a.

The inner ribs 88 may be displaced in the radial direction in the first and second core bases 31a and 32a. Thus, it is possible to effectively limit deformation of the first and second core bases 31a and 32a. Especially, the inner ribs 88 extend from radially inner ends of the first and second core bases 31a and 32a. Hence, even if an external force caused when the rotation shaft 22 is press-fitted into the central bores 31f and 32f of the central portions of the first and second core bases 31a and 32a is applied for example, it is possible to limit deformation at radially inner side portions of the first and second core bases 31a and 32a.

A seventh embodiment of the brushless motor will now be described with reference to FIGS. 58 to 62. The brushless motor of the seventh embodiment includes portions that are the same as the brushless motor 11 of the second embodiment. Therefore, only portions of the brushless motor that differ from the second embodiment will be described in detail, and description of the common portions will be omitted for the sake of convenience.

Figure 61:
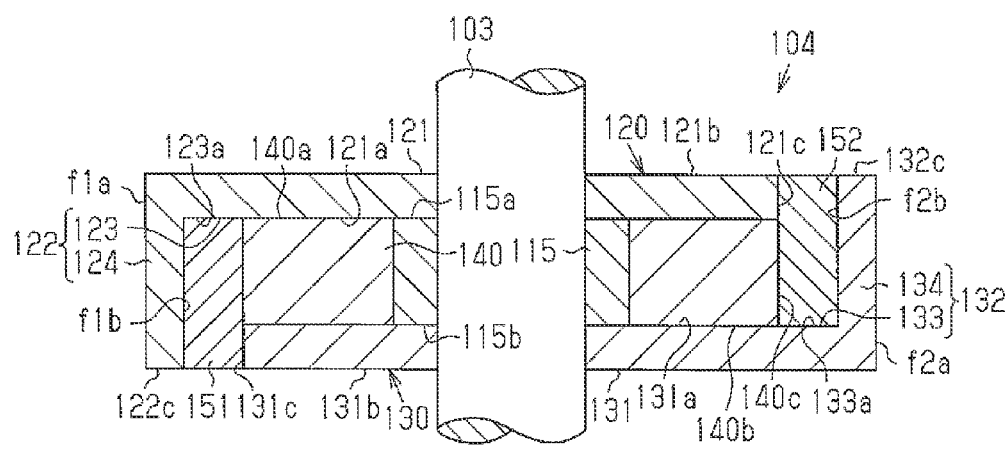
FIG. 61 is a combined cross-sectional view taken along line A-O-B in FIG. 60.
Figure 62:
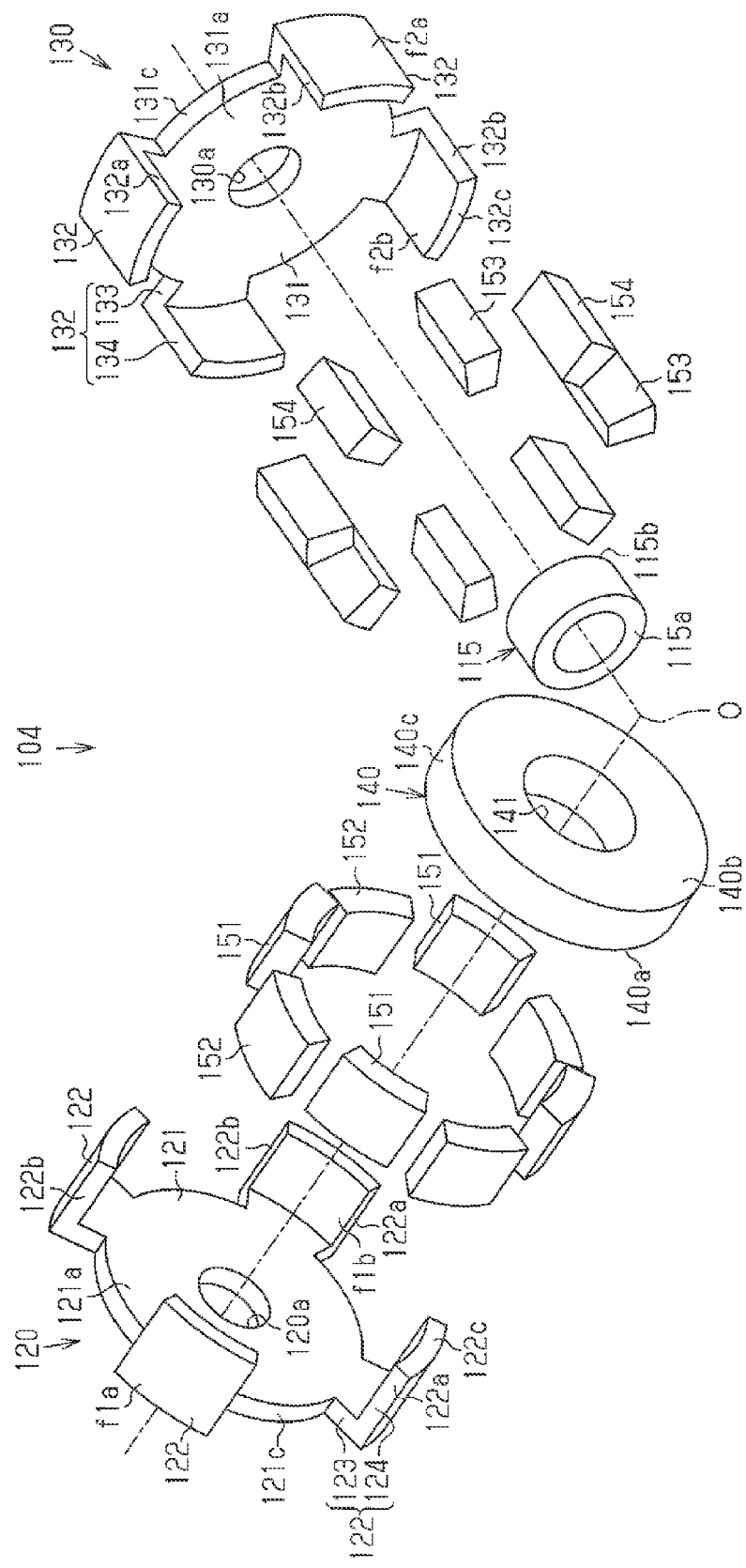
FIG. 62 is an exploded perspective view of the rotor shown in FIG. 58.

As shown in FIGS. 61 and 62, a field magnet 140 is arranged on an outer circumferential surface of a fixing cylinder 115. That is, the fixing cylinder 115 is inserted through a through bore 141 of the field magnet 140.

In the seventh embodiment, a length of the fixing cylinder 115 in the axial direction, i.e., a length from a first end surface 115a as a first stepped surface to a second end surface 115b as a second stepped surface is the same as a length of the field magnet 140 in the axial direction (length from side surface 140a to side surface 140b).

As shown in FIG. 62, a first rotor core 120 includes a disk-shaped first core base 121 made of magnetic steel sheet which is soft magnetic material. A through bore 120a is formed in a center portion of the first core base 121, and a rotation shaft 103 is inserted through the through bore 120a. The first core base 121 is crimped onto and fixed to a predetermined position of the rotation shaft 103 by press fitting the rotation shaft 103 into the through bore 120a.

As shown in FIG. 62, the second rotor core 130 is made of the same material as that of the first rotor core 120 and has the same shape as that of the first rotor core 120. The second rotor core 130 has a disk-shaped second core base 131 formed from magnetic steel sheet. A through bore 130a through which the rotation shaft 103 is inserted is formed in a center portion of the second rotor core 131. The second core base 131 is crimped onto and fixed to a predetermined position of the rotation shaft 103 by press fitting the rotation shaft 103 into the through bore 130a.

As shown in FIGS. 61 and 62, the field magnet 140 is a disk-shaped permanent magnet made of neodymium magnet. A through bore 141 is formed in a central portion of the field magnet 140. A fixing cylinder 115 is inserted through the through bore 141 of the field magnet 140. One side surface 140a of the field magnet 140 comes into close contact with an opposing surface 121a of the first core base 121, and the other side surface 140b of the field magnet 140 comes into close contact with an opposing surface 131a of the second core base 131, and they are adhered and fixed to each other using magnetic adhesive through which a magnetic field passes.

An outer diameter of the field magnet 140 matches with outer diameters of the first and second core bases 121 and 131, and a thickness (axial length) of the field magnet 140 is the same as an axial length of the fixing cylinder 115.

That is, as shown in FIG. 61, when the field magnet 140 is arranged between the first rotor core 120 and the second rotor core 130, a distal end surface 122c of the first claw-shaped magnetic pole 122 (first magnetic pole portion 124) and a non-facing surface 131b of the second core base 131 are flush with each other. Similarly, a distal end surface 132c of the second claw-shaped magnetic pole 132 (second magnetic pole portion 134) and a non-facing surface 121b of the first core base 121 are flush with each other. Further, an outer circumferential surface 140c of the field magnet 140 is flush with outer circumferential surfaces 121c and 131c of the first and second core bases 121 and 131.

Next, the operation of the brushless motor 11 configured as described above will be described illustrating the assembling method of the rotor 104.

First, the rotation shaft 103 is press-fitted into the fixing cylinder 115, and the fixing cylinder 115 is crimped onto and fixed to the rotation shaft 103. The annular first end surface 115a of the fixing cylinder 115 is pressed in the axial direction using a cylindrical jig in a state where one of openings (opening closer to second end surface 115b for example) of the fixing cylinder 115 is abutted against the rotation shaft 103. The rotation shaft 103 is press-fitted from the other opening of the fixing cylinder 115 by pressing the first end surface 115a of the fixing cylinder 115 by the cylindrical jig.

Subsequently, the fixing cylinder 115 fixed to the rotation shaft 103 is inserted through the through bore 141 of the field magnet 140, and an outer circumferential surface of the fixing cylinder 115 and an inner circumferential surface of the through bore 141 of the field magnet 140 are fixed to each other. At this time, the field magnet 140 is fixed to the fixing cylinder 115 such that the axial first end surface 115a and the axial second end surface 115b of the fixing cylinder 115 are flush with side surfaces 140a and 140b of the field magnet 140.

The field magnet 140 is positioned with respect to the fixing cylinder 115 by inserting, through the through bore 141, the fixing cylinder 115 which the rotation shaft 103 is press-fitted into and fixed to.

Next, the rotation shaft 103 is press-fitted into the through bore 120a of the first rotor core 120 (first core base 121) by the above-described method such that the opposing surface 121a of the first core base 121 and the side surface 140a of the field magnet 140 are opposed to each other. At this time, the rotation shaft 103 is press-fitted into the through bore 120a until the opposing surface 121a of the first core base 121 abuts against the axial first end surface 115a (side surface 140a of the field magnet 140) of the fixing cylinder 115.

Then, a peripheral portion of the through bore 120a in the opposing surface 121a of the first rotor core 120 abuts against the first end surface 115a of the fixing cylinder 115. Further press fitting motion of the first rotor core 120 in the axial direction (toward field magnet 140) is regulated. Therefore, a case where a load is applied to the field magnet 140 by press fitting the rotation shaft 103 into the first rotor core 120 is avoided. As a result, when the rotation shaft 103 is press-fitted into the first rotor core 120, a load is not applied from the first rotor core 120 directly to the field magnet 140. Therefore, damage such as crack is not generated in the field magnet 140.

The opposing surface 121a of the first core base 121 and the side surface 140a of the field magnet 140 may be adhered and fixed to each other through magnetic adhesive.

Next, the rotation shaft 103 is press-fitted into the through bore 130a of the second rotor core 130 (second core base 131) in a state where the opposing surface 131a of the second core base 131 and the side surface 140b of the field magnet 140 are opposed to each other. At this time, this press-fitting operation is carried out while adjusting a relative circumferential position of the second core base 131 with respect to the previously fixed first rotor core 120.

The rotation shaft 103 is press-fitted into the through bore 120a until the opposing surface 131a of the second core base 131 abuts against the axial second end surface 115b (side surface 140a of field magnet 140) of the fixing cylinder 115.

Then, a peripheral portion of the through bore 130a in the opposing surface 131a of the second rotor core 130 abuts against the second end surface 115b of the fixing cylinder 115. Further press fitting motion of the second rotor core 130 in the axial direction (toward field magnet 140) is regulated. Therefore, a case where a load is applied to the field magnet 140 by press fitting the rotation shaft 103 into the second rotor core 130 is avoided. As a result, when the rotation shaft 103 is press-fitted into the second rotor core 130, a load is not applied from the second rotor core 130 directly to the field magnet 140. Therefore, damage such as crack is not generated in the field magnet 140.

In the seventh embodiment, the fixing cylinder 115 functions as a reinforcement.

The opposing surface 131a of the second core base 131 and the side surface 140b of the field magnet 140 may be adhered and fixed to each other using magnetic adhesive.

Thus, the rotation shaft 103 is press-fitted into and fixed to the first and second rotor cores 120 and 130. The fixing cylinder 115 and the field magnet 140 are arranged between the press-fitted and fixed first and second rotor cores 120 and 130. Therefore, the field magnet 140 is fixed to the fixing cylinder 115.

Next, the first back surface auxiliary magnets 151 are arranged on and fixed to the back surfaces f1b of the first magnetic pole portions 124, and the second back surface auxiliary magnets 152 are arranged on and fixed to the back surfaces f2b of the second magnetic pole portions 134.

More specifically, the first back surface auxiliary magnet 151 is arranged in a space formed by the back surface f1b of each of the first magnetic pole portions 124, i.e., the outer circumferential surface 131c of the second core base 131, the outer circumferential surface 140c of the field magnet 140, and a surface 123a of the first base 123 closer to the second rotor core, and the first back surface auxiliary magnet 151 is adhered and fixed using magnetic adhesive.

In the same manner, the second back surface auxiliary magnet 152 is arranged and fixed to a space formed by the back surface f2b of the second magnetic pole portion 134, i.e., the outer circumferential surface 121c of the first core base 121, the outer circumferential surface 140c of the field magnet 140, and a surface 133a of the second basal portion 133 closer to the first rotor core.

Finally, the first and second interpolar magnets 153 and 154 are arranged and fixed.

More specifically, the first interpolar magnet 153 is arranged between a flat surface formed by a circumferential end surface 122a of the first claw-shaped magnetic pole 122 and a circumferential end surface of the first back surface auxiliary magnet 151 and a flat surface formed by a circumferential end surface 132b of the second claw-shaped magnetic pole 132 and a circumferential end surface of the second back surface auxiliary magnet 152. The first interpolar magnet 153 is adhered and fixed using magnetic adhesive.

Similarly, the second interpolar magnet 154 is arranged between a flat surface formed by a circumferential end surface 122b of the first claw-shaped magnetic pole 122 and a circumferential end surface of the first back surface auxiliary magnet 151 and a flat surface formed by a circumferential end surface 132a of the second claw-shaped magnetic pole 132 and a circumferential end surface of the second back surface auxiliary magnet 152. The second interpolar magnet 154 is fixed.

This complete the assembling of the rotor 104.

Next, advantages of the seventh embodiment in addition to advantage (1) of the first embodiment will be described.

(32) In the seventh embodiment, the rotor 104 can be produced only by fixing the field magnet 140 to the fixing cylinder 115 which is crimped onto and fixed to the rotation shaft 103, and by press fitting and fixing the rotation shaft 103 into the first and second rotor cores 120 and 130. Hence, the assembling operation of the rotor 104 becomes extremely easy.

Further, it is possible to obtain a strong connecting structure by press fitting, crimping and fixing the rotation shaft 103 into and onto the first and second rotor cores 120 and 130. Thus, it is possible to prevent vibration and noise of the rotor 104 caused by rotation.

(33) In the seventh embodiment, when the rotation shaft 103 is press-fitted into the first rotor core 120, the peripheral portion of the through bore 120a in the opposing surface 121a of the first rotor core 120 abuts against the first end surface 115a of the fixing cylinder 115. Thus, further press fitting motion of the first rotor core 120 in the axial direction (toward the field magnet 140) is regulated. Therefore, when the rotation shaft 103 is press-fitted into the first rotor core 120, a load from the first rotor core 120 is not applied directly to the field magnet 140. Hence, there is no fear that damage such as crack is generated in the field magnet 140 during the assembling operation.

(34) In the seventh embodiment, when the rotation shaft 103 is press-fitted into the second rotor core 130, the peripheral portion of the through bore 130a in the opposing surface 131a of the second rotor core 130 abuts against the second end surface 115b of the fixing cylinder 115. Thus, further press fitting motion of the second rotor core 130 in the axial direction (toward the field magnet 140) is regulated. Therefore, when the rotation shaft 103 is press-fitted into the second rotor core 130, a load from the second rotor core 130 is not applied directly to the field magnet 140. Hence, there is no fear that damage such as crack is generated in the field magnet 140 during the assembling operation.

(35) In the seventh embodiment, the fixing cylinder 115 is made of non-magnetic material like the rotation shaft 103, and the fixing cylinder 115 and the field magnet 140 are fixed to each other. Therefore, it is possible to avoid a case where a magnetic flux of the field magnet 140 becomes a leakage magnetic flux and the leakage magnetic flux flows through the rotation shaft 103 and the fixing cylinder 115 which are made of non-magnetic material.

(36) According to the seventh embodiment, the axial length of the fixing cylinder 115 is the same as the axial length of the field magnet 140 which is arranged between the first rotor core 120 and the second rotor core 130. Therefore, at the time of press-fitting and crimpling operation of the first and second rotor cores 120 and 130, the opposing surfaces 121a and 131a of the first and second rotor cores 120 and 130 can easily be brought into close contact with each other without applying a load to the field magnet 140. As a result, magnetic resistance between the first and second rotor cores 120 and 130 and the field magnet 140 can be made small.

The seventh embodiment may be modified as follows.

The fixing cylinder 115 made of non-magnetic material is made of stainless steel like the rotation shaft 103 in the seventh embodiment and any non-magnetic material can be used. For example, the fixing cylinder 115 may be made of aluminum or resin.

In the seventh embodiment, the axial length of the fixing cylinder 115 is the same as the thickness (axial length) of the field magnet 140. Instead of this configuration, the axial length of the fixing cylinder 115 may be greater than the thickness of the field magnet 140.

In this case, a gap is formed between the field magnet 140 and the first and second rotor cores 120 and 130, and magnetic resistance is increased. Hence, it is necessary that the axial length of the fixing cylinder 115 is increased within a range in which reduction of density of magnetic flux does not affect rotation.

Figure 63:
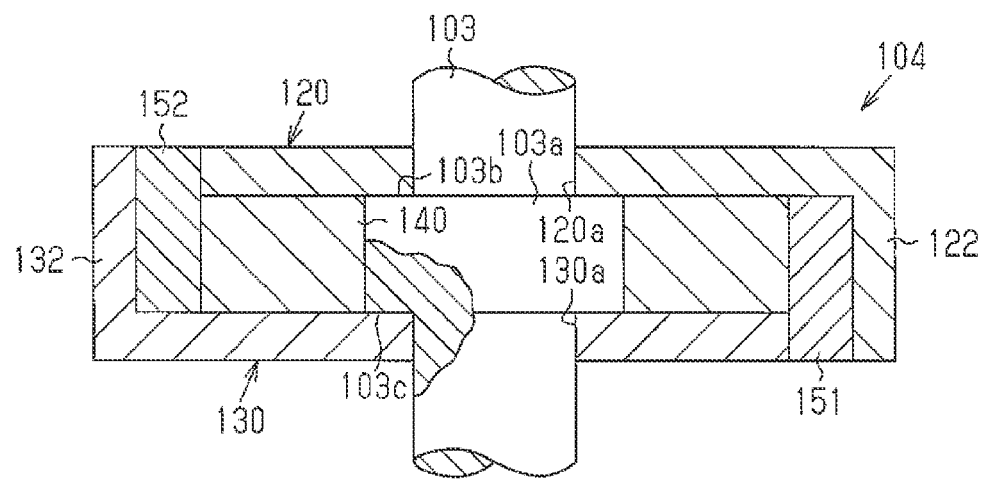
FIG. 63 is a cross-sectional view of a rotor showing another example of the seventh embodiment.

In the seventh embodiment, the rotation shaft 103 is press-fitted into and cramped onto the fixing cylinder 115, thereby forming a large-diameter portion of the rotation shaft 103. As shown in FIG. 63 for example, a diameter of a portion of the rotation shaft 103 is increased and this portion may be made as a large-diameter portion 103a. At this time, the first rotor core 120 abuts against a first stepped surface 103b of the large-diameter portion 103a, and the second rotor core 130 abuts against a second stepped surface 103c of the large-diameter portion 103a.

A large-diameter portion having the same shape as that of the fixing cylinder 115 may integrally be formed on the rotation shaft 103 by insert molding or double molding.

The field magnet 140 is made of neodymium magnet in the seventh embodiment. Instead, the field magnet 140 may be made of ferrite sintered magnet, samarium-cobalt magnet or the like.

Although the rotor 104 is provided with the first and second back surface auxiliary magnets 151 and 152 in the seventh embodiment, they may be omitted.

Although the rotor 104 is provided with the first and second interpolar magnet 153 and 154 in the seventh embodiment, they may be omitted. The first and second back surface auxiliary magnets 151 and 152 may also be omitted.

The invention claimed is:

1. A brushless motor comprising:
    a rotor including
        a rotation shaft,
        a first rotor core including
            a disk-shaped first core base that rotates integrally with the rotation shaft around the rotation shaft, and
            a plurality of first claw-shaped magnetic poles arranged at equal intervals on an outer circumferential surface of the first core base, wherein each of the first claw-shaped magnetic poles includes a first basal portion, which projects radially outward, and a first distal portion, which bends from the first basal portion and extends in an axial direction, a second rotor core including
  a disk-shaped second core base that rotates integrally with the rotation shaft around the rotation shaft, and
  a plurality of second claw-shaped magnetic poles arranged at equal intervals on an outer circumferential surface of the second core base, wherein each of the second claw-shaped magnetic poles includes a second basal portion, which projects radially outward, and a second distal portion, which bends from the second basal portion and extends in an axial direction, and the second claw-shaped magnetic poles are arranged between adjacent ones of the first claw-shaped magnetic poles in a circumferential direction, and
a field magnet that rotates integrally with the rotation shaft around the rotation shaft, wherein the field magnet is arranged between the first core base and the second core base, and the field magnet is magnetized in the axial direction so that each of the first claw-shaped magnetic poles functions as a first magnetic pole and each of the second claw-shaped magnetic poles functions as a second magnetic pole; and
a stator including
a stator core arranged at an outer side of the rotor and including a plurality of teeth located at equal intervals in the circumferential direction, wherein each of the teeth includes a radially inner circumferential surface opposed to radially outer circumferential surfaces of the first and second claw-shaped magnetic poles, and
windings wound as concentrated windings around each of the teeth, wherein the windings generate a rotating field when voltage is applied to the windings,
wherein the first and second claw-shaped magnetic poles are formed in a range satisfying $$\theta 1 \le \theta\alpha \le (360/n) - \theta L$$

where the number of magnetic poles of the rotor is represented by n,
an opening angle of the radially outer circumferential surfaces of the first and second claw-shaped magnetic poles is represented by $\theta\alpha$,
an opening angle of the radially inner circumferential surface of each of the teeth is represented by $\theta 1$, and
an opening angle between a circumferential end of the first distal portion and a circumferential end of the second distal portion in adjacent ones of the first and second claw-shaped magnetic poles is represented by $\theta L$ when a circumferential length between the circumferential end of the first distal portion and the circumferential end of the second distal portion is equal to a distance of an air gap between the stator and the rotor.

2. The brushless motor according to claim 1, wherein
the brushless motor is arranged for a position control apparatus arranged in a vehicle engine room,
the windings of the stator are supplied with three-phase drive current from a control circuit thereby generating a rotating field,
the radially outer surfaces of the first and second claw-shaped magnetic poles have arcuate surfaces extending about a center axis of the rotation shaft of the rotor, and the radially outer surfaces have an auxiliary groove, which is recessed from the arcuate surfaces, and
cross-sectional shapes of the first and second claw-shaped magnetic poles in a direction perpendicular to the radially outer surface do not have circles extending about the center axis of the rotation shaft of the rotor.

3. The brushless motor according to claim 2, wherein
the first and second claw-shaped magnetic poles extend in the axial direction to cover a radially outer surface of the field magnet.

4. The brushless motor according to claim 2, wherein
the field magnet is arranged radially inward from outer portions of the first and second core bases.

5. The brushless motor according to claim 2, wherein the brushless motor is used with a variable valve timing apparatus.

6. The brushless motor according to claim 1, wherein
the first core base has a central portion fixed to the rotation shaft,
the second core base has a central portion fixed to the rotation shaft,
the first and second core bases are opposed to each other,
the first and second claw-shaped magnetic poles are alternately arranged in the circumferential direction, and
the brushless motor further comprising a reinforcement that reinforces the first rotor core and the second rotor core, wherein the reinforcement is formed integrally with or discretely from the first rotor core and the second rotor core.

7. The brushless motor according to claim 6, wherein
the reinforcement includes
  a communication portion that extends from one side in the axial direction to the other side through the first rotor core, the second rotor core, and the field magnet, and
  a fixing member inserted into the communication portion; and
when the reinforcement is inserted into the communication portion when the field magnet is held between the first and second rotor cores, the first and second rotor cores are fixed to the field magnet.

8. The brushless motor according to claim 6, wherein
each of the first rotor core and the second rotor core includes a plurality of annularly arranged core segments,
each of the core segments of the first rotor core includes the first claw-shaped magnetic pole,
each of the core segments of the second rotor core includes the second claw-shaped magnetic pole, and
the reinforcement includes a connecting portion formed in each of the core segments to connect adjacent ones of the core segments in the circumferential direction.

9. The brushless motor according to claim 6, wherein
the reinforcement includes
  a first boss located in the central portion of the first core base and projecting in the axial direction in a direction opposite to a projecting direction of the first claw-shaped magnetic poles, and
  a second boss located in the central portion of the second core base and projecting in the axial direction to a direction opposite to a projecting direction of the second claw-shaped magnetic poles;
the rotation shaft is inserted into the first boss and the second boss; and
the first boss and the second boss are formed in a burring process.

10. The brushless motor according to claim 6, wherein
the reinforcement includes ribs formed in the first and second rotor cores, and the ribs extend from the first and second core bases to the claw-shaped magnetic poles.

11. The brushless motor according to claim 6, wherein the reinforcement includes a large-diameter portion arranged on the rotation shaft,
the large-diameter portion includes a first stepped surface and a second stepped surface located on opposite sides in the axial direction,
the large-diameter portion is inserted into and extends through the field magnet,
the first rotor core is press-fitted to the rotation shaft to a position where the first rotor core abuts against the first stepped surface of the large-diameter portion, and
the second core is press-fitted to the rotation shaft to a position where the second rotor core abuts against the second stepped surface of the large-diameter portion.

12. The brushless motor according to claim 1, wherein the brushless motor is arranged for a position control apparatus arranged in a vehicle engine room, and
the number of poles of the rotor is set to 2×n, and the number of the teeth of the stator is set to 3×n, wherein, n is a natural number.

13. The brushless motor according to claim 1, wherein the brushless motor is arranged for a position control apparatus arranged in a vehicle engine room, and
the brushless motor further comprising:
a sensor magnet;
a hall IC opposed to the sensor magnet; and
a control circuit that supplies drive current to the windings of the stator to generate
a rotating field so that the sensor magnet and the hall IC function to detect a rotation position of the rotor and the position control apparatus performs a position control.

14. A brushless motor comprising:
a rotor including
a rotation shaft,
a first rotor core including
a disk-shaped first core base that rotates integrally with the rotation shaft around the rotation shaft, and
a plurality of first claw-shaped magnetic poles arranged at equal intervals on an outer circumferential surface of the first core base, wherein each of the first claw-shaped magnetic poles includes a first basal portion, which projects radially outward, and a first distal portion, which bends from the first basal portion and extends in an axial direction,
a second rotor core including
a disk-shaped second core base that rotates integrally with the rotation shaft around the rotation shaft, and
a plurality of second claw-shaped magnetic poles arranged at equal intervals on an outer circumferential surface of the second core base, wherein each of the second claw-shaped magnetic poles includes a second basal portion, which projects radially outward, and a second distal portion, which bends from the second basal portion and extends in an axial direction, and the second claw-shaped magnetic poles are arranged between adjacent ones of the first claw-shaped magnetic poles in a circumferential direction, and
a field magnet that rotates integrally with the rotation shaft around the rotation shaft, wherein the field magnet is arranged between the first core base of the first rotor core and the second core base of the second rotor core, and the field magnet is magnetized in the axial direction so that each of the first claw-shaped magnetic poles functions as a first magnetic pole and each of the second claw-shaped magnetic poles functions as a second magnetic pole; and
a stator including
a stator core arranged at an outer side of the rotor and including a plurality of teeth located at equal intervals in the circumferential direction, wherein each of the teeth includes a radially inner circumferential surface opposed to radially outer circumferential surfaces of the first and second claw-shaped magnetic poles, and
windings wound as concentrated windings around each of the teeth, wherein the windings generate a rotating field when voltage is applied to the windings,
wherein the first and second claw-shaped magnetic poles are formed in a range satisfying $$\theta L \leq \theta \beta < 360/n - \theta 1$$

where the number of magnetic poles of the rotor is represented by n,
an opening angle between a circumferential end of the first distal portion and a circumferential end of the second distal portion in adjacent ones of the first and second claw-shaped magnetic poles is represented by $\theta \beta$,
an opening angle of a radially inner circumferential surface of the teeth is represented by $\theta 1$, and
the opening angle $\theta \beta$ is represented by $\theta L$ when a circumferential length between the circumferential end of the first distal portion and a circumferential end of the second distal portion is equal to a distance of an air gap between the stator and the rotor.

15. The brushless motor according to claim 14, wherein the brushless motor is arranged for a position control apparatus arranged in a vehicle engine room,
the windings of the stator are supplied with three-phase drive current from a control circuit thereby generating a rotating field,
the radially outer surfaces of the first and second claw-shaped magnetic poles have arcuate surfaces extending about a center axis of the rotation shaft of the rotor, and the radially outer surfaces have an auxiliary groove, which is recessed from the arcuate surfaces, and
cross-sectional shapes of the first and second claw-shaped magnetic poles in a direction perpendicular to the radially outer surface do not have circles extending about the center axis of the rotation shaft of the rotor.

16. The brushless motor according to claim 15, wherein the first and second claw-shaped magnetic poles extend in the axial direction to cover a radially outer surface of the field magnet.

17. The brushless motor according to claim 15, wherein the field magnet is arranged radially inward from outer portions of the first and second core bases.

18. The brushless motor according to claim 15, wherein the brushless motor is used with a variable valve timing apparatus.

19. The brushless motor according to claim 6, wherein the first core base has a central portion fixed to the rotation shaft,
the second core base has a central portion fixed to the rotation shaft,
the first and second core bases are opposed to each other, the first and second claw-shaped magnetic poles are alternately arranged in the circumferential direction, and the brushless motor further comprising a reinforcement that reinforces the first rotor core and the second rotor core, wherein the reinforcement is formed integrally with or discretely from the first rotor core and the second rotor core.

20. The brushless motor according to claim 19, wherein the reinforcement includes
 a communication portion that extends from one side in the axial direction to the other side through the first rotor core, the second rotor core, and the field magnet, and
 a fixing member inserted into the communication portion; and
when the reinforcement is inserted into the communication portion when the field magnet is held between the first and second rotor cores, the first and second rotor cores are fixed to the field magnet.

21. The brushless motor according to claim 19, wherein
each of the first rotor core and the second rotor core includes a plurality of annularly arranged core segments,
each of the core segments of the first rotor core includes the first claw-shaped magnetic pole,
each of the core segments of the second rotor core includes the second claw-shaped magnetic pole, and
the reinforcement includes a connecting portion formed in each of the core segments to connect adjacent ones of the core segments in the circumferential direction.

22. The brushless motor according to claim 19, wherein the reinforcement includes
 a first boss located in the central portion of the first core base and projecting in the axial direction in a direction opposite to a projecting direction of the first claw-shaped magnetic poles, and
 a second boss located in the central portion of the second core base and projecting in the axial direction to a direction opposite to a projecting direction of the second claw-shaped magnetic poles;

the rotation shaft is inserted into the first boss and the second boss; and
the first boss and the second boss are formed in a burring process.

23. The brushless motor according to claim 19, wherein
the reinforcement includes ribs formed in the first and second rotor cores, and
the ribs extend from the first and second core bases to the claw-shaped magnetic poles.

24. The brushless motor according to claim 19, wherein
the reinforcement includes a large-diameter portion arranged on the rotation shaft,
the large-diameter portion includes a first stepped surface and a second stepped surface located on opposite sides in the axial direction,
the large-diameter portion is inserted into and extends through the field magnet,
the first rotor core is press-fitted to the rotation shaft to a position where the first rotor core abuts against the first stepped surface of the large-diameter portion, and
the second core is press-fitted to the rotation shaft to a position where the second rotor core abuts against the second stepped surface of the large-diameter portion.

25. The brushless motor according to claim 14, wherein
the brushless motor is arranged for a position control apparatus arranged in a vehicle engine room, and
the number of poles of the rotor is set to 2×n, and the number of the teeth of the stator is set to 3×n, wherein, n is a natural number.

26. The brushless motor according to claim 14, wherein
the brushless motor is arranged for a position control apparatus arranged in a vehicle engine room, and
the brushless motor further comprising:
 a sensor magnet,
 a hall IC opposed to the sensor magnet, and
 a control circuit that supplies drive current to the windings of the stator to generate a rotating field so that the sensor magnet and the hall IC function to detect a rotation position of the rotor and the position control apparatus performs a position control.

* * * * *